(12) United States Patent
Cao et al.

(10) Patent No.: US 9,283,671 B2
(45) Date of Patent: Mar. 15, 2016

(54) TRANSLATIONAL PARALLEL MANIPULATORS AND METHODS OF OPERATING THE SAME

(71) Applicant: NORTHWESTERN UNIVERSITY, Evanston, IL (US)

(72) Inventors: Jian Cao, Wilmette, IL (US); Kornel F. Ehmann, Evanston, IL (US); Qiang Zeng, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 0 days.

(21) Appl. No.: 14/259,815

(22) Filed: Apr. 23, 2014

(65) Prior Publication Data
US 2014/0311271 A1 Oct. 23, 2014

Related U.S. Application Data

(60) Provisional application No. 61/814,922, filed on Apr. 23, 2013.

(51) Int. Cl.
*B25J 9/00* (2006.01)
*B25J 9/10* (2006.01)
(Continued)

(52) U.S. Cl.
CPC .............. *B25J 9/0036* (2013.01); *B25J 9/106* (2013.01); *B25J 9/1623* (2013.01); *B25J 17/025* (2013.01); *B25J 17/0266* (2013.01); *Y10S 901/19* (2013.01); *Y10T 74/20329* (2015.01)

(58) Field of Classification Search
CPC .......... B25J 9/003; B25J 9/106; B25J 9/1623; B25J 17/0241; B25J 17/025; B25J 17/0258; B25J 17/0266; B25J 17/0275; B25J 17/0283; B25J 9/0036

USPC ................ 74/469, 479.01, 490.01, 490.05, 74/490.07–490.09; 901/15, 16
See application file for complete search history.

(56) References Cited

U.S. PATENT DOCUMENTS 4,628,765 A * 12/1986 Dien et al. ................. 74/665 A
4,806,068 A    2/1989 Kohli et al.
(Continued)

FOREIGN PATENT DOCUMENTS

DE      EP 1614480 A1 *  1/2006  .......... B05B 13/0431

OTHER PUBLICATIONS

Dongming Gan, et al., Unified Kinematics and Singularity Analysis of a Metamorphic Parallel Mechanism with Bifurcated Motion, Aug. 2013, Journal of Mechanisms and Robotics, vol. 5, pp. 2-4.*

(Continued)

*Primary Examiner* — William Kelleher
*Assistant Examiner* — Bobby Rushing, Jr.
(74) *Attorney, Agent, or Firm* — Klintworth & Rozenblat IP LLC

(57) ABSTRACT

In one aspect, a translational parallel manipulator is provided and includes a fixed platform including three guide members. The three guide members include first ends and second ends, and the first ends of the three guide members are all coupled to each other and the second ends of the three guide members are all spaced-apart from each other. The manipulator also includes a movable platform spaced-apart from the fixed platform and three serial subchains coupled between the three guide members and the movable platform. In one aspect, a translational parallel manipulator is provided and includes a fixed platform, a movable platform spaced-apart from the fixed platform, and a plurality of subchains coupled between the fixed platform and the movable platform. At least one of the plurality of subchains includes no more than four one degree-of-freedom joints.

9 Claims, 25 Drawing Sheets

(51) Int. Cl.
B25J 9/16 (2006.01)
B25J 17/02 (2006.01)

(56) References Cited

U.S. PATENT DOCUMENTS

| | | | |
|---|---|---|---|
| 4,976,582 A | | 12/1990 | Clavel |
| 5,114,300 A | * | 5/1992 | Shahinpoor ............ E04B 1/3205 248/654 |
| 6,135,683 A | * | 10/2000 | Kim et al. ...................... 409/132 |
| 6,497,548 B1 | * | 12/2002 | Roy et al. ....................... 414/735 |
| 7,331,750 B2 | * | 2/2008 | Merz et al. ..................... 414/735 |
| 8,456,124 B2 | * | 6/2013 | Nishida et al. ............ 318/568.21 |
| 2003/0121351 A1 | * | 7/2003 | Gosselin et al. ............ 74/490.05 |
| 2004/0086351 A1 | | 5/2004 | Kim et al. |
| 2005/0129495 A1 | | 6/2005 | Brogardh |
| 2006/0241810 A1 | * | 10/2006 | Zhang et al. .................. 700/245 |
| 2010/0270447 A1 | * | 10/2010 | Nejah ......................... 248/205.1 |
| 2011/0048159 A1 | * | 3/2011 | Pierrot et al. .............. 74/490.05 |
| 2011/0132131 A1 | | 6/2011 | Worz |
| 2012/0137816 A1 | * | 6/2012 | Carricato et al. .......... 74/490.05 |
| 2012/0227532 A1 | * | 9/2012 | Huang et al. ............... 74/490.05 |

OTHER PUBLICATIONS

International Search Report and Written Opinion for PCT/US2014/035148 dated Sep. 2, 2014, 13 pages.
J. Aginaga, I. Zabalza, O. Altuzarra and J. Najera, "Improving static stiffness of the 6-RUS parallel manipulator using inverse singularities," Robotics and Computer-Integrated Manufacturing 28, 458-471 (2012).
R. S. Ball, "A treatise on the theory of screws," Cambridge, Cambridge University Press (1900).
M. Carricato and V. Parenti-Castelli, "Singularity-Free Fully-Isotropic Translational Parallel Mechanisms," International Journal of Robotics Research 21, 161-174 (2002).
M. Ceccarelli and G. Carbone, "A stiffness analysis for CaPaMan (Cassino Parallel Manipulator)," Mechanism and Machine Theory 37, 427-439 (2002).
J. Chen and F. Lan, "Instantaneous stiffness analysis and simulation for hexapod machines," Simulation Modelling Practice and Theory 16, 419-428 (2008).
B. S. El-Khasawneh and P. M. Ferreira, "Computation of stiffness and stiffness bounds for parallel link manipulators," International Journal of Machine Tools & Manufacture 39, 321-342 (1999).
P. Fanghella and C. Galletti, "Metric Relations and Displacement Groups in Mechanism and Robot Kinematics," ASME, Journal of Mechanical Design 117, 470-478 (1995).
D. M. Gan, J. S. Dai, J. Dias and L. D. Seneviratne, "Unified Kinematics and Singularity Analysis of A Metamorphic Parallel Mechanism with Bifurcated Motion," ASME, Journal of Mechanisms and Robotics 5, 031104 (2013).
G. Gogu, "Structural synthesis of fully-isotropic translational parallel robots via theory of linear transformations," European Journal of Mechanics-A/Solids 23, 1021-1039 (2004).
M. Gosselin, "Stiffness mapping for a parallel manipulators," IEEE Transactions on Robotics and Automation 6, 377-382 (1990).
J. M. Helvé and F. Sparacino, "Structural synthesis of parallel robots generating spatial translation," Proc. 5th International Conference on Advanced Robotics, Pisa, Italy 1, 808-813 (1991).
J. M. Hervë, "The Lie group of rigid body displacements, a fundamental tool for mechanism design," Mechanism and Machine Theory 34, 719-730 (1999).
M. A. Hosseini and H. M. Daniali, "Weighted local conditioning index of a positioning and orienting parallel manipulator," Scientica Iranica B 18, 115-120 (2011).
B. Hu, Y. Lu, Q. Tan, J. Yu and J. Han, "Analysis of stiffness and elastic deformation of a 2(SP+SPR+SPU) serial—parallel manipulator," Robotics and Computer-Integrated Manufacturing 27, 418-25 (2011).

T. Huang, X. Zhao and D. J. Whitehouse, "Stiffness Estimation of a Tripod-Based Parallel Kinematic Machine," IEEE Transactions on Robotics and Automation 18, 50-58 (2002).
S. A. Joshi and L. W. Tsai, "Jacobian Analysis of Limited-DOF Parallel Manipulators," ASME, J. Mech. Des. 124, 254-258 (2002).
H. K. Jung, C. D. Crane III and R. G. Roberts, "Stiffness mapping of compliant parallel mechanisms in a serial arrangement," Mechanism and Machine Theory 43, 271-284 (2008).
H. S. Kim and L. W. Tsai, "Design Optimization of a Cartesian Parallel Manipulator," ASME, J. Mech. Des. 125, 43-51 (2003).
X. Kong and C. M. Gosselin, "Kinematics and Singularity Analysis of a Novel Type of 3-CRR 3-DOF Translational Parallel Manipulator," International Journal of Robotics Research 21, 791-798 (2002).
X. Kong and C. M. Gosselin, "Type synthesis of 3-DOF translational parallel manipulators based on screw theory," Journal of mechanical design 126, 83-92 (2004).
C. C. Lee and J. M. Hervé, "Cartesian Parallel Manipulators With Pseudoplanar Limbs," ASME, J. Mech. Des. 129, 1256-1264 (2007).
Y. Li and Q. Xu, "Stiffness analysis for a 3-PUU parallel kinematic machine," Mechanism and Machine Theory 43, 186-200 (2008).
F. Majou, C. M. Gosselin, P. Wenger and D. Chablat, "Parametric stiffness analysis of the Orthoglide," Mechanism and Machine Theory 42, 296-311 (2007).
A. Pashkevich, D. Chablat and P. Wenger, "Stiffness analysis of overconstrained parallel manipulators," Mechanism and Machine Theory 44, 1-27 (2009).
A. Pashkevich, A. Klimchik and D. Chablat, "Enhanced stiffness modeling of manipulators with passive joints," Mechanism and Machine Theory 46, 1-21 (2011).
H. H. Pham and I. M. Chen, "Stiffness modeling of flexure parallel mechanism," Precision Engineering 29, 467-478 (2005).
V. T. Portman, V. S. Chapsky and Y. Shneor, "Workspace of parallel kinematics machines with minimum stiffness limits: Collinear stiffness value based approach," Mechanism and Machine Theory 49, 67-86 (2012).
A. Rezaei, A. Akbarzadeh and M. R. Akbarzadeh-T, "An investigation on stiffness of a 3-PSP spatial parallel mechanism with flexible moving platform using invariant form," Mechanism and Machine Theory 51, 195-216 (2012).
Y. Shneor and V. T. Portman, "Stiffness of 5-axis machines with serial, parallel, and hybrid kinematics: Evaluation and comparison," CIRP Annals—Manufacturing Technology 59, 409-412 (2010).
L. W. Tsai, G. C. Walsh and R. E. Stamper, "Kinematics of a novel three DOF translational platform," IEEE Int. Conference on Robotics and Automation, Minneapolis, MN 3446-3451 (1996).
L. W. Tsai and S. Joshi, "Kinematics and optimization of a spatial 3-UPU parallel manipulator," ASME, J. Mech. Des. 122, 439-446 (2000).
Y. Wang, H. Liu, T. Huang and D. G. Chetwynd, "Stiffness Modeling of the Tricept Robot Using the Overall Jacobian Matrix," ASME, Journal of Mechanisms and Robotics 1, 021002 (2009).
J. Wu, J. Wang, L. Wang, T. Li and Z. You, "Study on the stiffness of a 5-DOF hybrid machine tool with actuation redundancy," Mechanism and Machine Theory 44, 289-305 (2009).
F. Xi, D. Zhang, C. M. Mechefske and S. Y. T. Lang, "Global kinetostatic modeling of tripod-based parallel kinematic machine," Mechanism and Machine Theory 39, 357-377 (2004).
Q. Xu and Y. Li, "An investigation on mobility and stiffness of a 3-DOF translational parallel manipulator via screw theory," Robotics and Computer-Integrated Manufacturing 24, 402-414 (2008).
D. Zhang and C. M. Gosselin, "Kinetostatic Analysis and Design Optimization of the Tricept Machine Tool Family," ASME J. Manuf. Sci. Eng. 124, 725-733 (2002).
D. Zhang and S. Y. T. Lang, "Stiffness Modeling for a Class of Reconfigurable PKMs with Three to Five Degrees of Freedom," Journal of Manufacturing Systems 23, 316-327 (2004).

* cited by examiner

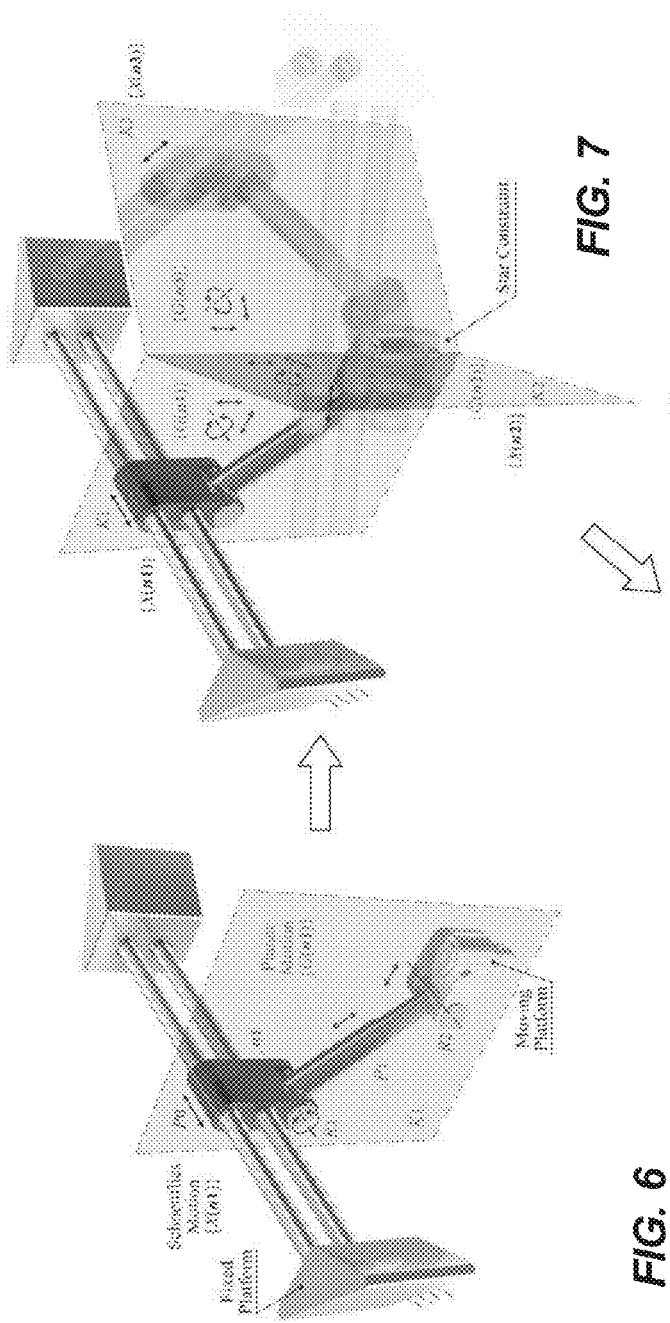
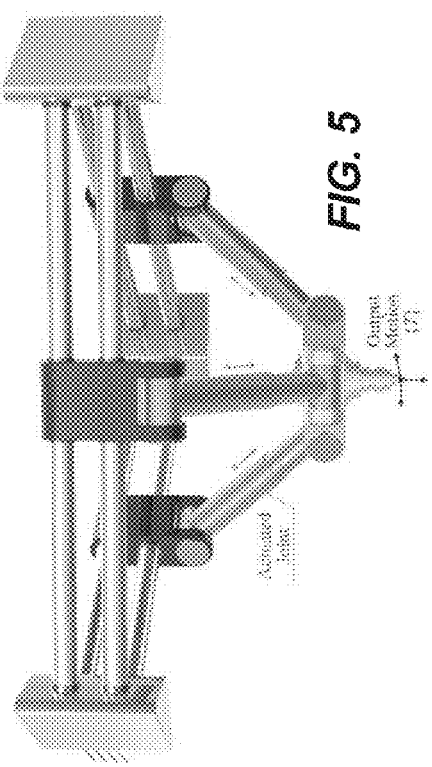
FIG. 7
FIG. 6
FIG. 5

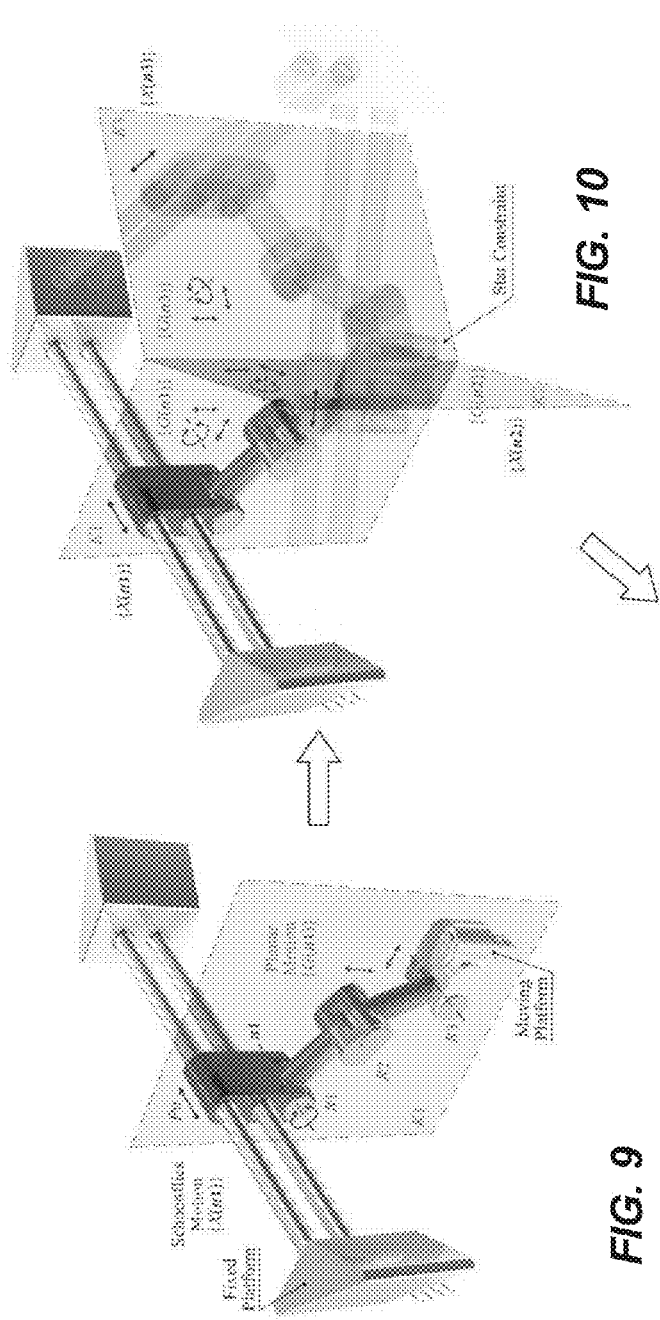
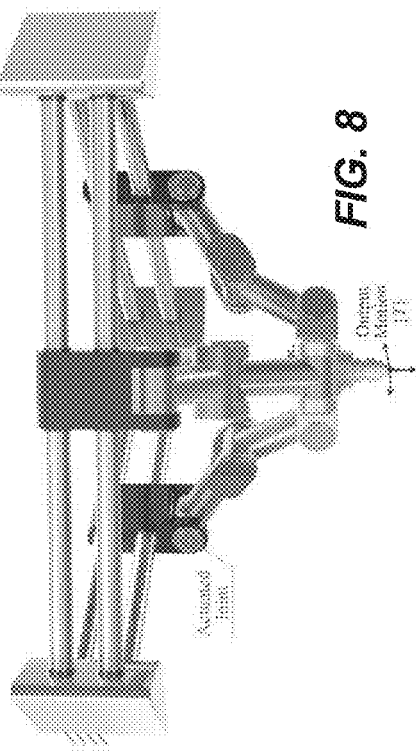
FIG. 10
FIG. 9
FIG. 8

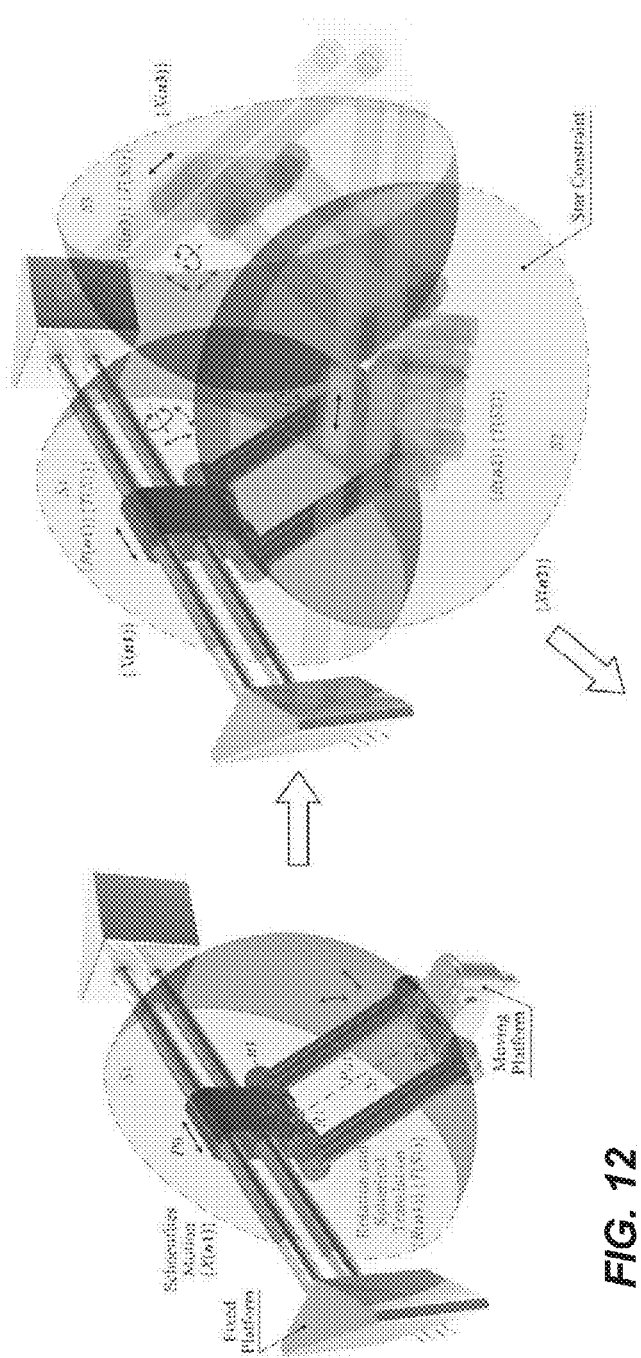
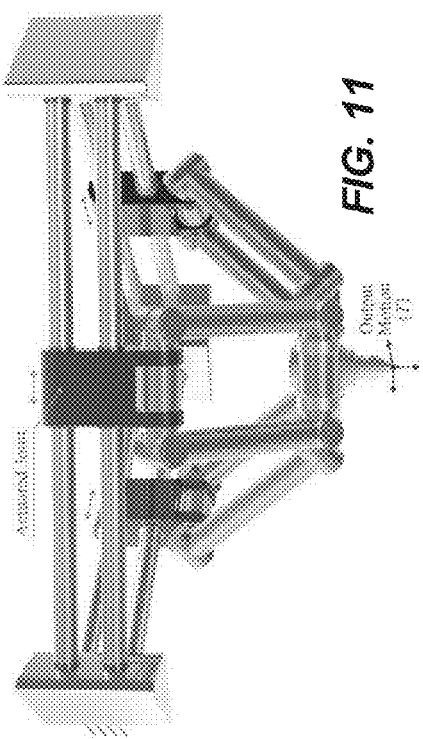
FIG. 13
FIG. 12
FIG. 11

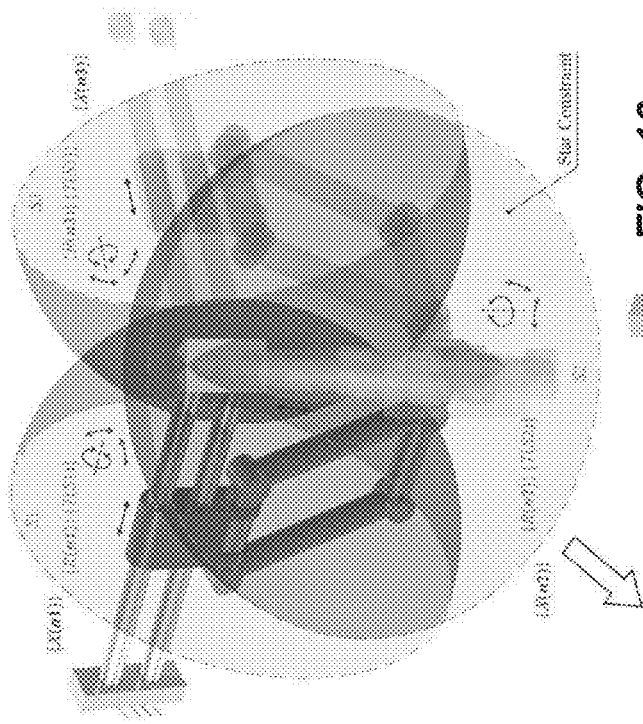
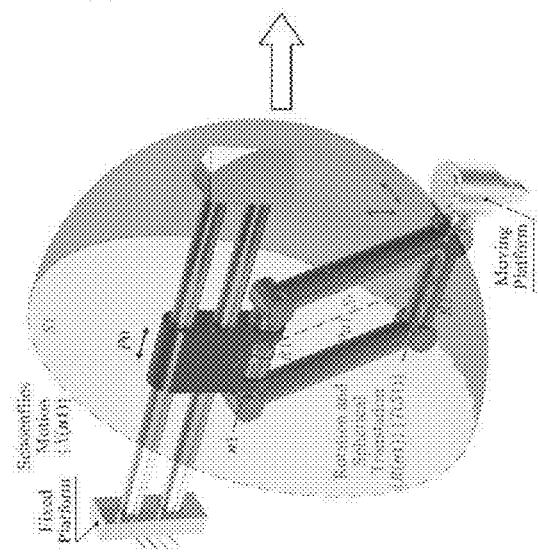
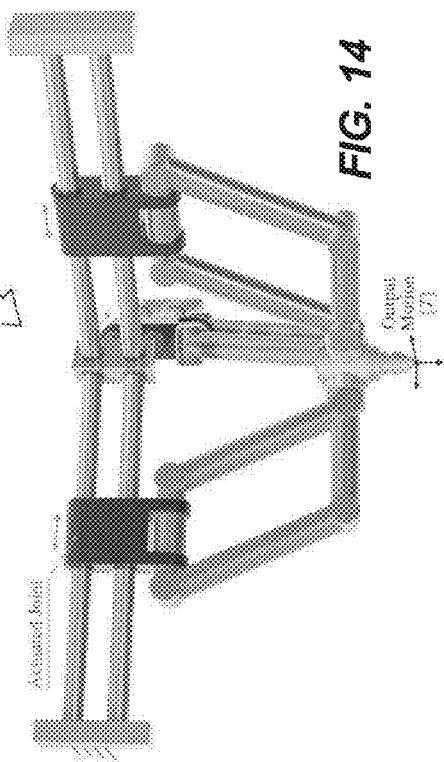
FIG. 16
FIG. 15
FIG. 14

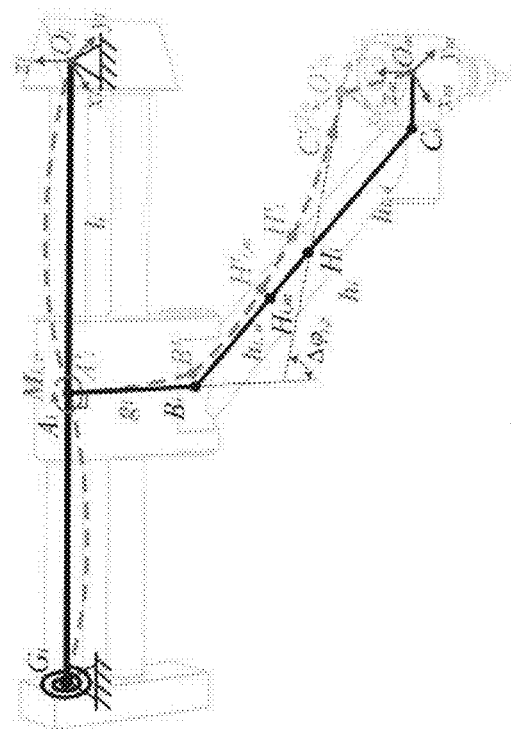

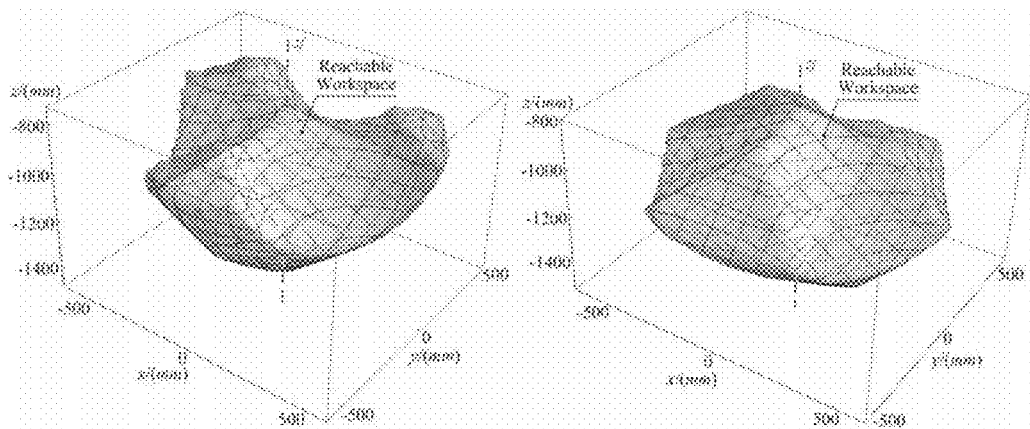
*FIG. 41a*  *FIG. 41d*
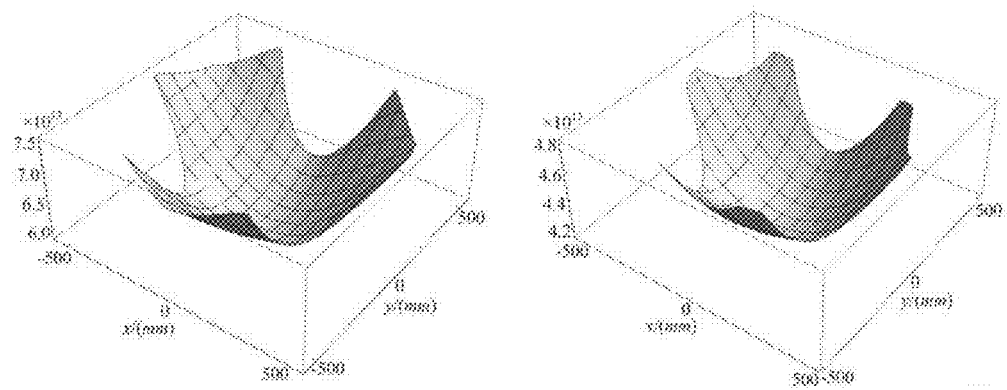
*FIG. 41b*  *FIG. 41e*
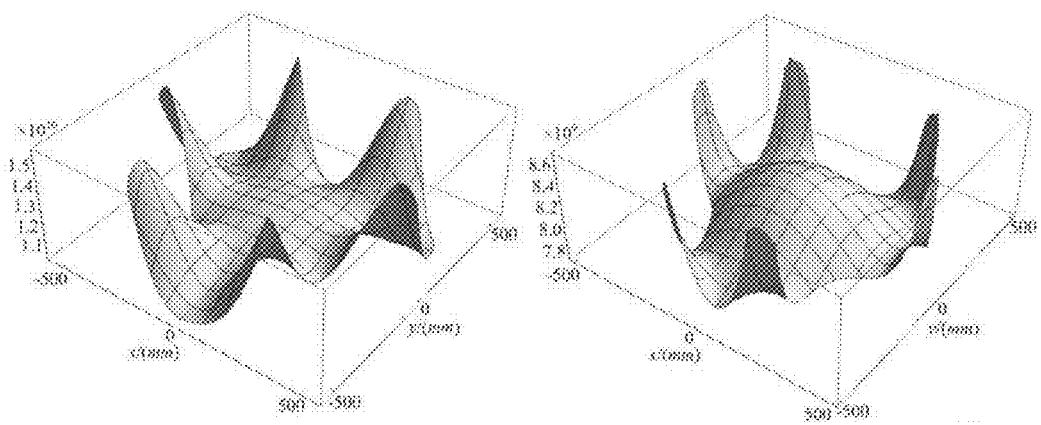
*FIG. 41c*  *FIG. 41f*

TRANSLATIONAL PARALLEL MANIPULATORS AND METHODS OF OPERATING THE SAME

RELATED APPLICATIONS

The present application claims the benefit of co-pending U.S. Provisional Patent Application No. 61/814,922, filed Apr. 23, 2013, the contents of which are incorporated by reference herein in their entirety.

FIELD OF THE INVENTION

The present disclosure generally relates to manipulators and, more particularly, to translational parallel manipulators.

BACKGROUND

In currently developed 3-DOF (Degree of Freedom) translational manipulators, high output stiffness and accuracy are limited by their respective topological structures. The general topological structural forms for such manipulators include serial and parallel forms. The serial forms of 3-DOF translational manipulators are opened-loop structures. Errors of the output motions are accumulated by the serial connections, and the stiffness, load/weight ratio, and speed of the serial manipulators are limited. In order to achieve higher stiffness, accuracy, load/weight ratio and operation speeds of translational manipulators, closed-loop parallel forms of 3-DOF translational manipulators can be used to simultaneously constrain the output motions generated by three serial kinematic chains. However, the developed 3-DOF translational parallel manipulators have respective structural disadvantages, such as moving actuators, independent actuation forces, anisotropic constraints, singularity configurations and complex joint combinations.

In the development of parallel manipulators, manipulators with a limited number of parallel DOF have been designed for many different industrial applications because 6-DOF motions are not always required. Compared to serial manipulators, the rotational ability of the developed parallel manipulators is limited by multi-loop constraints. Thus, the designs of limited-DOF parallel manipulators are focused on translational output motions, while the required rotational output motions are realized by mounting serial revolute joints on the output movable platform of the parallel manipulator.

Some of the drawbacks of current manipulators include, but are not limited to: Having too many 1-DOF joints included in the structure of the parallel manipulators; low stiffness and accuracy are induced by cumulative effects of the joints; some designs have orthogonal constraints; having three revolute joints in each subchain may be responsible for low stiffness and accuracy of the output movable platform; the prismatic joints, placed on the movable platform of certain designs, require a large-sized movable platform to increase a range of the workspace; a low load/weight ratio is inevitable with large-sized movable platforms; planar joints are not easy to fabricate and depend on the design of planar aerostatic bearing systems; constraint forces of the planar joints are not uniform when heavy loads are applied to the movable platform; etc.

Three typical 3-DOF TPMs include the Delta Robot, the Tsai mechanism and the Cartesian parallel manipulator. These designs have been used in many practical applications including manufacturing, medical and food industries to mention a few. However, these developed 3-DOF TPMs still suffer from a variety of drawbacks. The structural disadvantage of the Delta Robot is its complex structure with a total of twenty-one 1-DOF joints. The Tsai mechanism includes six universal joints, and the three actuators are not placed on the fixed platform. Cartesian parallel manipulators have orthogonally arranged constraints and, furthermore, the actuation force of each subchain independently resists the external force. All of the above-mentioned characteristics lead to low stiffness and accuracy of these parallel manipulators.

In light of the above, a need exists to develop a translational parallel manipulator that overcomes the above-identified and other disadvantages.

SUMMARY

The present disclosure is directed to a translational parallel manipulator that can manipulate an object by generating a plurality of orthogonal translational output motions in space. In some aspects, the manipulator is a 3 DOF translational parallel manipulator that generates three orthogonal translational output motions. The manipulator overcomes drawbacks of current technology to achieve a higher load/weight ratio, stiffness and accuracy, among other benefits.

In one aspect, the manipulator includes three serial kinematic subchains coupled between a fixed platform and a movable platform. Structures of the three serial kinematic subchains may be identical. In other aspects, structures of the three serial kinematic subchains may be different.

In one aspect, each serial kinematic subchain comprises a first prismatic joint, a first revolute joint, a second prismatic joint and a second revolute joint. The four 1-DOF joints are connected serially. In a serial kinematic subchain, the moving direction of the first prismatic joint is parallel to the rotational axis of the first revolute joint, and the rotational axis of the second revolute joint is parallel to the rotational axis of the first revolute joint.

In one aspect, an intersection angle between a moving direction of the second prismatic joint and the rotational axis of the first revolute joint is 45±15 degrees for a relative larger workspace and a better kinematic performance.

In one aspect, the first prismatic joint may be a drive joint and may be driven.

In one aspect, the first prismatic joint may be actuated by a lead screw. In another aspect, the first prismatic joint may be actuated by a linear motor in each subchain.

In one embodiment, moving directions of three first joints of the subchains may be placed in a plane and symmetrically arranged in a star form on the fixed platform such that axes of movement of the three first joints intersect each other.

In one aspect, on a movable platform, rotational axes of three connected second revolute joints are positioned in a plane and intersect at a central point of the movable platform. The movable platform may be an end-effector of the manipulator. Output motions of the end-effector may be three orthogonal translational motions in space.

In one aspect, a translational parallel manipulator is provided and includes a fixed platform including three guide members. The three guide members include first ends and second ends, and the first ends of the three guide members are all coupled to each other and the second ends of the three guide members are all spaced-apart from each other. The manipulator also includes a movable platform spaced-apart from the fixed platform and three serial subchains coupled between the three guide members and the movable platform.

In one aspect, the three guide members are co-planar with each other.

In one aspect, the three guide members are non-planar with each other.

In one aspect, the first ends of the three guide members are disposed above the second ends of the three guide members.

In one aspect, the first ends of the three guide members are disposed below the second ends of the three guide members.

In one aspect, the three serial subchains are identical in structure.

In one aspect, the three serial subchains are different in structure.

In one aspect, at least one of the three serial subchains includes no more than four one degree-of-freedom joints.

In one aspect, the four one degree-of-freedom joints are comprised of: a first prismatic joint; a first revolute joint; a second prismatic joint; and a second revolute joint.

In one aspect, the first prismatic joint is coupled directly to a respective one of the guide members and the second revolute joint is coupled directly to the movable platform.

In one aspect, the first prismatic joint is a driven prismatic joint.

In one aspect, the first revolute joint, the second prismatic joint, and the second revolute joint are passive joints.

In one aspect, the first prismatic joint is driven by at least one of a lead screw and a linear motor.

In one aspect, the three serial subchains each include no more than four one degree-of-freedom joints.

In one aspect, each of the three serial subchains include: a first prismatic joint; a first revolute joint; a second prismatic joint; and a second revolute joint. The second revolute joints of the three serial subchains are coupled directly to the movable platform and rotational axes of the second revolute joints intersect each other at a point on the movable platform.

In one aspect, the point is a center point of the movable platform.

In one aspect, the rotational axes of the second revolute joints are co-planar.

In one aspect, the first prismatic joint is movable in a first direction and is parallel to a rotational axis of the first revolute joint.

In one aspect, a rotational axis of the first revolute joint is parallel to a rotational axis of the second revolute joint.

In one aspect, an intersection angle between a rotational axis of the first revolute joint and a moving direction of the second prismatic joint is between zero degrees and about 90 degrees.

In one aspect, the intersection angle is between about 30 degrees and about 60 degrees.

In one aspect, the movable platform includes at least one of a tool holder and a tool.

In one aspect, the translational parallel manipulator is constrained to a limited quantity of degrees-of-freedom.

In one aspect, the translational parallel manipulator is constrained to only three degrees-of-freedom.

In one aspect, a translational parallel manipulator is provided and includes three fixed guide members extending along three respective longitudinal axes. The three longitudinal axes intersect each other at a common point. The manipulator also includes a movable platform spaced-apart from the three fixed guide members and three serial subchains. Each of the three serial subchains is coupled between the movable platform and a respective one of the three fixed guide members.

In one aspect, the three respective longitudinal axes are co-planar with each other.

In one aspect, the three respective longitudinal axes are non-planar with each other.

In one aspect, the three respective longitudinal axes incline upward toward the common point.

In one aspect, the three respective longitudinal axes decline downward toward the common point.

In one aspect, the three serial subchains are identical in structure.

In one aspect, the three serial subchains are different in structure.

In one aspect, at least one of the three serial subchains includes no more than four one degree-of-freedom joints.

In one aspect, the four one degree-of-freedom joints are comprised of: a first prismatic joint; a first revolute joint; a second prismatic joint; and a second revolute joint.

In one aspect, the first prismatic joint is coupled directly to a respective one of the three fixed guide members and the second revolute joint is coupled directly to the movable platform.

In one aspect, the first prismatic joint is a driven prismatic joint.

In one aspect, the first revolute joint, the second prismatic joint, and the second revolute joint are passive joints.

In one aspect, the first prismatic joint is driven by at least one of a lead screw and a linear motor.

In one aspect, the three serial subchains each include no more than four one degree-of-freedom joints.

In one aspect, each of the three serial subchains include: a first prismatic joint; a first revolute joint; a second prismatic joint; and a second revolute joint. The second revolute joints of the three serial subchains are coupled directly to the movable platform and rotational axes of the second revolute joints intersect each other at a point on the movable platform.

In one aspect, the point is a center point of the movable platform.

In one aspect, the rotational axes of the second revolute joints are co-planar.

In one aspect, the first prismatic joint is movable in a first direction and is parallel to a rotational axis of the first revolute joint.

In one aspect, a rotational axis of the first revolute joint is parallel to a rotational axis of the second revolute joint.

In one aspect, an intersection angle between a rotational axis of the first revolute joint and a moving direction of the second prismatic joint is between zero degrees and about 90 degrees.

In one aspect, the intersection angle is between about 30 degrees and about 60 degrees.

In one aspect, the movable platform includes at least one of a tool holder and a tool.

In one aspect, the translational parallel manipulator is constrained to a limited quantity of degrees-of-freedom.

In one aspect, the translational parallel manipulator is constrained to only three degrees-of-freedom.

In one aspect, a translational parallel manipulator is provided and includes a fixed platform, a movable platform spaced-apart from the fixed platform, and a plurality of subchains coupled between the fixed platform and the movable platform. At least one of the plurality of subchains includes no more than four one degree-of-freedom joints.

In one aspect, the fixed platform includes three guide members that are co-planar with each other.

In one aspect, the fixed platform includes three guide members that are non-planar with each other.

In one aspect, the plurality of subchains are identical in structure.

In one aspect, the plurality of subchains are different in structure.

In one aspect, the four one degree-of-freedom joints are serially connected.

In one aspect, the four one degree-of-freedom joints are comprised of a first prismatic joint, a first revolute joint, a second prismatic joint, and a second revolute joint.

In one aspect, the first prismatic joint is coupled directly to the fixed platform and the second revolute joint is coupled directly to the movable platform.

In one aspect, the first prismatic joint is a driven prismatic joint.

In one aspect, the first revolute joint, the second prismatic joint, and the second revolute joint are passive joints.

In one aspect, the first prismatic joint is driven by at least one of a lead screw and a linear motor.

In one aspect, each of the plurality of subchains includes no more than four one degree-of-freedom joints.

In one aspect, each of the plurality of subchains includes a first prismatic joint, a first revolute joint, a second prismatic joint, and a second revolute joint. The second revolute joints of the plurality of subchains are coupled directly to the movable platform and rotational axes of the second revolute joints intersect each other at a point on the movable platform.

In one aspect, the point is a center point of the movable platform.

In one aspect, the rotational axes of the second revolute joints are co-planar.

In one aspect, the first prismatic joint is movable in a first direction and is parallel to a rotational axis of the first revolute joint.

In one aspect, a rotational axis of the first revolute joint is parallel to a rotational axis of the second revolute joint.

In one aspect, an intersection angle between a rotational axis of the first revolute joint and a moving direction of the second prismatic joint is between zero degrees and about 90 degrees.

In one aspect, the intersection angle is between about 30 degrees and about 60 degrees.

In one aspect, the movable platform includes at least one of a tool holder and a tool.

In one aspect, the translational parallel manipulator is constrained to a limited quantity of degrees-of-freedom.

In one aspect, the translational parallel manipulator is constrained to only three degrees-of-freedom.

BRIEF DESCRIPTION OF THE DRAWINGS

The present disclosure can be better understood with reference to the following drawings and description. The components in the figures are not necessarily to scale, emphasis instead being placed upon illustrating the principles of the disclosure.

FIG. 5 is a bottom perspective of another example of a translational parallel manipulator, in accordance with one aspect of the present disclosure.

FIG. 6 is a top perspective view of a portion of the manipulator shown in FIG. 5, in accordance with one aspect of the present disclosure.

FIG. 7 is a top perspective view of the manipulator shown in FIG. 5, in accordance with one aspect of the present disclosure.

FIG. 8 is a bottom perspective view of another example of a translational parallel manipulator, in accordance with one aspect of the present disclosure.

FIG. 9 is a top perspective view of a portion of the manipulator shown in FIG. 8, in accordance with one aspect of the present disclosure.

FIG. 10 is a top perspective view of the manipulator shown in FIG. 8, in accordance with one aspect of the present disclosure.

FIG. 11 is a bottom perspective view of another example of a translational parallel manipulator, in accordance with one aspect of the present disclosure.

FIG. 12 is a top perspective view of a portion of the manipulator shown in FIG. 11, in accordance with one aspect of the present disclosure.

FIG. 13 is a top perspective view of the manipulator shown in FIG. 11, in accordance with one aspect of the present disclosure.

FIG. 14 is a bottom perspective view of another example of a translational parallel manipulator, in accordance with one aspect of the present disclosure.

FIG. 15 is a top perspective view of a portion of the manipulator shown in FIG. 14, in accordance with one aspect of the present disclosure.

FIG. 16 is a top perspective view of the manipulator shown in FIG. 14, in accordance with one aspect of the present disclosure.

FIG. 29a is a top perspective view of a portion of one example of a translational parallel manipulator, such as the manipulator shown in FIG. 1, illustrating one example of a deformation of actuation of the portion, in accordance with one aspect of the present disclosure.

FIG. 29b is a top perspective view of a portion of one example of a translational parallel manipulator, such as the manipulator shown in FIG. 1, illustrating one example of deformation of constraints of the portion, in accordance with one aspect of the present disclosure.

FIG. 41a is a diagram illustrating another example of a three-dimensional (3D) workspace associated with the manipulator shown in FIG. 32 with $\gamma_i$ equal to −40 degrees, in accordance with one aspect of the present disclosure.

FIG. 41b is a diagram of one example of a stiffness distribution taken at an x-y section of a maximum eigenvalue at a z value of −1000 and having $\gamma_i$ equal to −40 degrees, in accordance with one aspect of the present disclosure.

FIG. 41c is a diagram of one example of a stiffness distribution taken at an x-y section of a minimum eigenvalue at a z value of −1000 and having $\gamma_i$ equal to −40 degrees, in accordance with one aspect of the present disclosure.

FIG. 41d is a diagram illustrating another example of a three-dimensional (3D) workspace associated with the manipulator shown in FIG. 32 with $\gamma_i$ equal to −50 degrees, in accordance with one aspect of the present disclosure.

FIG. 41e is a diagram of one example of a stiffness distribution taken at an x-y section of a maximum eigenvalue at a z value of −1000 and having $\gamma_i$ equal to −50 degrees, in accordance with one aspect of the present disclosure.

FIG. 41f is a diagram of one example of a stiffness distribution taken at an x-y section of a minimum eigenvalue at a z value of −1000 and having $\gamma_i$ equal to −50 degrees, in accordance with one aspect of the present disclosure.

Figures 1, 2, 3:
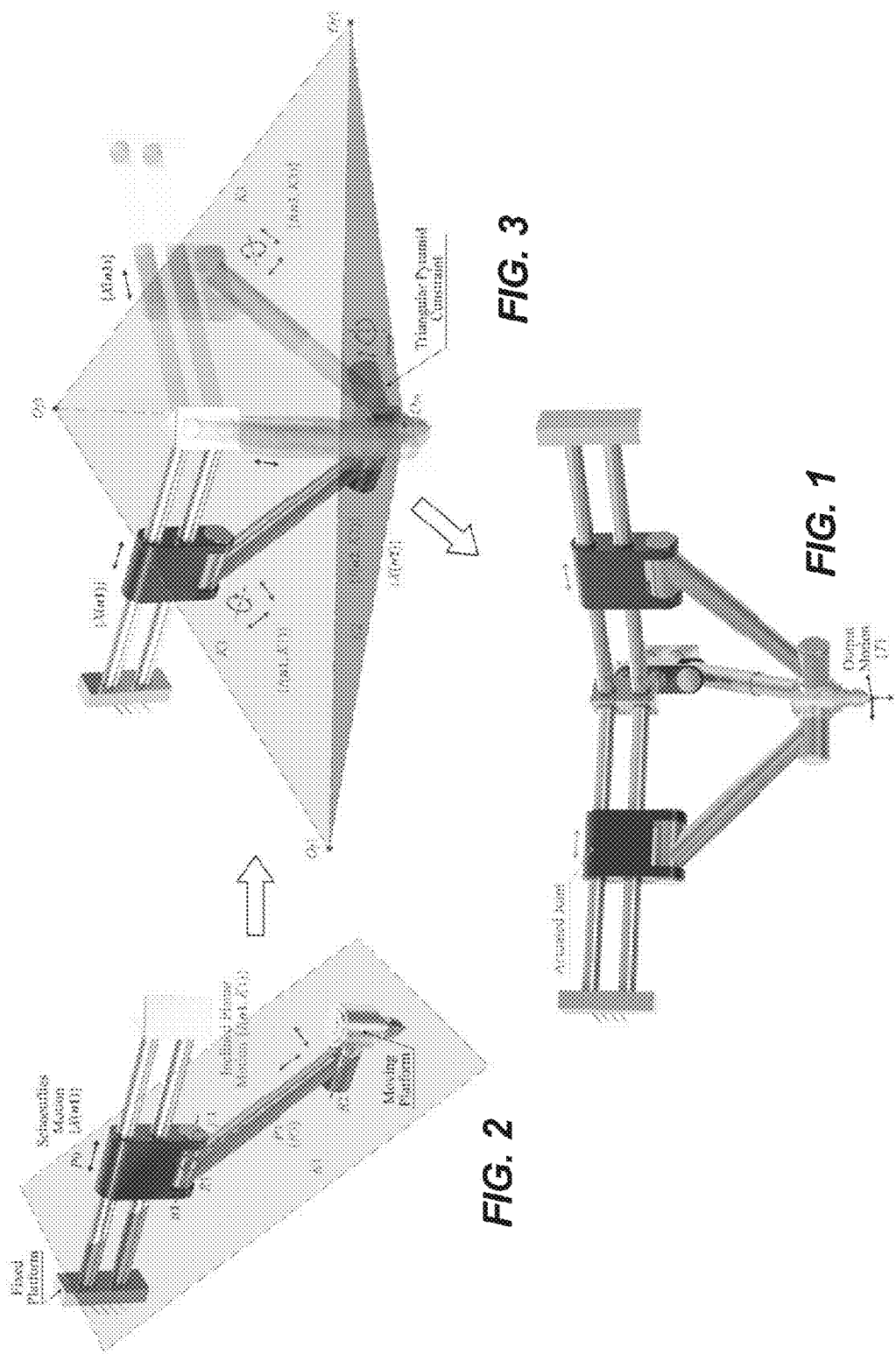
FIG. 1 is a bottom perspective view of one example of a translational parallel manipulator, in accordance with one aspect of the present disclosure.
FIG. 2 is a top perspective view of a portion of the manipulator shown in FIG. 1, in accordance with one aspect of the present disclosure.
FIG. 3 is top perspective view of the manipulator shown in FIG. 1, in accordance with one aspect of the present disclosure.

Other features and advantages of the present disclosure will become apparent from the following detailed description. It should be understood, however, that the detailed description and the specific examples, while indicating preferred examples, are given by way of illustration only, because various changes and modifications within the spirit and scope of the present disclosure will become apparent to those skilled in the art.

DETAILED DESCRIPTION

As indicated above, existing translational parallel manipulators have numerous drawbacks. The present disclosure includes translational parallel manipulators that may alleviate one or more, and other, drawbacks of existing translational parallel manipulators. For example, manipulators of the present disclosure may address one or more of the following conditions: The manipulator may be designed as a symmetric form (subchains have the same/identical structure) and arrangement of the subchains may be of a non-Cartesian form to eliminate orthogonality of the constraints; driven joints or actuators should be placed on or part of a fixed platform of the manipulator and, in some examples, actuation may be linear to assure high resolution inputs; the manipulator may be designed with a minimal number of 1-DOF joints (e.g., no U or S joints should be included); prismatic joints of the manipulator may not be directly connected to the movable platform and the movable platform should be as small as possible in size; decoupled motions, over-constraint elimination, singularity free workspace, and isotropic configuration may be included in the topological constraint design.

In order to realize the above design objectives and overcome drawbacks of conventional manipulators, topological structures of 3-DOF translational parallel manipulators (TPMs) are provided. In some examples of topological constraint designs of serial joints, an inclined planar displacement subset will be defined based on displacement group theory. A triangular pyramidal constraint is also provided and applied in designs of constraints between different subchains of the manipulator.

The translational parallel manipulators included herein are capable of being used in a wide variety of applications and functions including, but not limited to, forming, cutting, grinding, metrology, laser EDM, any other machining or manufacturing process or application, pick-and-place operation, haptic controller, motion simulator, or any other application or function utilizing a manipulator. The manipulator may include at least one tool holder and/or tool for performing any desired operation. The tool holder and/or tool may be located on or part of the movable platform. The movable platform may also include a plurality of tool holders and/or tools.

Topological Constraint and Structural Design

As far as 3-DOF TPMs are concerned, in some examples, three actuations may be required for 3-DOF output motions and, hence, three actuators should be arranged in different subchains to build a closed-loop form of the parallel manipulator. Thus, in this example, the manipulator includes three subchains connecting a movable platform to a fixed platform for a basic topological arrangement of the 3-DOF TPM. To generate three translational output motions, rotations of the movable platform may be simultaneously constrained by the three connected subchains, namely intersection motions of the three subchains may have no rotational output motions. This 3-DOF TPM may include three orthogonal prismatic joints serially connected in each subchain, thereby resulting in a total of nine prismatic joints involved to eliminate all rotations, and commonly constrain the movable platform to generate three orthogonal translational output motions. However, due to orthogonal constraints and redundant weight of guide members of the prismatic joints, low load/weight ratio, stiffness and accuracy may be induced.

By considering the displacement group theory, in one example, the general method for the design of the topological structure of the subchains of a 3-DOF TPM is to include a planar displacement subgroup and a translational displacement subgroup into a subchain. The planar displacement subgroup contains two non-parallel translational motions in a plane and a rotational motion that is parallel to a normal of the plane. The planar displacement subgroup can be realized by a planar joint, Pl, that is equivalent to a serial connection of 1-DOF joints in three different ways:

1) Two non-parallel prismatic joints and a revolute joint (an axis of the revolute joint is perpendicular to moving directions of the two prismatic joints).
2) A prismatic joint and two parallel revolute joints (axes of the revolute joints are perpendicular to moving direction of the prismatic joint).
3) Three parallel revolute joints.

The general translational displacement subgroup can be generated by:

1) A prismatic joint, P.
2) A parallelogram joint, Pa, namely, four parallel revolute joints are connected in a parallelogram in a closed-loop form.
3) Two parallel revolute joints, RR.

Thus, there are three types of structural combinations for the subchain design for a 3-DOF TPM, namely:

1) Subchain Pl-P: A planar joint with a prismatic joint (a direction of the prismatic joint is not perpendicular to a normal of the planar joint).

2) Subchain Pl-Pa: A planar joint with a parallelogram joint (axes of the revolute joints of the parallelogram joint are not parallel to a normal of the planar joint).
3) Subchain Pl-RR: A planar joint with two parallel revolute joint (axes of the two parallel revolute joints are not parallel to a normal of the planar joint).

A serial combination of planar and translational displacement subgroups can build a subchain of the 3-DOF TPM, while the closed-loop connection of three subchains with non-parallel revolute joints between the different subchains yields a 3-DOF TPM.

By considering the output motions of the three types of subchains, subchains Pl-P and Pl-Pa generate a Schoenflies displacement subgroup (three orthogonal translations and a rotation), respectively. The subchain Pl-RR generates two non-parallel planar displacement subgroups (three orthogonal translations and two non-parallel rotations). In some examples of a 3-DOF TPM, three rotations of the movable platform should be constrained and eliminated from the closed-loop connections of three subchains Pl-P or Pl-Pa. Similarly, in other examples, there are six rotations that should be eliminated from the closed-loop connection of three subchains Pl-RR. Thus, in accordance with design constraint that requires a minimal number of 1-DOF joints, subchains with only a Schoenflies motion will be used in the proposed design. In the following description, a plurality of 3-DOF TPMs are introduced to illustrate aspects of the present disclosure.

Four General Structures of 3-DOF TPMs

In FIGS. 5-7, one example of a TPM is illustrated. In this example, the manipulator includes a subchain Pl-P having a planar joint and a prismatic joint. The planar joint is configured with two revolute joints and a prismatic joint, namely $R_1 P_1 R_2$. A normal of the planar joint is $n_1$. A planar motion $\{G(n_1)\}$ is generated in plane $K_1$, and a Schoenflies motion $\{X(n_1)\}$ can be obtained by connection of a planar joint and of a prismatic joint $P_0$. By combining three subchains Pl-P in a star constraint (the constraint planes $K_1$, $K_2$ and $K_3$ of the subchains are arranged in a star shape), a 3 Pl-P TPM is obtained. The intersection operation of the displacement subsets between the subchains is given by:

$$Z_m = \bigcap_{i=1}^{3} \{X(n_i)\} \qquad (1)$$

$$= \bigcap_{i=1}^{3} [\{G(n_i)\}\{T(n_i)\}]$$

$$= \bigcap_{i=1}^{3} [\{R(n_i)\}\{T(K_i)\}\{T(n_i)\}]$$

$$= \bigcap_{i=1}^{3} [\{T(K_i)\}\{T(n_i)\}]$$

$$= \{T\}$$

where $Z_m$ represents the output motions of the movable platform. $\{T(n_i)\}$, $\{T(K_i)\}$ and $\{T\}$ respectively represent a translation along vector $n_i$, two translations in plane $K_i$ and three orthogonal translations. $\{R(n_i)\}$ represents a rotation around the vector $n_i$. Three non-parallel rotations of the three subchains are eliminated by the star constraint. The output motions of the 3Pl-P are three translations. The actuated joint is determined in the planar displacement subgroup of each subchain, because there is a common translational motion (along an intersection line of the constraint planes $K_1$, $K_2$ and $K_3$) in the three planar displacement subgroups. The 3Pl-P TPM has moving actuators.

In a similar way, the planar joint can be configured with three parallel revolute joints. Thus, a 3Pl-P TPM with configuration RRR of the planar joint can be constituted as shown in FIGS. 8-10.

To avoid the generation of intersection motions between the three planar displacement subgroups that are arranged in the star constraint configuration above, or conversely to design a structural configuration that places the actuators on the fixed platform, the serial connection of a parallelogram joint and of two parallel revolute joints can be used to replace the planar joint of the subchain Pl-P to generate a Schoenflies motion (FIGS. 11-13). In FIGS. 11-13, axes of joints $P_0$, $R_1$ and $R_2$ are parallel to axis $n_1$. An axis of the parallelogram joint $Pa_1$ is perpendicular to the axis $n_1$. A spherical translation $\{T(S_1)\}$ is generated on spherical surface $S_1$ by serial joints $Rya_1 R_2$, where a spherical center and radius are $S_o$ and $S_r$ respectively. A rotation $\{R(n_1)\}$ is obtained from the parallel joints $R_1$ and $R_2$. Thus, a Schoenflies motion $\{X(n_1)\}$ is generated by the subchain P-RPaR. By combining the three subchains P-RPaR in a star constraint configuration, a 3P-RPaR TPM is obtained. The intersection operation of the displacement subsets between the subchains is:

$$Z_m = \bigcap_{i=1}^{3} \{X(n_i)\} \qquad (2)$$

$$= \bigcap_{i=1}^{3} [\{R(n_i)\}\{T(S_i)\}\{T(n_i)\}]$$

$$= \bigcap_{i=1}^{3} [\{T(S_i)\}\{T(n_i)\}]$$

$$= \{T\}$$

It can be seen that the output motions of the 3P-RPaR are three translations, while the three non-parallel rotations are eliminated by the star constraint. The actuated joint may be selected as the prismatic joint P of each subchain since there are no intersection motions between the three spherical translations and the three non-parallel rotations. A manipulator has fixed actuators and the guide members of the three linear actuators are arranged in a triangular form to build the triangular 3P-RPaR TPM. Additionally, the guide members may be arranged in a star form to build a star 3P-RPaR TPM as shown in FIGS. 14-16. A size of the movable platform of the star 3P-RPaR may be reduced by the star connection of the guide members, because the movable platform is connected by three revolute joints whose axes intersect at a center point of the movable platform. A size of the movable platform is dependent on the cross-section of the connected revolute joints instead of their longitudinal section. Compared to the triangular 3P-RPaR TPM, a higher load/weight ratio can be achieved in the star 3P-RPaR TPM with a movable platform of smaller size. In other examples, the axes of the three revolute joints may intersect each other at a point of the movable platform other than the center point. In further examples, the axes of the three revolute joints may intersection each other, but not necessarily at the same point.

Although the star 3P-RPaR TPM illustrated in FIGS. 11-13 is designed with fixed actuators and a reduced size of the movable platform, this manipulator includes a large quantity of 1-DOF joints and the input motions are coupled by spherical translations of the parallelogram joints. To reduce the number of joints and decouple the motions of the star 3P-RPaR TPM, a prismatic joint may be used to replace the parallelogram joint in each subchain as illustrated in FIGS. 1-3.

In FIGS. 1-3, prismatic joint P connects two parallel revolute joints $R_1$ and $R_2$ with an intersection angle $\gamma_1$. Joints $P_1$, $R_1$ and $R_2$ generate a rotation around axis $n_1$ and two translations in plane $K_1$. Thus, the resulting new displacement subset can be defined as an inclined planar displacement subset $\{I(n_1, K_1)\}$ that can be generated by serial joints $R_1P_1R_2$. The difference between motions of the $\{I(n_1, K_1)\}$ and the general planar displacement subgroup $\{G(n_1)\}$ is that the axis of rotation of $\{I(n_1, K_1)\}$ is not perpendicular to the moving directions of the two translations. This type of inclined constraint between the rotation and translations can be used for a new structural design of the Schoenflies motion. By combining a prismatic joint $P_0$ with joints $R_1P_1R_1$ of the inclined planar displacement subset ($P_0$ is not perpendicular to the normal of the plane $K_1$), a new structure of the Schoenflies motion can be obtained as a subchain P-RPR. Three P-RPR subchains can be combined in a closed-loop form, where the three guide members of the joints $P_0$ are connected in a star form. The three constraint planes $K_1$, $K_2$ and $K_3$ of the subchains are arranged in a triangular pyramidal constraint form that intersect at point $O_m$. Consequently, a new 3P-RPR TPM can be obtained. The intersection operation of the displacement subsets between the subchains is:

$$Z_m = \bigcap_{i=1}^{3} \{X(n_i)\} \tag{3}$$
$$= \bigcap_{i=1}^{3} [\{I(n_i, K_i)\}\{T(n_i)\}]$$
$$= \bigcap_{i=1}^{3} [\{R(n_i)\}\{T(K_i)\}\{T(n_i)\}]$$
$$= \bigcap_{i=1}^{3} [\{T(K_i)\}\{T(n_i)\}]$$
$$= \{T\}$$

Three non-parallel rotations are eliminated by the triangular pyramidal constraint. In one example, the prismatic joint $P_0$ of each subchain (the joints $R_1$, $P_1$, $R_2$ are passive joints) may be selected as the driven or actuated joint because there are no intersection motions between the three inclined planar displacement subsets in the triangular pyramidal constraint, namely:

$$Z_m = \bigcap_{i=1}^{3} \{I(n_i, K_i)\} \tag{4}$$
$$= \bigcap_{i=1}^{3} [\{R(n_i)\}\{T(K_i)\}]$$
$$= \{E\}$$

where $\{E\}$ is a fixed displacement subgroup. There are no output motions between the three parallel subchains $R_1P_1R_2$ when the actuators of the three prismatic joints $P_0$ are locked.

By arbitrarily assuming that two of the actuators are locked, the intersection operation of the displacement subsets between the remaining structures is expressed as:

$$Z_m = \{X(n_1)\} \cap \{I(n_2, K_2)\} \cap \{I(n_3, K_3)\} \tag{5}$$
$$= [\{R(n_1)\}\{T(K_1)\}\{T(n_1)\}] \cap [\{R(n_2)\}\{T(K_2)\}] \cap$$
$$\quad [\{R(n_3)\}\{T(K_3)\}]$$
$$= [\{T(K_1)\}\{T(n_1)\}] \cap \{T(K_2)\} \cap \{T(K_3)\}$$
$$= \{T\} \cap \{T(K_2)\} \cap \{T(K_3)\}$$
$$= \{T(\overrightarrow{O_mO_{f2}})\}$$

where $\{T(\overrightarrow{O_mO_{f2}})\}$ is a translational output motion of the movable platform along the intersection line $\overrightarrow{O_mO_{f2}}$ of the planes $K_2$ and $K_3$. Similarly, if one of the actuators is locked, the output motions of the movable platform are:

$$Z_m = \{X(n_1)\} \cap \{X(n_2)\} \cap \{I(n_3, K_3)\} \tag{6}$$
$$= [\{R(n_1)\}\{T(K_1)\}\{T(n_1)\}] \cap [\{R(n_2)\}\{T(K_2)\}\{T(n_2)\}] \cap$$
$$\quad [\{R(n_3)\}\{T(K_3)\}]$$
$$= [\{T(K_1)\}\{T(n_1)\}] \cap [\{T(K_2)\}\{T(n_2)\}] \cap \{T(K_3)\}$$
$$= \{T\} \cap \{T\} \cap \{T(K_3)\}$$
$$= \{T(K_3)\}$$

where $\{T(K_3)\}$ represents two translational outputs in the plane $K_3$. Thus, the three linear input motions of the manipulator are decoupled. They correspond to the three output motions of the movable platform, respectively.

Based on the general Grübler-Kutzbach criterion, mobility of the manipulator is zero. Thus, the structure of the manipulator may be an over-constrained mechanism. However, in overconstrained mechanisms, large reaction moments and variable friction of the joints can affect the mobility of the movable platform due to unavoidable manufacturing or assembly errors. As a consequence, related output kinematic errors may be induced. Thus, by adding a revolute joint in each subchain, the manipulator may be converted into a non-over-constrained mechanism. An axis of the added revolute joint $R_3$ is parallel to a moving direction of the prismatic joint $P_1$. Equivalently, joint $P_1$ may be replaced by a cylindrical joint to eliminate the overconstrained condition. A 3P-RCR TPM can be obtained by the replacement. The mobility of the non-overconstrained 3P-RCR TPM is three according to the general Grübler-Kutzbach criterion. Based on displacement group theory, the additional three non-parallel rotations ($R_3$) can also be eliminated by the triangular pyramidal constraint. Thus, the added joints have no influence on the mobility and kinematic properties of the manipulator. They are only active when some constraint errors are encountered during the continuous motions.

In some examples, the manipulator illustrated in FIGS. 1-3 offers a number of features that were achieved as a consequence of overcoming the drawbacks of conventional TPMs. These, satisfying at the same time the design objectives, include, for example:

1) Three identical subchains are designed and arranged symmetrically in a non-Cartesian constraint.
2) All actuators provide linear actuation and are placed on the fixed platform.
3) Only four 1-DOF joints are included in each subchain, no U or S joints are involved.
4) The movable platform is connected with three revolute joints in a star form. A small size of the movable platform is realized.
5) The three input-output translations are decoupled and the manipulator is a non-over-constrained manipulator. Elimination of the over-constrained mechanism characteristics does not influence the mobility and kinematic properties of the manipulator.
6) The manipulator is singularity free and is characterized by an isotropic configuration (described in more detail below).

As a consequence, based on the above features (i.e., non-Cartesian constraint, fixed linear actuation, minimal number of 1-DOF joints, smaller size of the movable platform, decoupled motions) and the drawback analysis of conventional 3-DOF TPMs, the manipulator can achieve a higher load/weight ratio, stiffness and accuracy. In order to evaluate kinematic performances of the manipulator, related position solutions, workspace, velocity, load, singularity, isotropic and dexterity analysis are performed and described below.

Inverse and Forward Position Solutions

Figure 4:
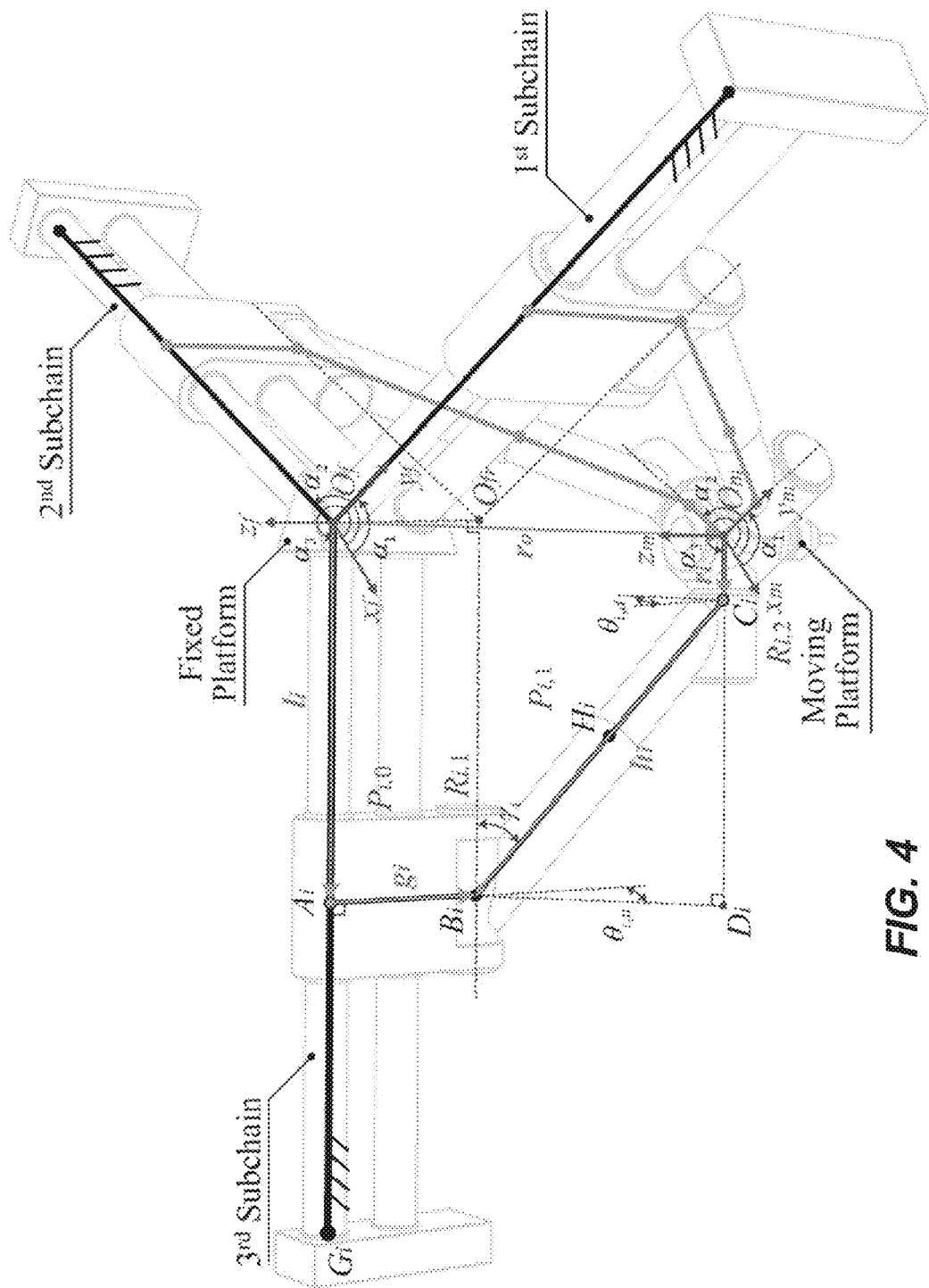
FIG. 4 is a top perspective view of the manipulator shown in FIG. 1 illustrating examples of structural parameters of the manipulator, in accordance with one aspect of the present disclosure.

The inverse and forward position solutions of the manipulator illustrated in FIGS. 1-3 define position relationships between the three linear input motions of actuations and the three translational output motions of the movable platform, to provide the basic constraint relations for the practical position control system. With reference to FIG. 4, a fixed reference frame $O_f$-$x_f y_f z_f$ is placed at a center of the fixed platform and a parallel moving reference frame $O_m$-$x_m y_m z_m$ is defined at a center of the movable platform. The guide members $O_f G_i$ (i=1, 2, 3) of the three linear actuators are perpendicular to axis $z_f$. The guide members are arranged along axis $x_f$ with intersection angles $\alpha_1$, $\alpha_2$ and $\alpha_3$, respectively. The prismatic joints and revolute joints $P_{i,0}$, $R_{i,1}$, $P_{i,1}$ and $R_{i,2}$ are connected in sequence. The basic structural parameters are $\alpha_i$, $\gamma_i$, $\|g_i\|$ and $\|r_i\|$, where $\gamma_i$ is an intersection angle between an axis of $R_{i,1}$ and a moving direction of $P_{i,1}$, $\|g_i\|$ represents a size of a slide block between points A and A which is parallel to the axis $z_f$, while $\|r_i\|$ is a size of the movable platform between points $O_m$ and $C_i$ which is perpendicular to the axis $z_f$. The joint variables of $P_{i,0}$, $R_{i,1}$, $P_{i,1}$ and $R_{i,2}$ are $\|l_i\|$, $\theta_{i,u}$, $\|h_i\|$ and $\theta_{i,d}$, respectively. The input variables are the lengths of travel $\|l_i\|$ of the linear actuators between points $O_f$ and $A_i$ which takes place along the three guide members, while an output variable is a position vector $r_o$ (x, y, z) of the movable platform between points $O_f$ and $O_m$. In a given subchain, the kinematic constraint of the closed loop is:

$$l_i + g_i = r_o + r_i + h_i \qquad (7)$$

where the vectors are defined as:

$$\begin{cases} l_i = \overrightarrow{O_f A_i} = [\ \|l_i\|\cos\alpha_i \quad \|l_i\|\sin\alpha_i \quad 0\ ]^T \\ g_i = \overrightarrow{A_i B_i} = \overrightarrow{O_f B_i} - \overrightarrow{O_f A_i} = [\ 0 \quad 0 \quad \|g_i\|\ ]^T \\ r_o = \overrightarrow{O_f O_m} = [\ x \quad y \quad z\ ]^T \\ r_i = \overrightarrow{O_m C_i} = \overrightarrow{O_f C_i} - \overrightarrow{O_f O_m} = [\ \|r_i\|\cos\alpha_i \quad \|r_i\|\sin\alpha_i \quad 0\ ]^T \end{cases} \qquad (8)$$

Thus, the vector $h_i$ can be deduced and expressed as:

$$\begin{aligned} h_i &= \overrightarrow{C_i B_i} \qquad (9) \\ &= l_i + g_i - r_o - r_i \\ &= [\ (\|l_i\| - \|r_i\|)\cos\alpha_i - x \quad (\|l_i\| - \|r_i\|)\sin\alpha_i - y \quad -\|g_i\| - z\ ]^T \end{aligned}$$

In accordance with the structural constraint condition, namely the intersection angle between the variable vectors $l_i$ and $h_i$ is the constant $\gamma_i$, the corresponding kinematic constraint equation can be obtained by a dot product of $l_i$ and $h_i$ as $$\begin{aligned} l_i \cdot h_i &= \|l_i\|\cos\alpha_i((\|l_i\| - \|r_i\|)\cos\alpha_i - x) + \|l_i\|\sin\alpha_i((\|l_i\| - \|r_i\|)\sin\alpha_i - y) \qquad (10) \\ &= \|l_i\|\|l_i\|\cos\gamma_i \\ &= \|l_i\|\sqrt{((\|l_i\| - \|r_i\|)\cos\alpha_i - x)^2 + ((\|l_i\| - \|r_i\|)\sin\alpha_i - y)^2 + (\|g_i\| + z)^2}\ \cos\gamma_i \end{aligned}$$

To solve Eq. (10) with respect to unknown parameter $\|l_i\|$, an inverse position solution of the manipulator can be defined as:

$$\|l_i\| = \|r_i\| + x\cos\alpha_i + y\sin\alpha_i \pm \cot\gamma_i \sqrt{(x\sin\alpha_i - y\cos\alpha_i)^2 + (\|g_i\| + z)^2} \qquad (11)$$

where the symbol "±" is selected as "+" for a larger value of $\|l_i\|$, because $\|l_i\|$ is a non-negative number, and initial positions of the slide blocks are placed outward from the symmetric center point $O_m$.

The forward position solution is obtained by solving the equations of the inverse position solution when the output variables x, y, and z are unknown parameters. By writing Eq. (11) three times (once for each i=1, 2, 3), three non-linear equations are obtained:

$$\begin{cases} \cot\gamma_1 \sqrt{(x\sin\alpha_1 - y\cos\alpha_1)^2 + (\|g_1\| + z)^2} + x\cos\alpha_1 + y\sin\alpha_1 + \|r_1\| - \|l_1\| = 0 \\ \cot\gamma_2 \sqrt{(x\sin\alpha_2 - y\cos\alpha_2)^2 + (\|g_2\| + z)^2} + x\cos\alpha_2 + y\sin\alpha_2 + \|r_2\| - \|l_2\| = 0 \\ \cot\gamma_3 \sqrt{(x\sin\alpha_3 - y\cos\alpha_3)^2 + (\|g_3\| + z)^2} + x\cos\alpha_3 + y\sin\alpha_3 + \|r_3\| - \|l_3\| = 0 \end{cases} \quad (12)$$

In accordance with the computational results of symbolic mathematical software, an analytical form of the solutions for x, y, and z exists, but the expression is complex and long. Thus, to solve the forward position configuration of the manipulator illustrated in FIGS. 1-3, numerical evaluations of Eq. (12) can also be used.

To illustrate the developments in this paper, a hypothetical manipulator with structural parameters listed in Table 1 will be assumed. Moving ranges of all joints are represented by $\|l_i\|_{min}$, $\|l_i\|_{max}$, $\|h_i\|_{min}$, $\|h_i\|_{max}$, $\theta_{i,min}$ and $\theta_{i,max}$. Numerical forward position solutions, based on Eq. (12), of the manipulator in eight configurations are listed in Table 2.

TABLE 1

Structural parameters of the Manipulator

| Parameter | Value | Parameter | Value | Parameter | Value |
| --- | --- | --- | --- | --- | --- |
| $\alpha_1$ | 90° | $\|g_i\|$ | 600 mm | $\|h_i\|_{min}$ | 1800 mm |
| $\alpha_2$ | 210° | $\|r_i\|$ | 215 mm | $\|h_i\|_{max}$ | 900 mm |
| $\alpha_3$ | 330° | $\|l_i\|_{min}$ | 600 mm | $\theta_{i,min}$ | −60° |
| $\gamma_i$ | 45° | $\|l_i\|_{max}$ | 1800 mm | $\theta_{i,max}$ | 60° |

TABLE 2

Forward position solutions of the Manipulator

| Configuration | $\|l_1\|, \|l_2\|, \|l_3\|$ (mm) | x (mm) | y (mm) | z (mm) | Solutions |
| --- | --- | --- | --- | --- | --- |
| 1 | 800, 800, 800 | 0 | 0 | −1185 | 1 |
|   |               | 0 | 0 | −15    | 2 |
| 2 | 900, 1000, 1100 | 61.58 | −98.14 | −1380.7 | 1 |
|   |                 | 61.58 | −98.14 | 180.7   | 2 |
| 3 | 1000, 1150, 1200 | 30.8 | −113.36 | −1498 | 1 |
|   |                  | 30.8 | −113.36 | 297.8 | 2 |
| 4 | 1150, 1300, 1250 | −30.08 | −81.91 | −1616 | 1 |
|   |                  | −30.08 | −81.91 | 416.5 | 2 |
| 5 | 1350, 1400, 1200 | −113.89 | 30.6 | −1699 | 1 |
|   |                  | −113.89 | 30.6 | 498.5 | 2 |
| 6 | 1500, 1450, 1250 | −110.8 | 99.49 | −1780 | 1 |
|   |                  | −110.8 | 99.49 | 580.3 | 2 |
| 7 | 1550, 1400, 1500 | 56.25 | 66.93 | −1867 | 1 |
|   |                  | 56.25 | 66.93 | 666.8 | 2 |
| 8 | 1600, 1600, 1600 | 0 | 0 | −1985 | 1 |
|   |                  | 0 | 0 | 785   | 2 |

In Table 2, the eight configurations, defined by $\|l_1\|$, $\|l_2\|$, $\|l_3\|$, were arbitrarily assumed within the moving ranges of the linear actuators. In accordance with Eq. (12), all possible solution results for x, y, and z are listed. In each configuration given by $\|l_1\|$, $\|l_2\|$, $\|l_3\|$, there are two solutions for x, y, and z. The two solutions for x and y are equal in each configuration. The first solution value for z in each configuration is smaller than the second solution value, which means that two possible position solutions of the movable platform and structure exist. These solutions are symmetric with respect to the plane $B_1B_2B_3$. Thus, the first solution can be determined as the real solution because of physical interference and of the initial positions of the subchains as shown in FIG. 4.

Workspace Evaluation

The workspace of the manipulator illustrated in FIGS. 1-3 is a basic property that reflects its working capacity. The shape and size of the workspace provides basic boundary information for related trajectory planning of applications. As indicated above, the manipulator is capable of being used in a variety of applications with a variety of functionalities and operations. In connection with the manipulator shown in FIGS. 1-3, the reachable workspace of the movable platform may be defined as the space that can be reached by the three translations of the point $O_m$ in the fixed reference frame $O_f$-$x_f y_f z_f$. The boundary of the reachable workspace is simultaneously constrained by moving ranges, physical interference and geometric constraints of all joints in the closed-loop form.

In this example, during continuous motions of the movable platform, the two parallel revolute joints $R_{i,1}$, $R_{i,2}$ of each subchain are passive joints. Furthermore, vector $h_i$ has the same intersection angles with vector $g_i$ and the axis $z_m$, where the vector $g_i$ is always parallel to the axis $z_m$ since there are no rotational outputs on the movable platform. Thus, the rotational angles $\theta_{i,u}$, $\theta_{i,d}$ of the two parallel revolute joints of each subchain are equal. The angles $\theta_{i,u}$, $\theta_{i,d}$ can be determined by the closed-loop constraint as:

$$\begin{aligned} \theta_{i,u} &= \theta_{i,d} \\ &= \arccos\left(\frac{[0 \;\; 0 \;\; 1]\overrightarrow{B_iD_i}}{\|\overrightarrow{B_iD_i}\|}\right) \end{aligned} \quad (13)$$

where $$\begin{aligned} \overrightarrow{B_iD_i} &= \overrightarrow{O_fD_i} - \overrightarrow{O_fB_i} \\ &= \begin{bmatrix} (\|r_i\| + \|h_i\|\cos\gamma_i)\cos\gamma_i + x \\ (\|r_i\| + \|h_i\|\cos\gamma_i)\sin\alpha_i + y \\ z \end{bmatrix} - \begin{bmatrix} \|l_i\|\cos\alpha_i \\ \|l_i\|\sin\alpha_i \\ -\|g_i\| \end{bmatrix} \\ &= \begin{bmatrix} (\|r_i\| + \|h_i\|\cos\gamma_i)\cos\alpha_i + x - \|l_i\|\cos\alpha_i \\ (\|r_i\| + \|h_i\|\cos\gamma_i)\sin\alpha_i + y - \|l_i\|\sin\alpha_i \\ z + \|g_i\| \end{bmatrix} \end{aligned} \quad (14)$$

The translational displacements $\|l_i\|$ ($P_{i,0}$) and $\|h_i\|$ ($P_{i,1}$) (are determined by the inverse position solution from Eqs. (11) and (9), respectively. Thus, by considering the moving ranges, physical interference and geometric constraints of all joints, the corresponding constraint equations of the reachable workspace can be obtained as:

$$\begin{cases} \|l_i\|_{min} \le \|l_i\| \le \|l_i\|_{max} \\ \|h_i\|_{min} \le \|h_i\| \le \|h_i\|_{max} \\ \theta_{i,min} \le \theta_{i,u} = \theta_{i,d} \le \theta_{i,max} \\ z \le -\|g_i\| \end{cases} \quad (15)$$

In order to evaluate the shape and size of the reachable workspace, a numerical search can be performed based on Eq.

(15). In the fixed reference frame $O_f$-$x_fy_fz_f$, if a point (x, y, z) satisfies the inequalities expressed by Eq. (15), that point can be considered as part of the reachable workspace. Thus, by searching all points on each x-y section of $O_f$-$x_fy_fz_f$, the set of the valid points is obtained, and the 3D arrangement of all valid points can be considered as the reachable workspace of the manipulator.

Figure 18:
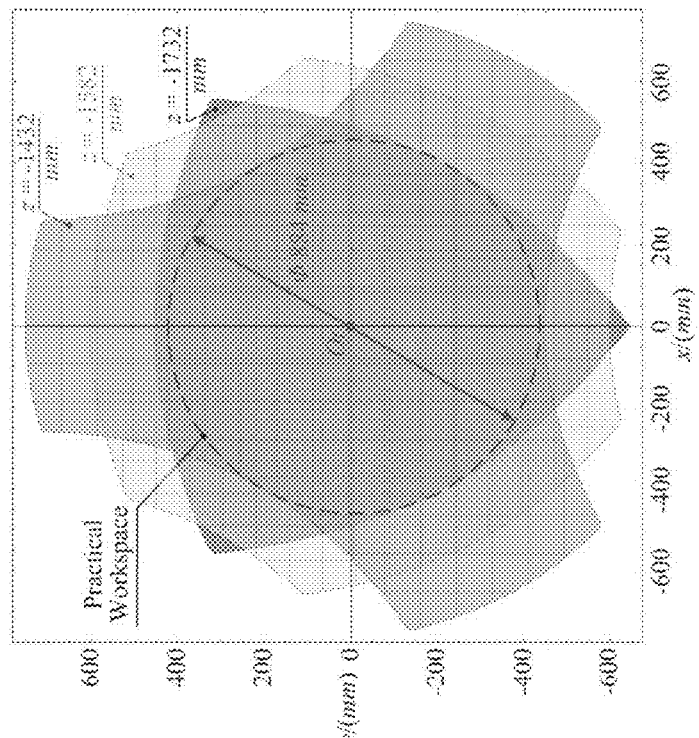
FIG. 18 is a diagram of several x-y cross-sections taken from FIG. 17 at various z values, in accordance with one aspect of the present disclosure.
Figure 17:
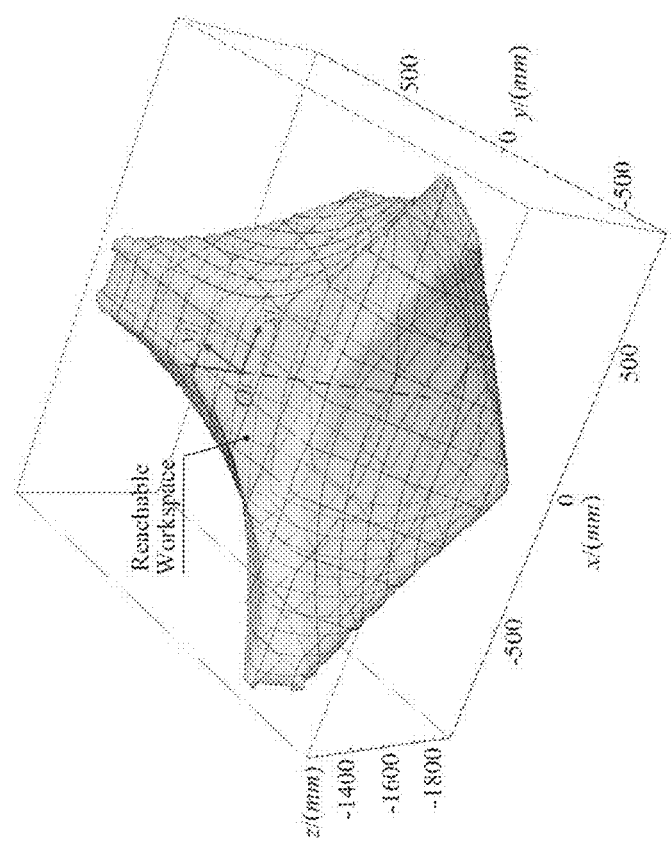
FIG. 17 is a diagram illustrating one example of a three-dimensional (3D) workspace associated with the manipulator shown in FIG. 1 with $\gamma_i$ equal to 45 degrees, in accordance with one aspect of the present disclosure.
Figure 19:
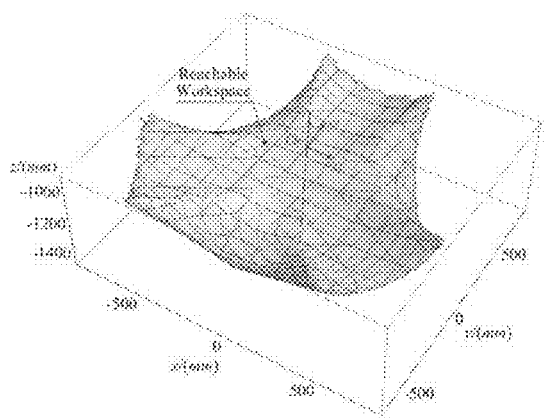
FIG. 19 is a diagram illustrating another example of a three-dimensional (3D) workspace associated with the manipulator shown in FIG. 1 with $\gamma_i$ equal to 30 degrees, in accordance with one aspect of the present disclosure.
Figure 20:
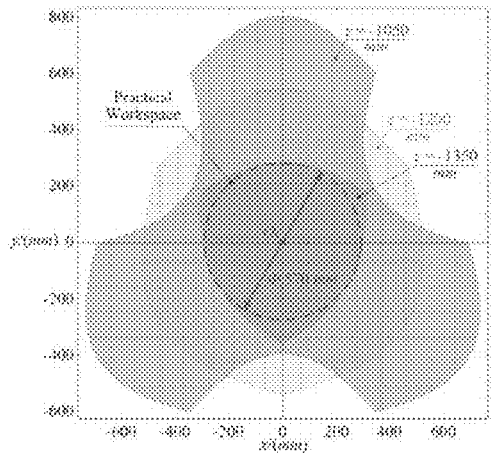
FIG. 20 is a diagram of several x-y cross-sections taken from FIG. 19 at various z values, in accordance with one aspect of the present disclosure.
Figure 21:
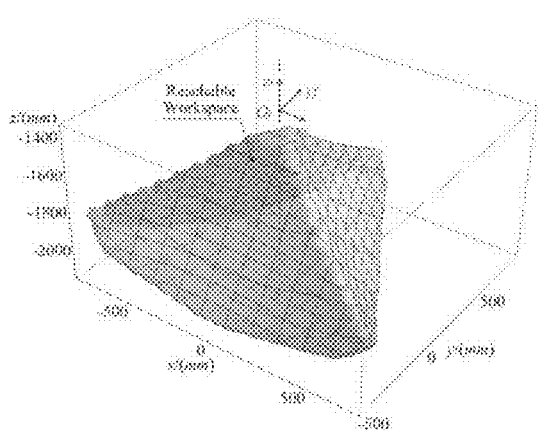
FIG. 21 is a diagram illustrating another example of a three-dimensional (3D) workspace associated with the manipulator shown in FIG. 1 with $\gamma_i$ equal to 60 degrees, in accordance with one aspect of the present disclosure.
Figure 22:
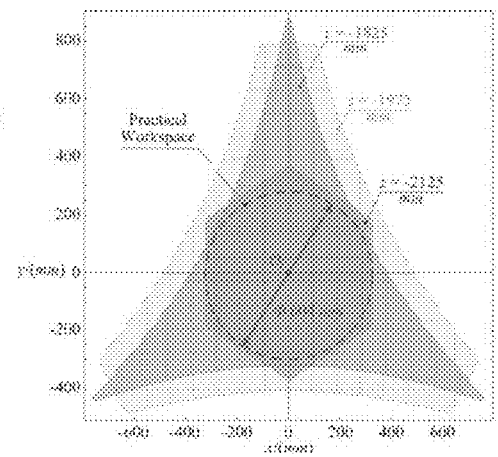
FIG. 22 is a diagram of several x-y cross-sections taken from FIG. 21 at various z values, in accordance with one aspect of the present disclosure.

As an example, the values of the structural parameters and of the moving ranges of all joints listed in Table 1 will be utilized. Based on the numerical search results in Eq. (15), the basic 3D shape and size of the reachable workspace is shown in FIG. 17. The shape of the reachable workspace is symmetric about the axis $z_f$. Extreme values of the coordinates of the reachable workspace are: x∈[−848,848], y ∈[−583,945], z ∈[−1873, −1230] (the unit is mm). In FIG. 18, three x-y sections of the reachable workspace are generated and are taken at z=−1432 mm, −1582 mm and −1732 mm. The three x-y sections have different shapes and sizes. By considering practical motion ranges of the movable platform and general applications of the manipulator, in one example, the manipulator may have a practical workspace (namely, the sub-workspace of the reachable workspace) defined in the form of a cylinder with a height of 300 mm (between two x-y sections at z=−1432 mm and −1732 mm), where the maximal diameter of the cylinder is Φ=884 mm (around a center point $O_f$).

Among all the basic structural constants $α_z$, $γ_i$, $\|g_i\|$ and $\|r_i\|$, $α_i$ determines a symmetric property of the workspace, variations of $\|g_i\|$ and $\|r_i\|$ can only change a size of the workspace (instead of the shape of the workspace), because the different lengths of the $\|g_i\|$ and $\|r_i\|$ have no influence on the constraint angles between the axes of all the joints. In the inclined planar displacement subsets of the three subchains, the intersection angle $γ_i$ determines the inclination of the triangular pyramidal constraint that can change the constraint angles between the moving direction of joint $P_{i,1}$ and the axes of joints $R_{i,1}$, $R_{i,2}$. Different constraint angles of the joints will generate workspaces of different shapes and sizes. Thus, by comparing the variation of all the basic structural constants, the variation of $γ_i$ may have the most significant influence on the workspace.

The variation range of the intersection angle is $γ_i$∈(0°,90°. In FIG. 17, the workspace is generated for $γ_i$ equal to 45°. In order to illustrate variation of the workspace for different values of $γ_i$, a numerical evaluation of the workspace is shown in FIGS. 19-22, for $γ_i$=30° and 60°. By comparing the shape and size of the three different workspaces in FIGS. 17 and 22, extreme values of the coordinates of the reachable workspace are not changed dramatically, while the maximal diameter of the cylinder of the defined practical workspace has been reduced to Φ=570 mm ($γ_i$=30°) and Φ=604 mm ($γ_i$=60°), while the height of the cylinder remains constant. Compared to the Φ=884 mm ($γ_i$=45°) in FIGS. 17 and 18, the size of the practical workspace in FIGS. 19-22 has decreased. The coordinate z of the workspace decreases with the increase of $γ_i$. Thus, by evaluating the workspace with the variation of $γ_i$, the maximal size of the practical workspace can be achieved when $γ_i$=49.8°. The cylinder of the practical workspace has the maximal diameter of Φ=908 mm and height 300 mm between the two x-y sections at z=−1895 mm and −1595 mm.

Velocity and Load Jacobian Analysis

In order to establish a stiffness model of the manipulator, all of the deformations including three rotations and three translations of the movable platform should be considered. Thus, a 6×6 overall Jacobian matrix is required for the stiffness modeling of this limited-DOF parallel manipulator. The overall Jacobian matrix includes the Jacobian of the constraints and actuations. Correspondingly, the stiffness of structural constraints and the stiffness of actuations can be included in the 6×6 overall Jacobian matrix, respectively. Based on the theory of reciprocal screws, the Jacobian of constraints and actuations are analyzed as follows.

By assuming that the deformations of the output movable platform include 6-DOF motions, the vectors for the angular and linear velocities of the movable platform can be respectively expressed in the fixed reference frame $O_f$-$x_fy_fz_f$ as:

$$\begin{cases} \omega = [\omega_{xf} \ \omega_{yf} \ \omega_{zf}]^T \\ v = [v_{xf} \ v_{yf} \ v_{zf}]^T \end{cases} \quad (16)$$

Based on the closed-loop constraint of each subchain in Eq. (7) and the non-overconstrained structure of the manipulator with five joints in each subchain, the instantaneous twist $\$_{Om}$ of the movable platform is a linear combination of the five instantaneous twists of the joints, namely:

$$\$_{Om}=[\omega^T v^T]^T=\|\dot{l}_i\|\$_{i,1}+\dot{\theta}_{i,u}\$_{i,2}+\|\dot{h}_i\|\$_{i,3}+\dot{\theta}_{i,d}\$_{i,4}+\dot{\theta}_{i,c}\$_{i,5} \quad (17)$$

where $\$_{i,j}$ (i=1, 2, 3, j=1, 2, 3, 4, 5) is a unit screw associated with the $j^{th}$ joint of the $i^{th}$ subchain. $\|\dot{l}_i\|$, $\dot{\theta}_{i,u}$, $\|\dot{h}_i\|$, $\dot{\theta}_{i,d}$, and $\dot{\theta}_{i,c}$ represent velocities of the joints. The linear combination of the instantaneous twists of each subchain is the same because the three subchains are connected to the movable platform with identical output motions.

Figure 27:
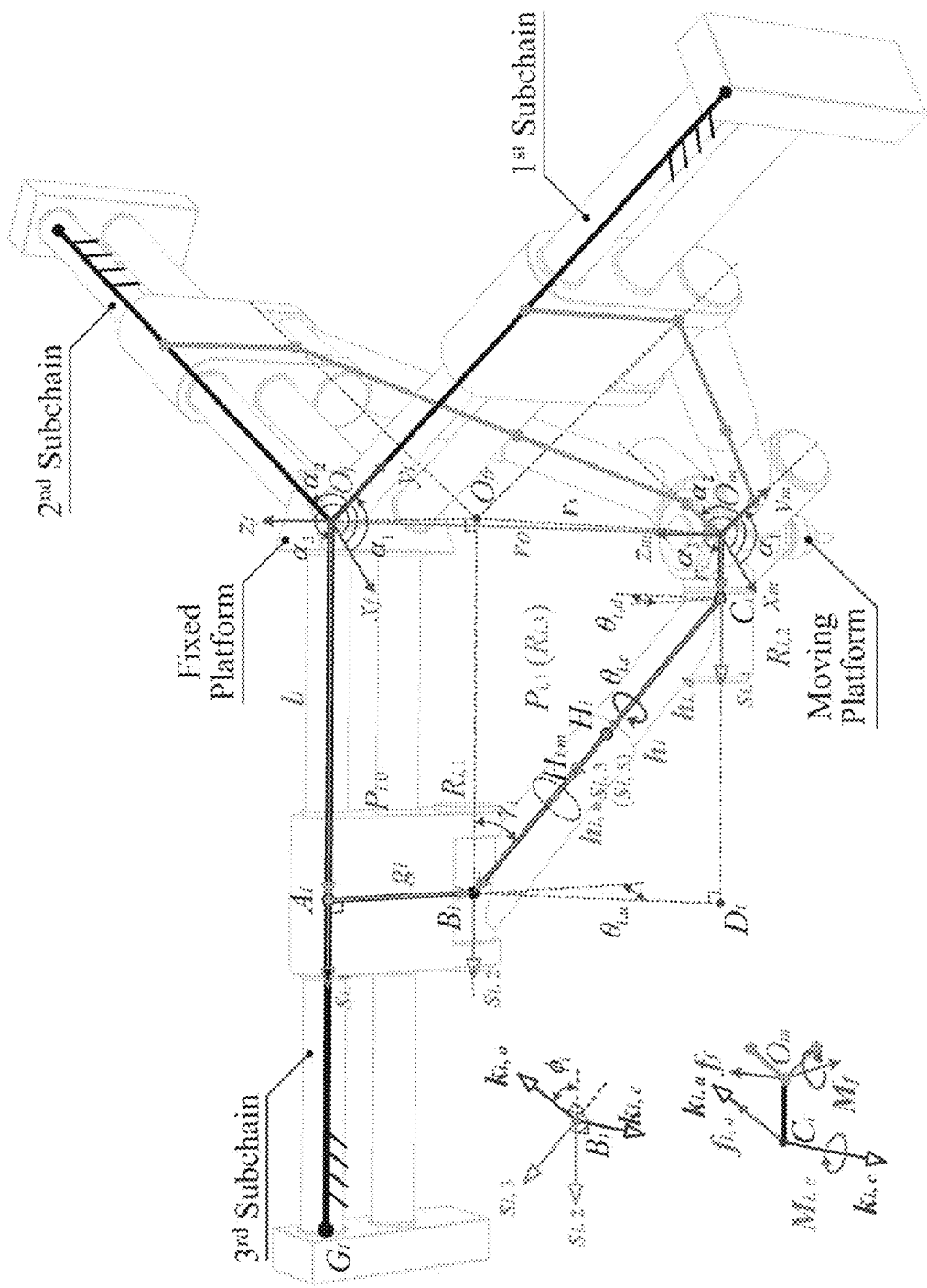
FIG. 27 is a top perspective view of one example of a translational parallel manipulator, such as the manipulator shown in FIG. 1, illustrating examples of loads on the manipulator, in accordance with one aspect of the present disclosure.

In FIG. 27, unit vector $s_{i,j}$ that is along the $j^{th}$ joint axis of the $i^{th}$ subchain is given by:

$$\begin{aligned} s_{i,1} &= s_{i,2} \\ &= s_{i,4} \\ &= \frac{l_i}{\|l_i\|} \\ &= [\cos α_i \ \sin α_i \ 0]^T \end{aligned} \quad (18)$$

$$\begin{aligned} s_{i,3} &= s_{i,5} \\ &= \frac{h_i}{\|h_i\|} \\ &= \frac{[(\|l_i\|-\|r_i\|)\cos α_i - x \ (\|l_i\|-\|r_i\|)\sin α_i - y \ -\|g_i\|-z]^T}{\sqrt{((\|l_i\|-\|r_i\|)\cos α_i - x)^2 + ((\|l_i\|-\|r_i\|)\sin α_i - y)^2 + (\|g_i\|-z)^2}} \end{aligned} \quad (19)$$

where $\|l_i\|$ can be obtained from Eq. (11). Thus, the unit screws $\$_{i,j}$ of Eq. (17) are:

$$\hat{\$}_{i,1} = \begin{bmatrix} 0 \\ s_{i,1} \end{bmatrix} \qquad (20)$$
$$= [0 \ 0 \ 0 \ \cos\alpha_i \ \sin\alpha_i \ 0]^T$$

$$\hat{\$}_{i,2} = \begin{bmatrix} s_{i,2} \\ r_s \times s_{i,2} \end{bmatrix} = \begin{bmatrix} s_{i,2} \\ \overrightarrow{O_{fr}O_m} \times s_{i,2} \end{bmatrix} = \begin{bmatrix} s_{i,2} \\ (\overrightarrow{O_{fr}O_m} + r_o) \times s_{i,2} \end{bmatrix} = \qquad (21)$$
$$[\cos\alpha_i \ \sin\alpha_i \ 0 \ -(\|g_i\|+z)^2\sin\alpha_i \ (\|g_i\|+z)^2\cos\alpha_i \ x\sin\alpha_i - y\cos\alpha_i]^T$$

$$\hat{\$}_{i,3} = \begin{bmatrix} 0 \\ s_{i,3} \end{bmatrix} = \frac{([0 \ 0 \ 0 \ (\|l_i\|-\|r_i\|)\cos\alpha_i - x \ (\|l_i\|-\|r_i\|)\sin\alpha_i - y \ -\|g_i\|-z]^T)}{\left(\sqrt{((\|l_i\|-\|r_i\|)\cos\alpha_i - x)^2 + ((\|l_i\|-\|r_i\|)\sin\alpha_i - y)^2 + (\|g_i\|+z)^2}\right)} \qquad (22)$$

$$\hat{\$}_{i,4} = \begin{bmatrix} s_{i,4} \\ 0 \times s_{i,4} \end{bmatrix} \qquad (23)$$
$$= [\cos\alpha_i \ \sin\alpha_i \ 0 \ 0 \ 0 \ 0]^T$$

$$\hat{\$}_{i,5} = \begin{bmatrix} s_{i,5} \\ r_i \times s_{i,5} \end{bmatrix} \qquad (24)$$
$$= \frac{\begin{bmatrix} (\|l_i\|-\|r_i\|)\cos\alpha_i - x \\ (\|l_i\|-\|r_i\|)\sin\alpha_i - y \\ -\|g_i\|-z \\ -\|r_i\|\sin\alpha_i(\|g_i\|+z) \\ \|r_i\|\cos\alpha_i(\|g_i\|+z) \\ \|r_i\|(x\sin\alpha_i - y\cos\alpha_i) \end{bmatrix}}{\sqrt{((\|l_i\|-\|r_i\|)\cos\alpha_i - x)^2 + ((\|l_i\|-\|r_i\|)\sin\alpha_i - y)^2 + (\|g_i\|+z)^2}}$$

In accordance with the theory of reciprocal screws, a reciprocal screw $\$_a \bigcirc \$_b$ is that the wrench $\$_a$ has no work along the twist of $\$_b$. In each subchain of the manipulator, a unit constraint screw $\$_{i,c}$ is reciprocal to all joint screws (instantaneous twist $\$_{Om}$ of the movable platform). The wrench $\$_{i,c}$ cannot activate the motions of the five joints of each subchain. Thus, based on the structural constraints of the joints in each subchain, the unit constraint screw $\$_{i,c}$ can be identified as an infinite-pitch wrench screw, namely:

$$\hat{\$}_{i,c} = \begin{bmatrix} 0 \\ k_{i,c} \end{bmatrix} \qquad (25)$$

-continued $$= \begin{bmatrix} 0 \\ \frac{s_{i,2} \times s_{i,3}}{\|s_{i,2} \times s_{i,3}\|} \end{bmatrix}$$
$$= \frac{[0 \ 0 \ 0 \ -\sin\alpha_i(\|g_i\|+z) \ \cos\alpha_i(\|g_i\|+z) \ x\sin\alpha_i - y\cos\alpha_i]^T}{\sqrt{(x\sin\alpha_i - y\cos\alpha_i)^2 + (\|g_i\|+z)^2}}$$

which represents a unit couple of constraints imposed by the joints of the $i^{th}$ subchain, and the couple is exerted on the movable platform around the direction of the unit constraint vector $k_{i,c}$. The constraint vector, $k_{i,c}$, is perpendicular to the unit vectors $s_{i,2}$ and $s_{i,3}$. The reciprocal product of the unit constraint screw $\$_{i,c}$ and of the instantaneous twist $\$_{Om}$ is:

$$\hat{\$}_{i,c} \circ \hat{\$}_{Om} = (\nabla \hat{\$}_{i,c})^T \$_{Om} \qquad (26)$$
$$= \frac{[-\sin\alpha_i(\|g_i\|+z) \ \cos\alpha_i(\|g_i\|+z) \ x\sin\alpha_i - y\cos\alpha_i \ 0 \ 0 \ 0]\$_{Om}}{\sqrt{(x\sin\alpha_i - y\cos\alpha_i)^2 - (\|g_i\|+z)^2}}$$
$$= J_{i,c}\$_{Om}$$
$$= 0$$

where the reciprocal matrix $\nabla$ is $$\nabla = \begin{bmatrix} 0 & 0 & 0 & 1 & 0 & 0 \\ 0 & 0 & 0 & 0 & 1 & 0 \\ 0 & 0 & 0 & 0 & 0 & 1 \\ 1 & 0 & 0 & 0 & 0 & 0 \\ 0 & 1 & 0 & 0 & 0 & 0 \\ 0 & 0 & 1 & 0 & 0 & 0 \end{bmatrix} \quad (27)$$

Thus, the Jacobian of constraints can be obtained from Eq. (26), which transforms the angular and linear velocities of the movable platform to 0. By considering the constraints of the three subchains, the Jacobian of the constraints is:

$$J_c = \begin{bmatrix} J_{1,c} \\ J_{2,c} \\ J_{3,c} \end{bmatrix} = \begin{bmatrix} k_{1,c}^T & 0 & 0 & 0 \\ k_{2,c}^T & 0 & 0 & 0 \\ k_{3,c}^T & 0 & 0 & 0 \end{bmatrix} \quad (28)$$

where $k_{i,c}$ is determined in Eq. (16). Each row of $J_c$ represents a unit wrench of structural constraints of a subchain, which is exerted on the movable platform. Thus, the Jacobian of constraints determines the 3-DOF translational output motions of the movable platform.

If $J_c$ is of full rank, the unique solution for $J_{i,c}\$_{Om}=0$ (Eq. (26) is $\omega$=0. Thus, based on Eqs. (17) and (20)-(24), a constraint equation can be obtained as:

$$\dot{\theta}_{i,u}s_{i,2}+\dot{\theta}_{i,d}s_{i,4}+\dot{\theta}_{i,c}s_{i,5}=0 \quad (29)$$

Since $s_{i,2}=s_{i,4}\neq s_{i,5}\neq 0$, thus, Eq. (29) can be deduced as:

$$\begin{cases} \dot{\theta}_{i,u} + \dot{\theta}_{i,d} = 0 \\ \dot{\theta}_{i,c} = 0 \end{cases} \quad (30)$$

namely, stating that rotational angles of joints $R_{i,1}$ and $R_{i,2}$ are equal, and that the added revolute joint $R_{i,3}$ has no rotation in the motions of the structure. Thus, the kinematic motions and constraints of the manipulator are not affected by the elimination of the overconstrained mechanism condition.

By assuming that the actuated joint ($P_{i,0}$) in each subchain is locked, a unit actuation screw $\$_{i,a}$ is reciprocal to all passive joint ($R_{i,1}P_{i,1}R_{i,2}R_{i,3}$) screws of the $i^{th}$ subchain. The wrench of $\$_{i,a}$ has no work on all passive joints but the actuated joint. Thus, the unit actuation screw $\$_{i,a}$ can be identified as a zero-pitch screw along the direction of the unit actuation vector $k_{i,a}$, i.e.:

$$\hat{\$}_{i,a} = \begin{bmatrix} k_{i,a} \\ r_i \times k_{i,a} \end{bmatrix} = \begin{bmatrix} \frac{k_{i,c} \times s_{i,3}}{\|k_{i,c} \times s_{i,3}\|} \\ r_i \times \left( \frac{k_{i,c} \times s_{i,3}}{\|k_{i,c} \times s_{i,3}\|} \right) \end{bmatrix} \quad (31)$$

$$= \frac{\begin{bmatrix} -\cos\alpha_i(\|g_i\| + z)^2 - \\ (x\sin\alpha_i - y\cos\alpha_i)((\|l_i\| - \|r_i\|)\sin\alpha_i - y) \\ -\sin\alpha_i(\|g_i\| + z)^2 + \\ (x\sin\alpha_i - y\cos\alpha_i)((\|l_i\| - \|r_i\|)\cos\alpha_i - x) \\ (\|g_i\| + z)(-(\|l_i\| - \|r_i\|) + x\cos\alpha_i + y\sin\alpha_i) \\ \|r_i\|\sin\alpha_i(\|g_i\| + z)(-(\|l_i\| - \|r_i\|) + x\cos\alpha_i + y\sin\alpha_i) \\ -\|r_i\|\cos\alpha_i(\|g_i\| + z)(-(\|l_i\| - \|r_i\|) + x\cos\alpha_i + y\sin\alpha_i) \\ \|r_i\|(x\sin\alpha_i - y\cos\alpha_i)((\|l_i\| - \|r_i\|) - x\cos\alpha_i - y\sin\alpha_i) \end{bmatrix}}{\sqrt{\begin{matrix} (\cos\alpha_i(\|g_i\| + z)^2 + (x\sin\alpha_i - y\cos\alpha_i)((\|l_i\| - \|r_i\|)\sin\alpha_i - y))^2 + \\ (\sin\alpha_i(\|g_i\| + z)^2 - (x\sin\alpha_i - y\cos\alpha_i)((\|l_i\| - \|r_i\|)\cos\alpha_i - x))^2 + \\ (\|g_i\| + z)^2(-(\|l_i\| - \|r_i\|) + x\cos\alpha_i + y\sin\alpha_i)^2 \end{matrix}}}$$

which represents a unit force of actuation imposed by the actuated joint of the $i^{th}$ subchain that is exerted on the movable platform along the direction of the unit actuation vector $k_{i,a}$. The vector $k_{i,a}$ perpendicular to the unit vectors $s_{i,3}$ and passes through the axes of joints $R_{i,1}$ and $R_{i,2}$. The reciprocal product of the unit actuation screw $\$_{i,a}$ and of the instantaneous twist $\$_{Om}$ is:

$$\hat{\$}_{i,a} \circ \$_{Om} = (\nabla \hat{\$}_{i,a})^T \$_{Om} \tag{32}$$

$$= \frac{-\|\dot{l}_i\|((\|g_i\|+z)^2 + (x\sin\alpha_i - y\cos\alpha_i)^2)}{\sqrt{\begin{array}{l}(\cos\alpha_i(\|g_i\|+z)^2 + (x\sin\alpha_i - y\cos\alpha_i)((\|l_i\| - \|r_i\|)\sin\alpha_i - y))^2 + \\ (\sin\alpha_i(\|g_i\|+z)^2 + (x\sin\alpha_i - y\cos\alpha_i)((\|l_i\| - \|r_i\|)\cos\alpha_i - y))^2 + \\ (\|g_i\|+z)^2(-(\|l_i\| - \|r_i\|) + x\cos\alpha_i + y\sin\alpha_i)^2\end{array}}}$$

$$= \|\dot{l}_i\| \cos\phi_i$$

$$= \|\dot{l}_i\| \cos\left(\frac{\pi}{2} - \gamma_i\right)$$

$$= \|\dot{l}_i\| k_{i,a}^T s_{i,2}$$

namely, $$J_{i,ar}\$_{Om} = \begin{bmatrix} \frac{(r_i \times k_{i,a})^T}{k_{i,a}^T s_{i,2}} & \frac{k_{i,a}^T}{k_{i,a}^T s_{i,2}} \end{bmatrix} \$_{Om} \tag{33}$$

$$= \frac{\begin{bmatrix} \|r_i\|\sin\alpha_i(\|g_i\|+z)(-(\|l_i\|-\|r_i\|)+x\cos\alpha_i+y\sin\alpha_i) \\ -\|r_i\|\cos\alpha_i(\|g_i\|+z)(-(\|l_i\|-\|r_i\|)+x\cos\alpha_i+y\sin\alpha_i) \\ \|r_i\|((x\sin\alpha_i-y\cos\alpha)((\|l_i\|-\|r_i\|)-x\cos\alpha_i-y\sin\alpha_i) \\ -\cos\alpha_i(\|g_i\|+z)^2-(x\sin\alpha_i-y\cos\alpha_i)((\|l_i\|-\|r_i\|)\sin\alpha_i-y) \\ -\sin\alpha_i(\|g_i\|+z)^2+(x\sin\alpha_i-y\cos\alpha_i)((\|l_i\|-\|r_i\|)\cos\alpha_i-x) \\ (\|g_i\|+z)(-(\|l_i\|-\|r_i\|)+x\cos\alpha_i+y\sin\alpha_i) \end{bmatrix}^T \$_{Om}}{-(\|g_i\|+z)^2-(x\sin\alpha_i-y\cos\alpha_i)^2}$$

$$= \|\dot{l}_i\|$$

Thus, the Jacobian of actuations is determined by Eq. (33), which transforms the angular and linear velocities of the movable platform to the linear input velocity $\|\dot{l}_i\|$ of the actuator. By considering the motions of the three subchains, the Jacobian of actuations assumes the form:

$$J_{ar} = \begin{bmatrix} J_{1,ar} \\ J_{2,ar} \\ J_{3,ar} \end{bmatrix} \tag{34}$$

$$= \begin{bmatrix} \frac{(r_1 \times k_{1,a})^T}{k_{1,a}^T s_{1,2}} & \frac{k_{1,a}^T}{k_{1,a}^T s_{1,2}} \\ \frac{(r_2 \times k_{2,a})^T}{k_{2,a}^T s_{2,2}} & \frac{k_{2,a}^T}{k_{2,a}^T s_{2,2}} \\ \frac{(r_3 \times k_{3,a})^T}{k_{3,a}^T s_{3,2}} & \frac{k_{3,a}^T}{k_{3,a}^T s_{3,2}} \end{bmatrix}$$

$$= \begin{bmatrix} \frac{(r_1 \times k_{1,a})^T}{\cos\left(\frac{\pi}{2}-\gamma_1\right)} & \frac{k_{1,a}^T}{\cos\left(\frac{\pi}{2}-\gamma_1\right)} \\ \frac{(r_2 \times k_{2,a})^T}{\cos\left(\frac{\pi}{2}-\gamma_2\right)} & \frac{k_{2,a}^T}{\cos\left(\frac{\pi}{2}-\gamma_2\right)} \\ \frac{(r_3 \times k_{3,a})^T}{\cos\left(\frac{\pi}{2}-\gamma_3\right)} & \frac{k_{3,a}^T}{\cos\left(\frac{\pi}{2}-\gamma_3\right)} \end{bmatrix}$$

where the last three columns are dimensionless, while the first three columns are related to the length of $r_i$. It is necessary to homogenize the units of the Jacobian of actuations for which the stiffness matrix and performance index are invariant with respect to the length unit. Thus, the dimensionally homogeneous Jacobian of actuations can be expressed as:

$$J_a = \begin{bmatrix} J_{1,a} \\ J_{2,a} \\ J_{3,a} \end{bmatrix} = \begin{bmatrix} \frac{(r_1 \times k_{1,a})^T}{k_{1,a}^T s_{1,2}\|r_1\|} & \frac{k_{1,a}^T}{k_{1,a}^T s_{1,2}} \\ \frac{(r_2 \times k_{2,a})^T}{k_{2,a}^T s_{2,2}\|r_2\|} & \frac{k_{2,a}^T}{k_{2,a}^T s_{2,2}} \\ \frac{(r_3 \times k_{3,a})^T}{k_{3,a}^T s_{3,2}\|r_3\|} & \frac{k_{3,a}^T}{k_{3,a}^T s_{3,2}} \end{bmatrix} \tag{35}$$

In accordance with the Jacobian of constraints and actuations, the overall velocity transformation from the output movable platform to the input actuated joint of each subchain is:

$$J_i \$_{Om} = \begin{bmatrix} J_{i,a} \\ J_{i,c} \end{bmatrix} \$_{Om} = \begin{bmatrix} \|\dot{l}_i\| \\ 0 \end{bmatrix} \tag{36}$$

Thus, the 6×6 overall Jacobian matrix of the manipulator is given by:

$$J = \begin{bmatrix} J_a \\ J_c \end{bmatrix} = [\, J_{1,a} \quad J_{2,a} \quad J_{3,a} \quad J_{1,c} \quad J_{2,c} \quad J_{3,c} \,]^T \tag{37}$$

which includes all of the basic constraints and actuations of the manipulator.

As far as the kinetostatic analysis of the manipulator is concerned, the relationship between input forces of the three linear actuators and output force acting on the movable platform can be expressed respectively in vector form as:

$$\begin{cases} f_a = [\, \|f_{1,a}\| \quad \|f_{2,a}\| \quad \|f_{3,a}\| \,]^T \\ f_f = [\, f_{xf} \quad f_{yf} \quad f_{zf} \,]^T \end{cases} \tag{38}$$

where the directions of the three input forces $\|f_{1,a}\|$, $\|f_{2,a}\|$ and $\|f_{3,a}\|$ are along the moving directions of the actuated prismatic joints respectively, while the output force is the resultant force of the three axial forces acting at the center point of the movable platform. Based on the principle of virtual work, the relations between the input-output forces can be expressed as:

$$f_f^T \Delta O_m = f_a^T \Delta l \tag{39}$$

where the virtual linear displacements of the actuators and of the movable platform are:

$$\begin{cases} \Delta l = [\, \Delta l_1 \quad \Delta l_2 \quad \Delta l_3 \,]^T \\ \Delta O_m = [\, \Delta x_{Om} \quad \Delta y_{Om} \quad \Delta z_{Om} \,]^T \end{cases} \tag{40}$$

In accordance with the differential motions and the Jacobian matrix of velocities, the relationships between the input-output virtual displacements are:

$$\Delta l = J \Delta O_m \tag{41}$$

By substituting Eq. (25) into Eq. (23), the relationships between the input-output forces can be obtained as:

$$f_f = J^T f_a \tag{42}$$

where $J^T$ is the Jacobian matrix of loads that can be used to evaluate the static forces of the linear actuators.

Singularity Analysis

In the motions of the manipulator illustrated in FIGS. 1-3, there are some instantaneous poses of the structure that can induce uncontrollable DOF of the movable platform. The instantaneous poses are singularities of the manipulator. To ensure controllability and continuous motions of the movable platform in the reachable workspace, the determination and elimination of singularities is necessary for the kinematic performance analysis of the manipulator. Based on the analysis of the Jacobian matrix in Eqs. (18) and (19), there are four possible kinds of singularities that can be identified. These are:

1) If $J_l$ is not full rank and $J_{Om}$ is invertible, namely, det$(J_l)$=0, det$(J_{Om})\neq 0$, the poses are inverse kinematic singularities and the movable platform will lose one or more DOF. This kind of singularity cannot happen in the manipulator since the structural constant $\gamma_i \neq 0$, so that $J_l$ is always full rank in the manipulator.

2) If $J_{Om}$ is not full rank and $J_l$ is invertible, namely, det$(J_{Om})$=0, det$(J_l)\neq 0$, the poses result in forward kinematic singularities. The movable platform will gain one or more DOF even when all actuators are locked. This kind of singularity can happen when $J_{1,Om}$, $J_{2,Om}$ and $J_{3,Om}$ are linearly dependent, namely, two or three vectors $h_i$ are parallel to one another, or the three vectors $h_i$ lie in a common plane. In the structural configuration of the manipulator illustrated in FIGS. 1-3, two or three vectors $h_i$ cannot be parallel to one another since $\gamma_i \neq 90°$ in the triangular pyramidal constraint. Furthermore, the three vectors $h_i$ cannot lie in a common plane, because of the physical interference between the guide members of the three linear actuators and the links in the star form arrangement. Thus, this kind of singularity is eliminated by the manipulator.

3) If det$(J_l)$=det$(J_{Om})$=0, the poses are combined kinematic singularities. This also cannot happen based on the above analysis.

4) If the movable platform has any rotations, the poses are constraint kinematic singularities. The design of the manipulator is developed based on displacement group theory. The continuous translational motions of the movable platform are verified by the intersection operation of the displacement subsets in Eq. (3). The rotations of the movable platform are eliminated by the triangular pyramidal constraint between the three subchains. Hence, this kind of singularity is also eliminated by the constant constraints.

Figure 23:
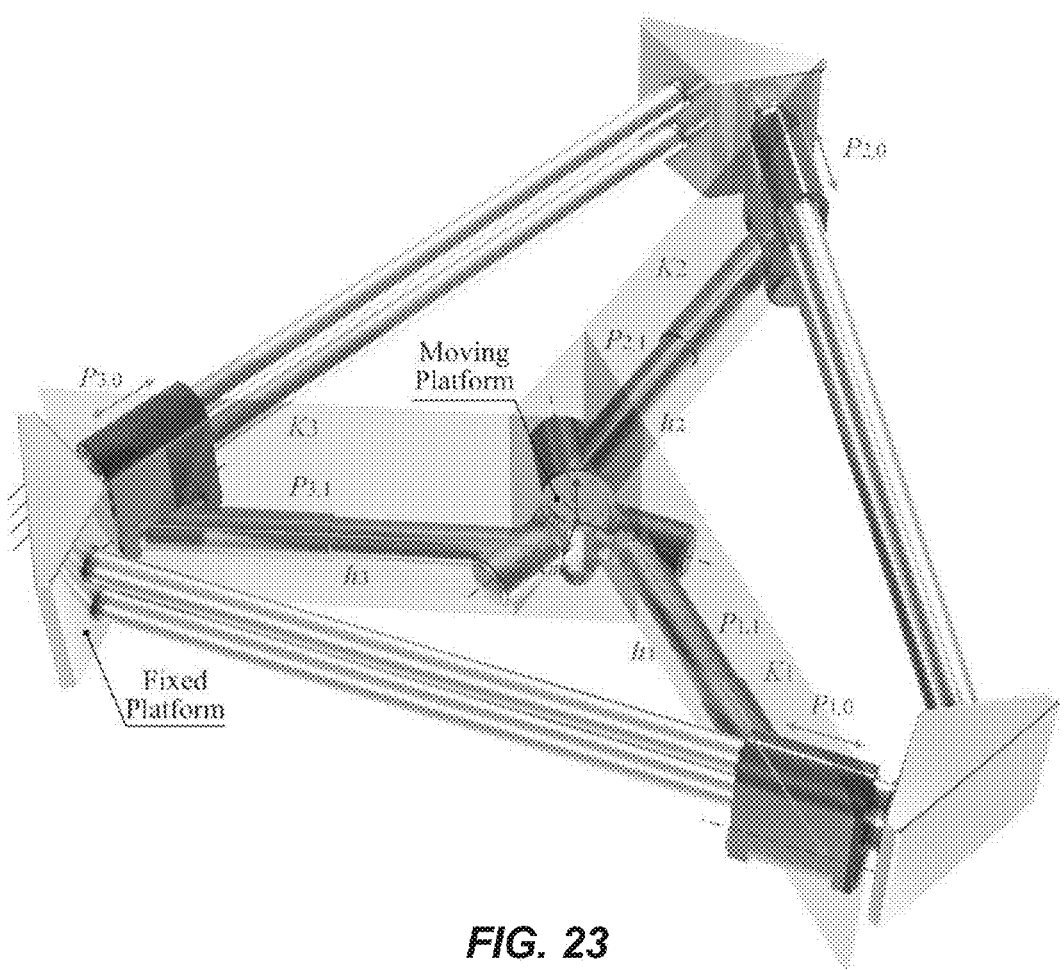
FIG. 23 is a top perspective view of another example of a translational parallel manipulator illustrating a forward kinematic singularity, in accordance with one aspect of the present disclosure.

In the structural design of the manipulator with the three inclined planar displacement subsets ($\gamma_i \in (0°, 90°)$, a unique singularity pose is encountered when the three vectors $h_i$ lie in a common plane as the forward kinematic singularity. The guide members of the three linear actuators should be arranged in a triangular form, and the moving directions of three prismatic joints $P_{1,1}$, $P_{2,1}$, $P_{3,1}$ are parallel to a common plane $x_m O_m y_m$ as shown in FIG. 23.

In the forward kinematic singularity, the structure gains an additional instantaneous DOF. If the three linear actuators $P_{1,0}$, $P_{2,0}$, $P_{3,0}$ are locked, an instantaneous translational motion of the movable platform still exists along the axis $z_m$, because the constraint planes $K_1$, $K_2$, $K_3$ of the three subchains' inclined planar displacement subsets are perpendicular to the common plane $x_m O_m y_m$ instantaneously (det$(J_{Om})$= 0). This is an uncontrollable DOF of the structure in the forward kinematic singularity configuration.

In the manipulator illustrated in FIGS. 1-3, the guide members of the three linear actuators are arranged in a star form. Thus, the unique singularity configuration in FIG. 23 is avoided. Based on the above analysis, all kinds of kinematic singularities are eliminated in the structural design of the manipulator illustrated in FIGS. 1-3, which is a fully singularity-free design in the reachable workspace.

Isotropy Analysis

Figure 24:
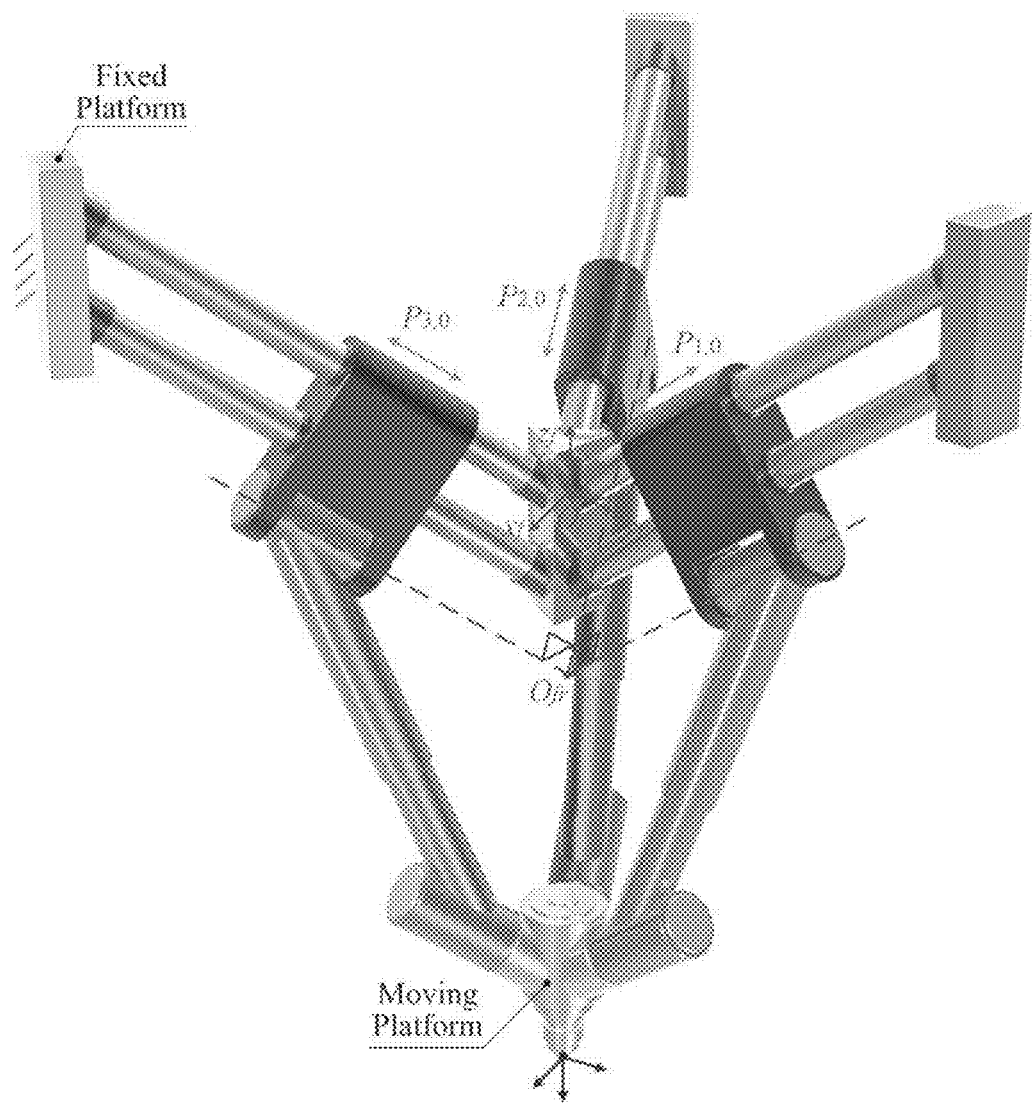
FIG. 24 is a top perspective view of another example of a translational parallel manipulator, in accordance with one aspect of the present disclosure.

As far as the kinematic performance of the manipulator is concerned, isotropy of the structure is frequently used to evaluate the output motions and forces of the movable platform. In the isotropic configurations of the structure, the velocity or force transmission of the manipulator are identical in all motion directions of the movable platform. In accordance with the definition of isotropy of parallel manipulators, the isotropic configuration of the manipulator is dependent on the condition number of the Jacobian matrix J that can be expressed as:

$$\kappa = \sqrt{\text{Max}(\lambda(J^{-T}J^{-1}))} \quad (43)$$

where $\text{Max}(\lambda(J^{-1}J^{-1}))$ denotes the largest eigenvalues of the matrix $J^{-T}J^{-1}$. The Jacobian matrix is variable and dependent on the position of the movable platform. In the reachable workspace, if the condition number of the Jacobian matrix is infinity, the manipulator will be in singularity poses. On the contrary, if the condition number is equal to 1, the manipulator possesses an isotropic configuration. In the isotropic configurations, the Jacobian matrix J should satisfy:

$$JJ^T = \begin{bmatrix} 1 & 0 & 0 \\ 0 & 1 & 0 \\ 0 & 0 & 1 \end{bmatrix} \quad (44)$$

namely, $$\begin{cases} J_i J_i^T = 1, & i = j \\ J_i J_j^T = 0, & i \neq j \end{cases} \quad (45)$$

which can be considered as the isotropy conditions for an isotropic manipulator. In accordance with Eq. (45), three vectors $J_1$, $J_2$ and $J_3$ should be perpendicular to one another in the isotropic configurations. Thus, the moving directions of the three actuated prismatic joints $P_{1,0}$, $P_{2,0}$, $P_{3,0}$ should be perpendicular to one another, namely, the guide members of the three actuators are arranged in an orthogonal form. The isotropic structural configuration of the manipulator is shown in FIG. 24, where the isotropic configurations happen when the movable platform is moving along the axis $z_f$ in the reachable workspace. FIG. 24 also illustrates another example of a manipulator with the guide members not co-planar, but rather angling downward from a fixed end of each guide toward a middle or intersection of the three guide members.

Dexterity Analysis

In addition to the isotropic property of the manipulator, the dexterity of the manipulator is also an important property. The dexterity of a manipulator is the ability that the manipulator can generate output motions and forces in arbitrary directions. The frequently used index of dexterity is the kinematic manipulability that can be expressed by the square root of the determinant of $JJ^T$ as:

$$m = \sqrt{\det(JJ^T)} \quad (46)$$

The kinematic manipulability is variable with the position of the movable platform in the reachable workspace. The different values of the kinematic manipulability indicate how close the manipulator is to the singularity poses. A value of m=0 corresponds to a singularity pose of the manipulator. Thus, the distribution of the kinematic manipulability should be determined in the reachable workspace to identify the kinematic performance of the manipulator.

Figures 25, 26:
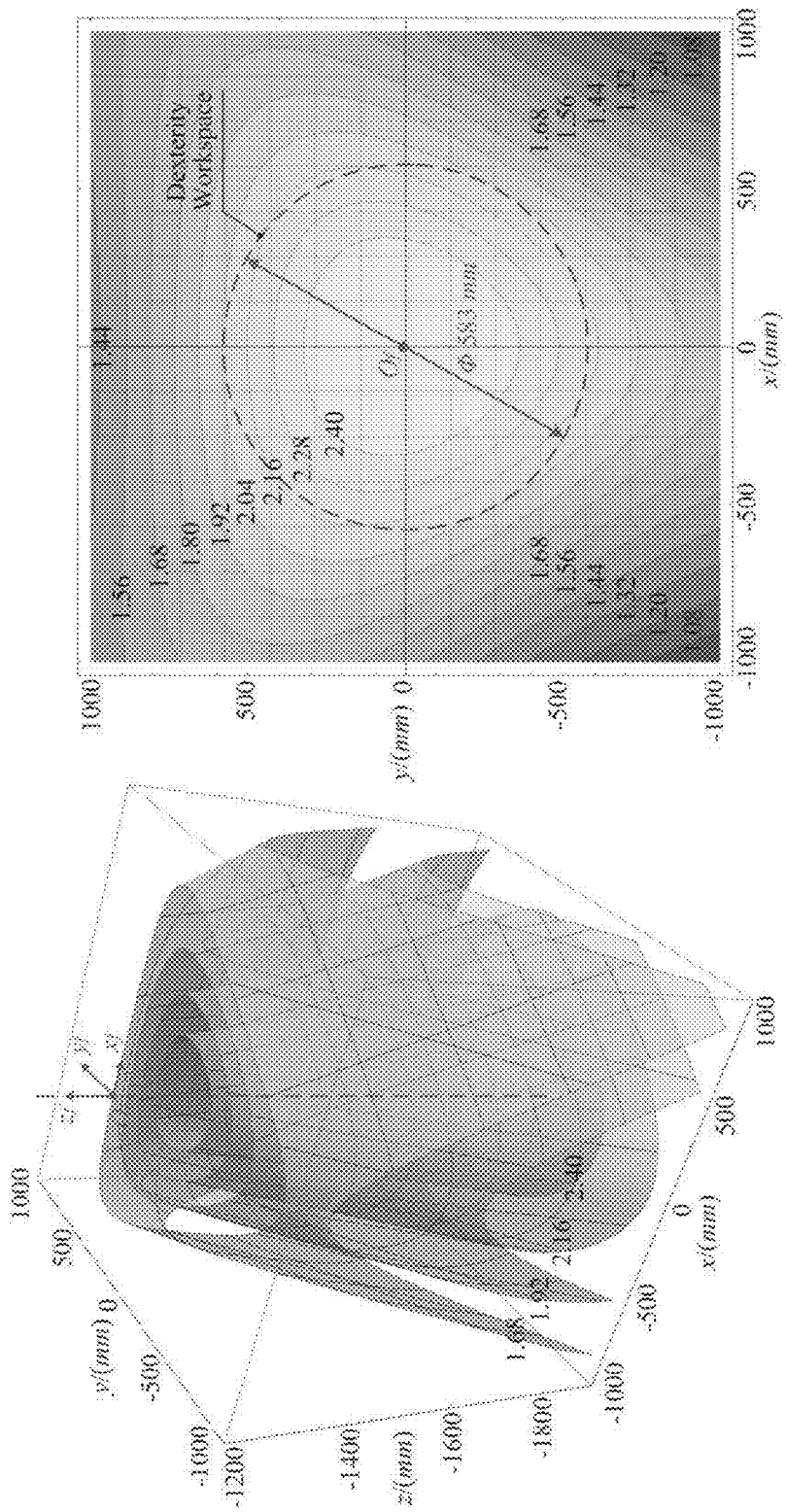
FIG. 25 is a diagram of one example of a three-dimensional distribution of kinematic manipulability of one example of a translational parallel manipulator such as the example shown in FIG. 1, in accordance with one aspect of the present disclosure.
FIG. 26 is a diagram of several x-y cross-sections taken from FIG. 25 at various z values, in accordance with one aspect of the present disclosure.

As an example, based on Eq. (46) and the structural parameters in Table 1, the kinematic manipulability distribution can be obtained as shown in FIGS. 25 and 26. The contour of the kinematic manipulability is symmetric about the axis $z_f$. The values of the manipulability decrease from the axis $z_f$ toward the outer limits of the workspace and increase along the negative direction of the axis $z_f$. Thus, by assuming a kinematic manipulability of m≥2.00, the dexterity workspace can be defined in a cylinder with a maximal diameter of Φ=583 mm and height 300 mm between the two x-y sections at the z=−1732 mm and −1432 mm. This corresponds to a subset of the manipulator's practical workspace as shown in FIGS. 17 and 18.

The present disclosure presents a 3-DOF translational parallel manipulator that resolves and/or improves upon the disadvantages of existing developed 3-DOF translational parallel manipulators. In one example, with respect to FIGS. 1-3, an inclined planar displacement subset is defined and constrained in a triangular pyramidal constraint form in the structural design. In this manipulator, all actuations are fixed, each subchain of the manipulator includes four 1-DOF joints, the size of the movable platform is reduced and minimal, the three translational motions are decoupled, the overconstrained mechanism can be eliminated, the inverse and forward position solutions are analyzed, the workspace is evaluated with the variation of structural parameters, the reachable and practical workspaces are defined, the maximal practical workspace is obtained in a cylinder according to the optimized structural parameters, the related velocity and load Jacobian matrices are built, the manipulator is singularity free, and the isotropic configuration and the dexterity workspace are evaluated by the analysis of the Jacobian matrix.

Stiffness Analysis of a Subchain

Once the stiffness model is obtained, stiffness performance can be evaluated by extreme eigenvalues of the output stiffness matrix, because the output stiffness in an arbitrary direction is defined by the minimal and maximal eigenvalues of the stiffness matrix in a given pose. Hence, the distribution of the output stiffness can be characterized by the distribution of the minimal and maximal eigenvalues in the manipulator's reachable workspace. By considering the variations of the structural parameters and the distribution of the output stiffness, the minimal stiffness workspace can be obtained through numerical optimization. This information provides basic design constraints for the parameters of the manipulator.

The stiffness of all links, joints, actuators, fixed and movable platforms are included in the stiffness model of the manipulator. In accordance with the analysis of the overall Jacobian matrix, in each subchain the actuation screw $\$_{i,a}$ imposes an actuation force $f_{i,a}$ at point $C_i$ of the movable platform along the directions of $k_{i,a}$, while the constraint screw $\$_{i,c}$ exerts a constraint couple $M_{i,c}$ at point $C_i$ of the movable platform around the direction of $k_{i,c}$ as shown in FIG. 27. Thus, overall deformations of each subchain are simultaneously generated by the actuation force $f_{i,a}$ and the constraint couple $M_{i,c}$.

Figure 28:
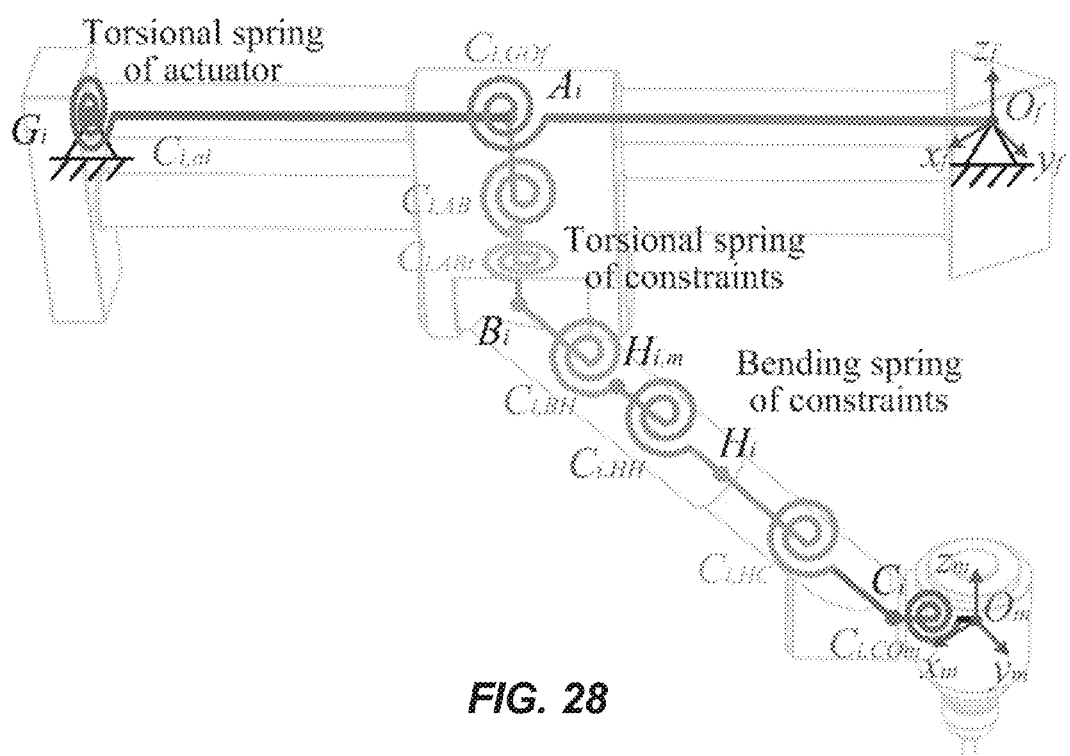
FIG. 28 is a top perspective view of a portion of one example of a translational parallel manipulator, such as the manipulator shown in FIG. 1, illustrating one example of an equivalent spring structure of the portion, in accordance with one aspect of the present disclosure.

In FIG. 28, stiffness of a subchain can be considered as a serial connection of springs representing the stiffness of all links. Thus, by considering the effects of the actuation force and of the constraint couple, five components of the equivalent springs of a subchain can be identified:

(1) If a lead screw is used, a torsional spring can be used to represent the stiffness of actuation. The rotational deformation of the actuator can be transformed as a linear deformation along the guide member. The compliance of the torsional spring is denoted by $C_{i,al}$. Equivalently, if a linear motor is used for actuation, a tensional spring is used to represent the stiffness of actuation. The linear deformation is along the guide member without a displacement transformation between the rotation and translation.

(2) In the guide member $O_fG_i$, a bending spring is used to represent the stiffness of the part of the fixed platform. The corresponding compliance is $C_{i,GOf}$.

(3) In the slide block $A_iB_i$, a bending spring and a torsional spring are used to represent the stiffness of the slide block of the prismatic joint $P_{i,0}$. Here torsional deformation occurs when the vectors $h_i$ is moving away from the plane $A_iB_iG_i$. The compliances of the bending and torsional springs are denoted as $C_{i,AB}$ and $C_{i,ABt}$, respectively.

(4) In the prismatic joint $P_{i,1}$, the guide member and the slide block have different bending stiffnesses. Thus, the equivalent spring between the points $B_i$ and $C_i$ can be separated into three parts, namely guide member $B_iH_{i,m}$, slide block $H_iC_i$ and $H_{i,m}H_i$ (overlapping part between the guide member and the slide block). The compliances of $B_iH_{i,m}$, $H_iC_i$ and $H_{i,m}H_i$ are denoted as $C_{i,BH}$, $C_{i,HC}$ and $C_{i,HH}$, respectively.

(5) In the link $C_iO_m$, a bending spring is used to represent the stiffness of the part of the movable platform. The compliance of the link is denoted as $C_{i,COm}$.

Tensional and compressional stiffnesses (along the direction of vector $h_i$) do not exist in the prismatic joint $P_{i,1}$ because $P_{i,1}$ is a passive joint, and the actuation force $f_{i,a}$ is perpendicular to the vector $h_i$. Similarly, there is no torsional compliance around the vector $h_i$ since the direction of the constraint couple $M_{i,c}$ is perpendicular to the vector $h_i$, and $\theta_{ci}=0$. Thus, in a subchain, there are a total two torsional springs and six bending springs that can be used to represent the equivalent spring structure. In the static balance of the equivalent spring structure, the deformations of a subchain include the deformations of actuation and constraints as shown in FIGS. 29$a$ and 29$b$. The compliance of each spring can be deduced as follows.

In the case of lead screw in the $i^{th}$ subchain, the torque $\tau_{i,a}$ of the actuator can be expressed as:

$$\tau_{i,a} = K_{i,\alpha a}\Delta\alpha_{i,a} \qquad (47)$$

where $K_{i,\alpha a}$ and $\Delta\alpha_{i,a}$ represent the torsional stiffness and angular deformation of the actuator. By considering the torque transmission of the lead screw, the actuation force $f_{i,al}$ is acting on the slide block $A_iB_i$ and along the guide member $O_fG_i$, which can be deduced as:

$$\|f_{i,al}\| = \frac{2\tau_{i,a}}{d_{i,a}\tan(\lambda_{i,a}+\psi_{i,a})} \qquad (48)$$

$$\begin{cases} \lambda_{i,a} = \tan^{-1}\left(\frac{L_{i,a}}{\pi d_{i,a}}\right) \\ \psi_{i,a} = \tan^{-1}\left(\frac{\mu_{i,c}}{\cos\alpha_{i,t}}\right) \end{cases} \qquad (49)$$

where $d_{i,a}$ and $L_{i,a}$ represent the pitch diameter and lead of the lead screw respectively. $\lambda_{i,a}$ and $\lambda_{i,a}$ are $\psi_{i,a}$ the lead angle and the friction angle of the lead screw respectively, while $\alpha_{i,t}$ and $\mu_{i,c}$ are the radial angle of the thread and the coefficient of friction between the screw and nut. In FIG. 29$a$, the linear displacement of the slide block $A_iB_i$ is:

$$\Delta l_i = L_{i,a}\Delta\alpha_{i,a} \qquad (50)$$

which is induced by the angular deformation of the actuator.

Thus, the compliance of the torsional spring of the actuation can be deduced from Eqs. (47)-(50) as:

$$C_{i,al} = \frac{\Delta l_i}{\|f_{i,al}\|} = \frac{L_{i,a}d_{i,a}\tan(\lambda_{i,a}+\psi_{i,a})}{2K_{i,\alpha a}} \qquad (51)$$

In FIG. 29$b$, based on the deformation of the constraints, the bending compliance of the guide member $O_fG_i$ is:

$$C_{i,GOf} = \frac{\Delta\varphi_{i,GOf}}{\|M_{i,c}\|} = \qquad (52)$$

$$\frac{(\|l_i\|_{max}-\|l_i\|_{min})^2 - 3(\|l_i\|-\|l_i\|_{min})^2 - 3(\|l_i\|_{max}-\|l_i\|)^2}{6EI_{ik,GOf}(\|l_i\|_{max}-\|l_i\|_{min})}$$

where $\Delta\varphi_{i,GOf}$ is the angular deformation of the guide member $O_fG_i$, $\|l_i\|_{min}$ and $\|l_i\|_{max}$ represent the moving range of the slide block $A_iB_i$, E is Young's modulus of elasticity, and $I_{ik,GOf}$ is the moment of inertia of the guide member $O_fG_i$ along the direction $k_{i,c}$.

In the slide block $A_iB_i$ the angular deformation (around $k_{i,c}$) that is induced by the constraint couple $M_{i,c}$ can be decomposed into $\Delta\varphi_{i,AB}$ (perpendicular to the vector $g_i$ for the bending stiffness) and $\Delta\varphi_{i,ABt}$ (around the vector $g_i$ for the torsional stiffness). Thus, the bending and torsional compliances of the slide block $A_iB_i$ can be respectively represented by:

$$C_{i,AB} = \frac{\Delta\varphi_{i,AB}}{\|M_{i,c}\|} = \frac{\|g_i\|\|k_{i,c}^T[-\sin\alpha_i \quad \cos\alpha_i \quad 0]^T\|}{EI_{ik,AB}} \qquad (53)$$

$$C_{i,ABt} = \frac{\Delta\varphi_{i,ABt}}{\|M_{i,c}\|} = \frac{\|g_i\|\|k_{i,c}^T[0 \quad 0 \quad 1]^T\|}{GI_{ip,AB}} \qquad (54)$$

where G is the shear modulus of elasticity, $I_{ik,AB}$ and $I_{ip,AB}$ are the moment of inertia and polar moment of inertia of the slide block $A_iB_i$, respectively.

Similarly, the bending compliances of $B_iH_{i,m}$, $H_{i,m}H_i$ and $H_iC_i$ can be respectively determined as:

$$C_{i,BH} = \frac{\Delta\varphi_{i,BH}}{\|M_{i,c}\|} = \frac{\|h_i\| - \overrightarrow{H_{i,m}C_i}}{EI_{ik,BH}} = \frac{\|h_i\|-\|h_{i,d}\|}{EI_{ik,BH}} \qquad (55)$$

$$C_{i,HH} = \frac{\Delta\varphi_{i,HH}}{\|M_{i,c}\|} = \frac{\|h_i\| - \overrightarrow{H_{i,m}C_i} - \overrightarrow{B_iH_i}}{EI_{ik,HH}} = \frac{\|h_{i,d}\|+\|h_{i,u}\|-\|h_i\|}{EI_{ik,HH}} \qquad (56)$$

$$C_{i,HC} = \frac{\Delta\varphi_{i,HC}}{\|M_{i,c}\|} = \frac{\|h_i\| - \overrightarrow{B_iH_i}}{EI_{ik,HC}} = \frac{\|h_i\|-\|h_{i,u}\|}{EI_{ik,HC}} \qquad (57)$$

The bending compliance of link $C_iO_m$ is:

$$C_{i,COm} = \frac{\Delta\varphi_{i,COm}}{\|M_{i,c}\|} = \frac{\|r_i\|}{EI_{ik,COm}} \qquad (58)$$

Thus, in the serial connection of the springs, the equivalent stiffness of a subchain can be respectively determined as the stiffness of the actuation and constraints as:

$$K_{i,al} = C_{i,al}^{-1} = \frac{\|f_{i,al}\|}{\Delta l_i}$$
$$= \frac{2K_{i,aa}}{L_{i,a}d_{i,a}\tan(\lambda_{i,a}+\psi_{i,a})}$$

$$K_{i,c} = C_{i,c}^{-1} = \frac{\|M_{i,c}\|}{\Delta \varphi_{i,c}}$$
$$= (C_{i,GOf} + C_{i,AB} + C_{i,ABt} + C_{i,BH} + C_{i,HH} + C_{i,HC} + C_{i,COm})^{-1}$$

(59)

(60)

By combining the equivalent stiffnesses of the three subchains in the closed-loop form, the overall stiffness of the manipulator can be obtained and analyzed.

Stiffness Matrix Determination of the Manipulator

In order to establish the stiffness model of the manipulator, the overall stiffness of the three subchains can be analyzed by the load/displacement ratio of the movable platform. By assuming that there are no preloads and gravity effects on the structure, the output force and torque exerted on the movable platform are:

$$\begin{cases} f_f = [\, f_{xf} \quad f_{yf} \quad f_{zf}\,]^T \\ M_f = [\, M_{xf} \quad M_{yf} \quad M_{zf}\,]^T \end{cases} \quad (61)$$

which can be expressed as an output wrench $w_f = [f_f^T M_f^T]^T$. In the fixed reference frame $O_f$-$x_f y_f z_f$, the infinitesimal translational and rotational deformations of the movable platform caused by $w_f$ are:

$$\Delta O_m = [\Delta x_{Om} \Delta y_{Om} \Delta z_{Om} \Delta \theta_{xf} \Delta \theta_{yf} \Delta \theta_{zf}]^T \quad (62)$$

The input force and torque that are caused by actuations and constraints of the three subchains can be respectively expressed as:

$$\begin{cases} f_a = [\, \|f_{1,a}\| \quad \|f_{2,a}\| \quad \|f_{3,a}\|\,]^T \\ M_c = [\, \|M_{1,c}\| \quad \|M_{2,c}\| \quad \|M_{3,c}\|\,]^T \end{cases} \quad (63)$$

In accordance with the differential motions of the structure and the Jacobian of actuations and constraints, the output infinitesimal deformations of the movable platform can be respectively transformed as the input deformations of the actuators and the constrained subchains. Thus, the infinitesimal translational and rotational deformations of the actuators and of the constrained subchains are respectively deduced as:

$$\begin{cases} \Delta l = [\Delta l_1 \quad \Delta l_2 \quad \Delta l_3]^T = (J_a \nabla)\Delta O_m \\ \Delta \varphi_c = [\Delta \varphi_{1,c} \quad \Delta \varphi_{2,c} \quad \Delta \varphi_{3,c}]^T = (J_c \nabla)\Delta O_m \end{cases} \quad (64)$$

By applying the principle of virtual work to the overall structure, the relations of the input-output force and torque become:

$$w_f^T \Delta O_m = f_a^T \Delta l_a + M_c^T \Delta \varphi_c \quad (65)$$
$$= [\,\|f_{1,al}\|\cos\phi_1 \quad \|f_{2,al}\|\cos\phi_2 \quad \|f_{3,al}\|\cos\phi_3\,]$$
$$\begin{bmatrix} \Delta l_1 \cos\phi_1 \\ \Delta l_2 \cos\phi_2 \\ \Delta l_3 \cos\phi_3 \end{bmatrix} + M_c^T \Delta \varphi_c$$
$$= [\,\|f_{1,al}\| \quad \|f_{2,al}\| \quad \|f_{3,al}\|\,]\begin{bmatrix} \cos^2\phi_1 & 0 & 0 \\ 0 & \cos^2\phi_2 & 0 \\ 0 & 0 & \cos^2\phi_3 \end{bmatrix}$$
$$\begin{bmatrix} \Delta l_1 \\ \Delta l_2 \\ \Delta l_3 \end{bmatrix} + M_c^T \Delta \phi_c$$
$$= f_{al}^T \begin{bmatrix} \cos^2\phi_1 & 0 & 0 \\ 0 & \cos^2\phi_2 & 0 \\ 0 & 0 & \cos^2\phi_3 \end{bmatrix}(J_a \nabla)\Delta O_m +$$
$$M_c^T (J_c \nabla)\Delta O_m$$

or (66)

$$w_f = (J_a \nabla)^T \begin{bmatrix} \cos^2\phi_1 & 0 & 0 \\ 0 & \cos^2\phi_2 & 0 \\ 0 & 0 & \cos^2\phi_3 \end{bmatrix} f_{al} + (J_c \nabla)^T M_c$$

where the input force $f_{al}$ of the actuators and torque $M_c$ of the constraints are respectively determined by the equivalent stiffness of the three subchains in Eqs. (59) and (60) as:

$$f_{al} = [\,\|f_{1,al}\| \quad \|f_{2,al}\| \quad \|f_{3,al}\|\,]^T \quad (67)$$
$$= [\, K_{1,al}\Delta l_1 \quad K_{2,al}\Delta l_2 \quad K_{3,al}\Delta l_3 \,]^T$$
$$= \begin{bmatrix} K_{1,al} & 0 & 0 \\ 0 & K_{2,al} & 0 \\ 0 & 0 & K_{3,al} \end{bmatrix}\begin{bmatrix} \Delta l_1 \\ \Delta l_2 \\ \Delta l_3 \end{bmatrix}$$
$$= \begin{bmatrix} K_{1,al} & 0 & 0 \\ 0 & K_{2,al} & 0 \\ 0 & 0 & K_{3,al} \end{bmatrix}(J_a \nabla)\Delta O_m$$

$$M_c = [\,\|M_{1,c}\| \quad \|M_{2,c}\| \quad \|M_{3,c}\|\,]^T \quad (68)$$
$$= [\, K_{1,c}\Delta\varphi_{1,c} \quad K_{2,c}\Delta\varphi_{2,c} \quad K_{3,c}\Delta\varphi_{3,c} \,]^T$$
$$= \begin{bmatrix} K_{1,c} & 0 & 0 \\ 0 & K_{2,c} & 0 \\ 0 & 0 & K_{3,c} \end{bmatrix}\begin{bmatrix} \Delta\varphi_{1,c} \\ \Delta\varphi_{2,c} \\ \Delta\varphi_{3,c} \end{bmatrix}$$
$$= \begin{bmatrix} K_{1,c} & 0 & 0 \\ 0 & K_{2,c} & 0 \\ 0 & 0 & K_{3,c} \end{bmatrix}(J_c \nabla)\Delta O_m$$

By substituting Eq. (67) and (68) into Eq. (66), the output force and torque of the movable platform is obtained:

$$w_f = (J_a \nabla)^T \begin{bmatrix} \cos^2\phi_1 & 0 & 0 \\ 0 & \cos^2\phi_2 & 0 \\ 0 & 0 & \cos^2\phi_3 \end{bmatrix} \begin{bmatrix} K_{1,al} & 0 & 0 \\ 0 & K_{2,al} & 0 \\ 0 & 0 & K_{3,al} \end{bmatrix} \quad (69)$$

$$(J_a \nabla)\Delta O_m + (J_c \nabla)^T \begin{bmatrix} K_{1,c} & 0 & 0 \\ 0 & K_{2,c} & 0 \\ 0 & 0 & K_{3,c} \end{bmatrix} (J_c \nabla)\Delta O_m$$

Thus, the 6×6 stiffness matrix of the manipulator can be deduced from Eq. (69) and becomes:

$$K_f = \quad (70)$$
$$\frac{w_f}{\Delta O_m} = (J_a \nabla)^T \text{diag}[\cos^2\phi_1, \cos^2\phi_2, \cos^2\phi_3]\text{diag}[K_{1,al}, K_{2,al}, K_{3,al}]$$
$$(J_a \nabla) + (J_c \nabla)^T \text{diag}[K_{1,c}, K_{2,c}, K_{3,c}](J_c \nabla) =$$
$$(J \nabla)^T \text{diag}[\cos^2\phi_1, \cos^2\phi_2, \cos^2\phi_3]$$
$$\text{diag}[K_{1,al}, K_{2,al}, K_{3,al}, K_{1,c}, K_{2,c}, K_{3,c}](J \nabla)$$

The stiffness matrix includes the effects of the actuations and constraints of the manipulator, and the stiffness of all links, joints, actuators, fixed and movable platforms are considered based on the analysis of the overall Jacobian matrix. The stiffness performance of the manipulator can now be evaluated based on this stiffness matrix.

Stiffness Evaluation

In the structure of the manipulator, the stiffness matrix is varied when the movable platform is moving to different positions. In addition, the stiffness matrix is also dependent on the direction of the applied external loads on the movable platform. In the reachable workspace, the minimal stiffness should be larger than a designed value to ensure accuracy of manipulation. Thus, the distribution of the stiffness should be evaluated in the reachable workspace.

Each point of the reachable workspace is characterized by a minimal and maximal value of the stiffness. The actual stiffness at each point depends on the direction of the external load. The range of the values can be characterized by the minimal and maximal eigenvalues of the stiffness matrix, because the output stiffness in an arbitrary direction is bounded by the minimal and maximal eigenvalues of the stiffness matrix in a given pose. The variations of the minimal and maximal eigenvalues can be used as stiffness performance indices to evaluate the stiffness distribution in the reachable workspace.

By substituting all coordinates of the reachable workspace into the stiffness matrix in Eq. (76), the distributions of the minimal and maximal eigenvalues of the stiffness matrix can be respectively determined in the fixed reference frame $O_f$-$x_f y_f z_f$. The structural and physical parameters are listed in Tables 1 and 3, respectively.

TABLE 3

Physical Parameters of the Manipulator

| Parameter | Value | Parameter | Value |
|---|---|---|---|
| $K_{i,\alpha a}$ | $2.5 \times 10^9$ Nmm/rad | $I_{ik,GOf}$ | $4.22 \times 10^4$ mm$^4$ |
| $L_{i,a}$ | 6.5 mm | $I_{ik,AB}$ | $2.12 \times 10^4$ mm$^4$ |
| $d_{i,a}$ | 31.5 mm | $I_{ip,AB}$ | $6.45 \times 10^4$ mm$^4$ |

TABLE 3-continued

Physical Parameters of the Manipulator

| Parameter | Value | Parameter | Value |
|---|---|---|---|
| $\alpha_{i,t}$ | 14.5° | $I_{ik,BH}$ | $2.53 \times 10^4$ mm$^4$ |
| $\mu_{i,c}$ | 0.2 | $I_{ik,HH}$ | $3.21 \times 10^4$ mm$^4$ |
| E | $2.03 \times 10^5$ Mpa | $I_{ik,HC}$ | $2.36 \times 10^4$ mm$^4$ |
| G | $7.85 \times 10^4$ Mpa | $I_{ik,COm}$ | $1.78 \times 10^4$ mm$^4$ |
| $\|h_{i,u}\|$ | 900 mm | | |
| $\|h_{i,d}\|$ | 900 mm | | |

Figure 30A:
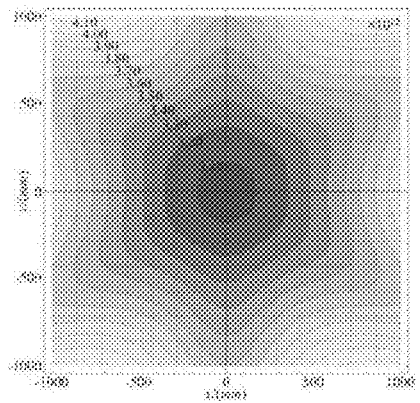
FIG. 30a is a diagram of one example of a distribution of a maximum eigenvalue of a stiffness matrix at an x-y section taken at a z value of −1432, in accordance with one aspect of the present disclosure.
Figure 30D:
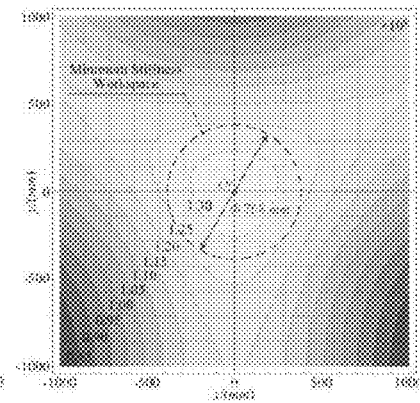
FIG. 30d is a diagram of one example of a distribution of a minimum eigenvalue of a stiffness matrix at an x-y section taken at a z value of −1432, in accordance with one aspect of the present disclosure.
Figure 30B:
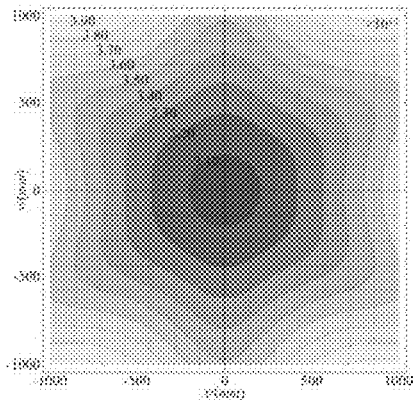
FIG. 30b is a diagram of another example of a distribution of a maximum eigenvalue of a stiffness matrix at an x-y section taken at a z value of −1582, in accordance with one aspect of the present disclosure.
Figure 30E:
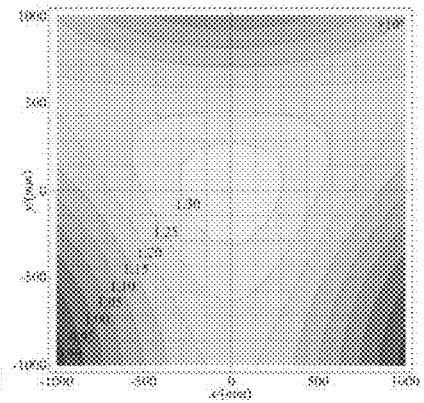
FIG. 30e is a diagram of another example of a distribution of a minimum eigenvalue of a stiffness matrix at an x-y section taken at a z value of −1582, in accordance with one aspect of the present disclosure.
Figure 30C:
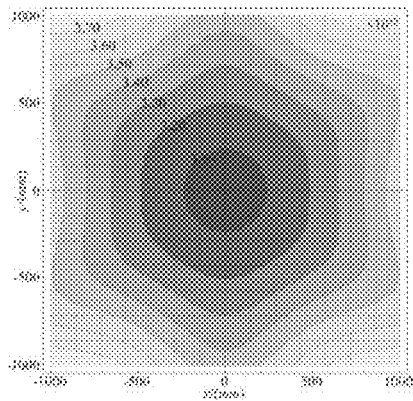
FIG. 30c is a diagram of another example of a distribution of a maximum eigenvalue of a stiffness matrix at an x-y section taken at a z value of −1732, in accordance with one aspect of the present disclosure.
Figure 30F:
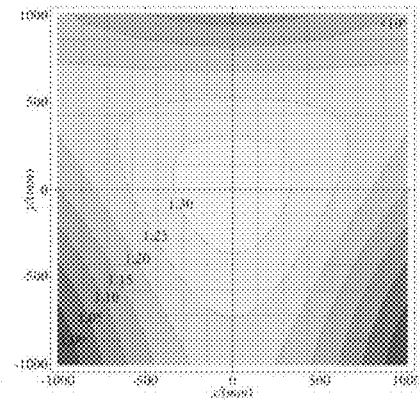
FIG. 30f is a diagram of another example of a distribution of a minimum eigenvalue of a stiffness matrix at an x-y section taken at a z value of −1732, in accordance with one aspect of the present disclosure.

In FIGS. 30a-30f, $K_{fmax}$ and $K_{fmin}$ represent the maximal and minimal eigenvalues of the stiffness matrix. The distributions of $K_{fmax}$ and $K_{fmin}$ are analyzed, as an example, in three x-y sections take at three different z values (z=−1432, −1582, −1732 mm), respectively. The shape of the distributions is symmetric about the axis z. The maximal eigenvalues increase from the center outward. On the contrary, the minimal eigenvalues decrease from the center outward. However, both of them increase along the negative direction of axis z. Thus, by assuming that the minimal eigenvalue of the stiffness matrix is 1.25×10$^8$, the minimal stiffness workspace can be determined as a cylinder with a maximal diameter of Φ=768 mm (around the center point $O_f$) and height 300 mm (between the two x-y sections at the z=−1432 mm and −1732 mm) as shown in FIG. 30d, which is a sub-workspace of the practical workspace.

Among all the basic structural constants $\alpha_i$, $\gamma_i$, $\|g_i\|$, $\|r_i\|$, $\|h_{i,u}\|$ and $\|h_{i,d}\|$, $\alpha_i$ determines the symmetric property of the structure, while the variations of $\|g_i\|$, $\|r_i\|$, $\|h_{i,u}\|$ and $\|h_{i,d}\|$ can only change the size of the workspace (instead of the shape of the workspace), because the different lengths of $\|g_i\|$, $\|r_i\|$, $\|h_{i,u}\|$ and $\|h_{i,d}\|$ have no influence on the constraint angles between the axes of all joints. In the inclined planar displacement subsets of the three subchains, the intersection angle $\gamma_i$ determines the constraint angles between the moving direction of joint $P_{i,1}$ and the axes of joints $R_{i,1}$, $R_{i,2}$. Different constraint angles of the joints induce different shapes and sizes of the structure. Thus, by comparing the variation of all the basic structural constants, the variation of $\gamma_i$ has the most significant influence on the structure.

Figure 31A:
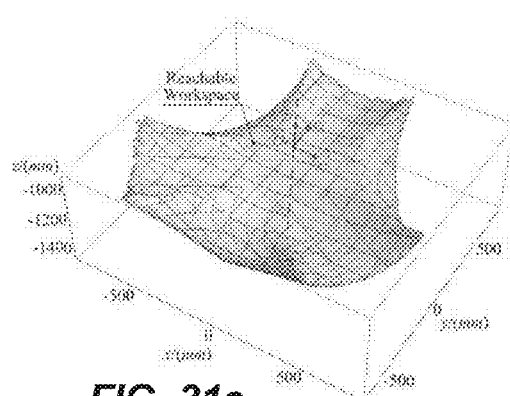
FIG. 31a is a diagram illustrating one example of a three-dimensional (3D) workspace associated with a translational parallel manipulator with $\gamma_i$ equal to 30 degrees, in accordance with one aspect of the present disclosure.
Figure 31D:
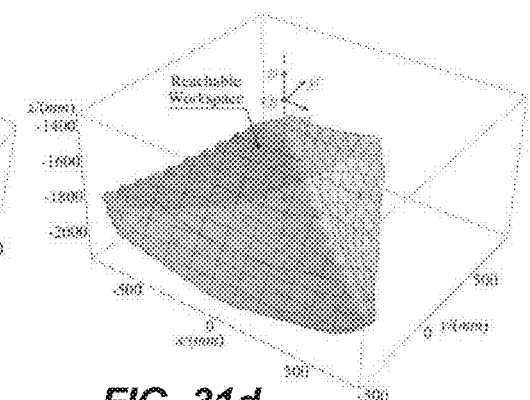
FIG. 31d is a diagram illustrating another example of a three-dimensional (3D) workspace associated with a translational parallel manipulator with $\gamma_i$ equal to 60 degrees, in accordance with one aspect of the present disclosure.
Figure 31B:
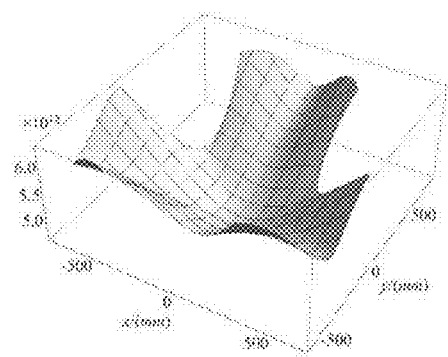
FIG. 31b is a diagram of one example of a stiffness distribution taken at an x-y section of a maximum eigenvalue at a z value of −1050 (of FIG. 31a) and having $\gamma_i$ equal to 30 degrees, in accordance with one aspect of the present disclosure.
Figure 31E:
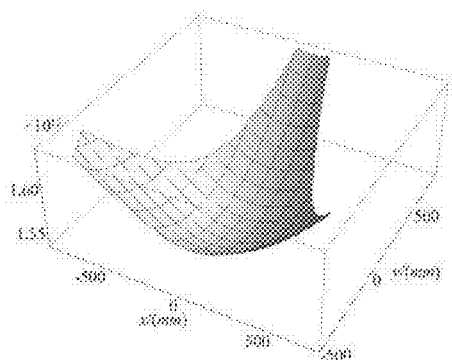
FIG. 31e is a diagram of one example of a stiffness distribution taken at an x-y section of a maximum eigenvalue at a z value of −1975 (of FIG. 31d) and having $\gamma_i$ equal to 60 degrees, in accordance with one aspect of the present disclosure.
Figure 31C:
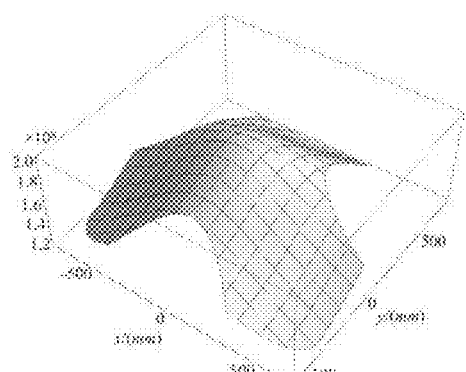
FIG. 31c is a diagram of one example of a stiffness distribution taken at an x-y section of a minimum eigenvalue at a z value of −1050 (of FIG. 31a and having $\gamma_i$ equal to 30 degrees, in accordance with one aspect of the present disclosure.
Figure 31F:
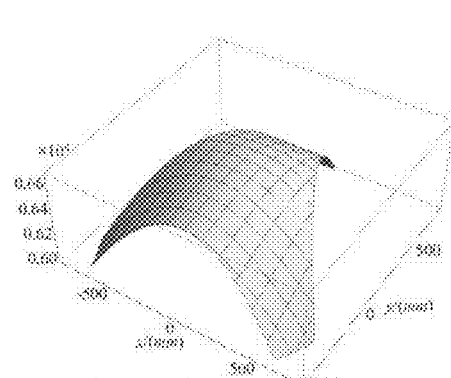
FIG. 31f is a diagram of one example of a stiffness distribution taken at an x-y section of a minimum eigenvalue at a z value of −1975 (of FIG. 31d) and having $\gamma_i$ equal to 60 degrees, in accordance with one aspect of the present disclosure.

The variation range of the intersection angle is $\gamma_i \in (0°, 90°)$. In FIGS. 29a-30f, the workspace and the distributions of the stiffness are generated for $\gamma_i$ equal to 45°. In order to evaluate the variations of the workspace and the stiffness distributions or different values of $\gamma_i$ results of a numerical search are shown in FIGS. 31a-31c, for $\gamma_i$=30° and in FIGS. 31d-31f for $\gamma_i$=60°. Compared to the workspace shown in FIGS. 29a-30f, the sizes of the workspaces have decreased in FIGS. 31a-31f. Evidently, the maximal and minimal eigenvalues of the stiffness decrease with an increase of $\gamma_i$. Thus, by evaluating the workspace and distributions of the maximal and minimal eigenvalues as a function of $\gamma_i$, it can be shown that the maximal size of the practical workspace is achieved when $\gamma_i$=49.8°. The maximal diameter of the cylinder of the practical workspace, in this case, is Φ=908 mm with a height of 300 mm between two x-y sections at z=−1895 mm and −1595 mm. Correspondingly, the minimal stiffness workspace can be defined as a sub-workspace of the practical workspace with a maximal diameter of Φ=848 mm and height of 300 mm when the minimal eigenvalue of the stiffness matrix is 1.05× 10$^8$.

The motions and constraints of the 3-DOF translational parallel manipulator are analyzed. There are only four 1-DOF joints required in each subchain of the manipulator. A small size of the movable platform and fixed linear actuations are designed for achieving a high load/weight ratio, stiffness and accuracy. The inverse position solution was obtained in the closed-loop constraint analysis. By considering the 6-DOF deformations of the movable platform, a 6×6 overall Jacobian matrix of the manipulator was built based on the theory of reciprocal screws, which includes the constraint and actuation effects on the output stiffness.

In accordance with the overall Jacobian matrix method, the stiffness model of the manipulator was established. The model includes the deformations of all links, joints, actuators, fixed and movable platforms. In each subchain, two torsional springs and six bending springs were used to represent the equivalent spring structure of the stiffness model. A 6×6 output stiffness matrix was obtained by the transformations of loads and deformations in the closed-loop form. Furthermore, the stiffness performance of the manipulator was characterized and evaluated by the maximal and minimal eigenvalues of the stiffness matrix in the reachable workspace. By evaluating the workspace and distributions of the maximal and minimal eigenvalues with the variation of structural parameters, the maximal size of the practical workspace was determined. The stiffness model and analysis provide the basic constraints for the parametric design of the manipulator.

Referring now to FIGS. 32-41f, another example of a translational parallel manipulator is illustrated. The manipulator is designed based on conical displacement subset to exhibit better kinematic characteristic. The inverse position solution is obtained through closed-loop constraint analysis and used to formulate the overall Jacobian matrix of constraints and actuations based on the theory of reciprocal screws. Furthermore, by considering the stiffness of all links, joints, actuators, fixed and movable platforms, the output stiffness matrix of the manipulator is derived by the transformations of loads and deformations in the closed-loop form. The relations between the virtual input-output displacements are analyzed by the overall Jacobian matrix and used to build the manipulator's stiffness model. Stiffness performance is evaluated by the extreme eigenvalues of the output stiffness matrix in the reachable workspace. By considering the variations of the structural parameters and the distribution of the output stiffness, the maximal stiffness workspace is obtained through numerical optimization, providing, thereby, basic constraints for the parametric design of the manipulator.

For precision manipulation purposes, structural stiffness is an important performance measure. In order to evaluate the stiffness distribution in the workspace of a parallel manipulator, its stiffness model should be established in the form of an output stiffness matrix.

Figure 32:
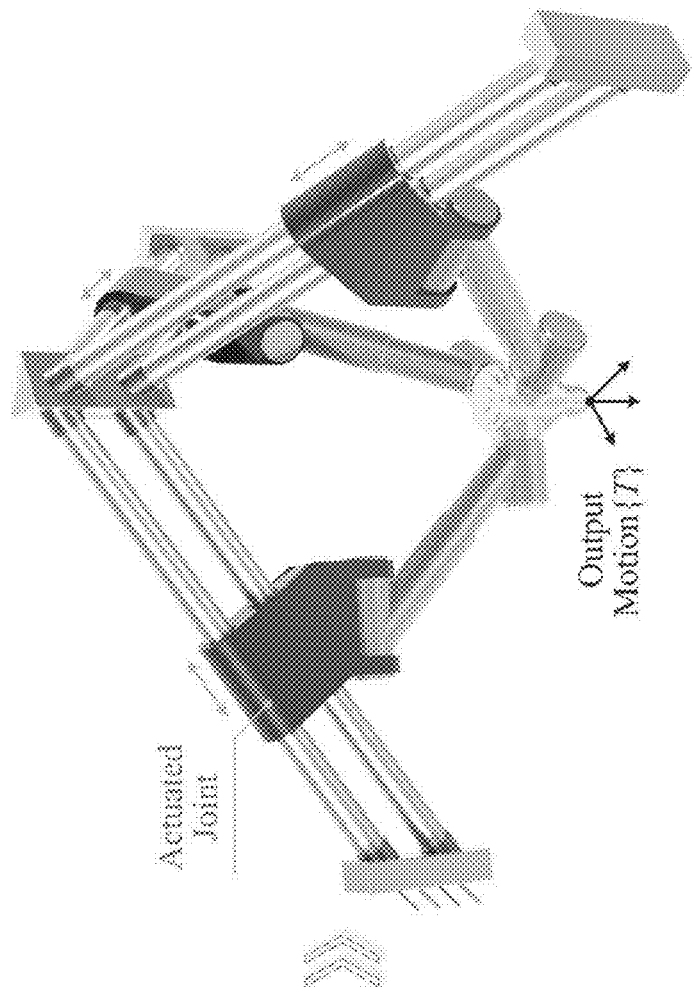
FIG. 32 is a top perspective view of another translational parallel manipulator, in accordance with one aspect of the present disclosure.

The stiffness model of the manipulator illustrated in FIG. 32 is established based on the overall Jacobian matrix method. The general formulation of the bending stiffness matrix of the passive links is considered in the compatibility conditions of the system. The overall Jacobian matrix includes the Jacobian of constraints and actuations for the limited-DOF parallel manipulators, which was derived based on the theory of reciprocal screws. In the stiffness modeling, the stiffness of fixed and movable platforms of the manipulator are included by considering the stiffness of constraints (links) and actuations (actuators). Once the stiffness model is obtained, the stiffness performance is evaluated by the extreme eigenvalues of the output stiffness matrix, because the output stiffness in an arbitrary direction is defined by the minimal and maximal eigenvalues of the stiffness matrix in a given pose. Hence, the distribution of the output stiffness can be characterized by the distribution of the minimal and maximal eigenvalues in the manipulator's reachable workspace.

By considering the variations of the structural parameters and the distribution of the output stiffness, the maximal stiffness workspace can be obtained through numerical optimization. This information provides the basic design constraints for the parameters of the manipulator illustrate in FIG. 32.

Structural Design

For this example, in order to overcome drawbacks of the conventional DOF TPMs, a conical displacement subset is defined and used to build a Schoenflies displacement subgroup in each subchain. The additional specified constraint relations between all the joints will be analyzed below.

Figure 33:
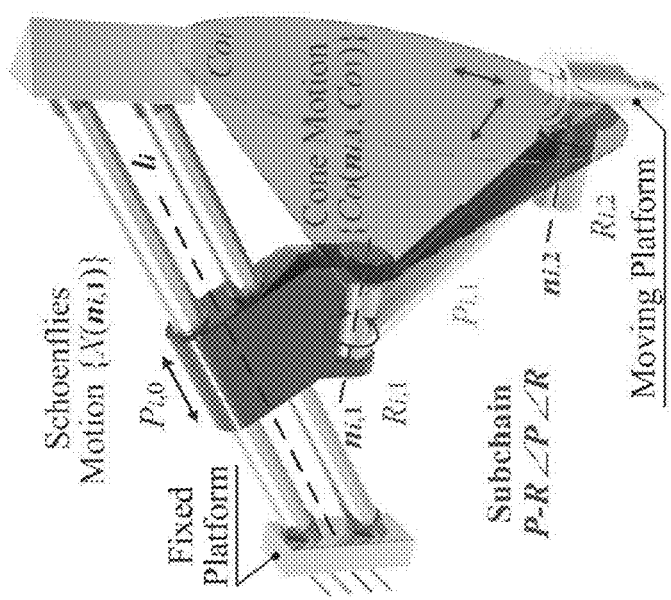
FIG. 33 is a top perspective view of a portion of the manipulator shown in FIG. 32, in accordance with one aspect of the present disclosure.

As shown in FIGS. 32 and 33, a conical displacement subset can be built by serial joints $R_{i,1}P_{i,1}R_{i,2}$, where the prismatic joint $P_{i,1}$ connects two parallel revolute joints $R_{i,1}$ and $R_{i,2}$ under an angle (the subscript i represents the $i^{th}$ subchain). The serial joints $R_{i,1}P_{i,1}R_{i,2}$, namely the conical displacement subset $\{Co(n_{i,1}, Co_i)\}$ can generate a rotation $\{R(n_{i,1})\}$ around cone axis $n_{i,1}$ and two translations $\{T(Co_i)\}$ on cone surface $Co_i$, where a rotational axis of $\{R(n_{i,1})\}$ can be determined as a moving direction as parallel with the cone axis $n_{i,1}$. By combining a prismatic joint $P_{i,0}$ with the $R_{i,1}P_{i,1}R_{i,2}$ (the translational direction $l_i$ of $P_{i,0}$ is arbitrarily related to the conical displacement subset), the structure for the Schoenflies motion $\{X(n_{i,1})\}$ can be obtained as a subchain P-R<P<R. Three subchains P-R<P<R can be combined in a symmetric form to build the 3-DOF TPM shown in FIGS. 32 and 33. In accordance with displacement group theory, the intersection operation of the displacement subsets between the subchains is:

$$Z_m = \bigcap_{i=1}^{3}\{X(n_{i,1})\} \qquad (71)$$

$$= \bigcap_{i=1}^{3}[\{Co(n_{i,1}, Co_i)\}\{T(l_i)\}]$$

$$= \bigcap_{i=1}^{3}[\{R(n_{i,1})\}\{T(Co_i)\}\{T(l_i)\}]$$

$$= \bigcap_{i=1}^{3}[\{T(Co_i)\}\{T(l_i)\}]$$

$$= \{T\}$$

where the output motions $Z_m$, of the movable platform are three orthogonal translations $\{T\}$. The actuated joint can be chosen as the prismatic joints $P_{i,0}$ of each subchain (the remaining joints $R_{i,1}P_{i,1}R_{i,2}$ are passive joints), because there are no intersection motions between the three conical displacement subsets in the different directions when the actuators of the three prismatic joints $P_0$ are locked. In order to avoid sticking of the passive prismatic joints, the three linear actuations will not be placed in a plane, and the intersection angle between the actuated prismatic joint and the passive prismatic joint in each subchain should not be 90°. Meanwhile, in the reachable workspace, the intersection cure of any two cones of the subchains is unparallel with a moving direction of passive prismatic joint of the third subchain. Thus, the output motion along the intersection cure can be actuated by the fixed prismatic joint of the third subchain.

Three fixed input linear actuations can be designed in an orthogonal form. The three orthogonal output translations of the movable platform can be directly actuated by the three orthogonal linear actuations.

The manipulator illustrated in FIG. 32 include: Three identical subchains designed and arranged symmetrically in a non-Cartesian constraint configuration; only four 1-DOF joints are included in each subchain (no universal or spherical joints are involved); the movable platform is connected with three revolute joints instead of universal or cylindrical joints (a relatively small size of the movable platform can be realized); and all actuation is accomplished through linear actuators and placed on the fixed platform.

As a consequence of these features, a higher load/weight ratio and stiffness of the manipulator can be expected. The related kinematic position analysis, overall Jacobian, stiffness matrix determination, workspace and stiffness evaluations are performed hereinafter.

Kinematic Position Solutions

In order to establish a stiffness model of the manipulator, the kinematic position solutions should be determined to provide the constraint relations of the structure. The position relationships between the three linear input motions of actuations and the three translational output motions of the movable platform can be analyzed in a closed-loop form. In the following paragraphs the basic relations required for the stiffness analysis are reviewed.

Figure 34:
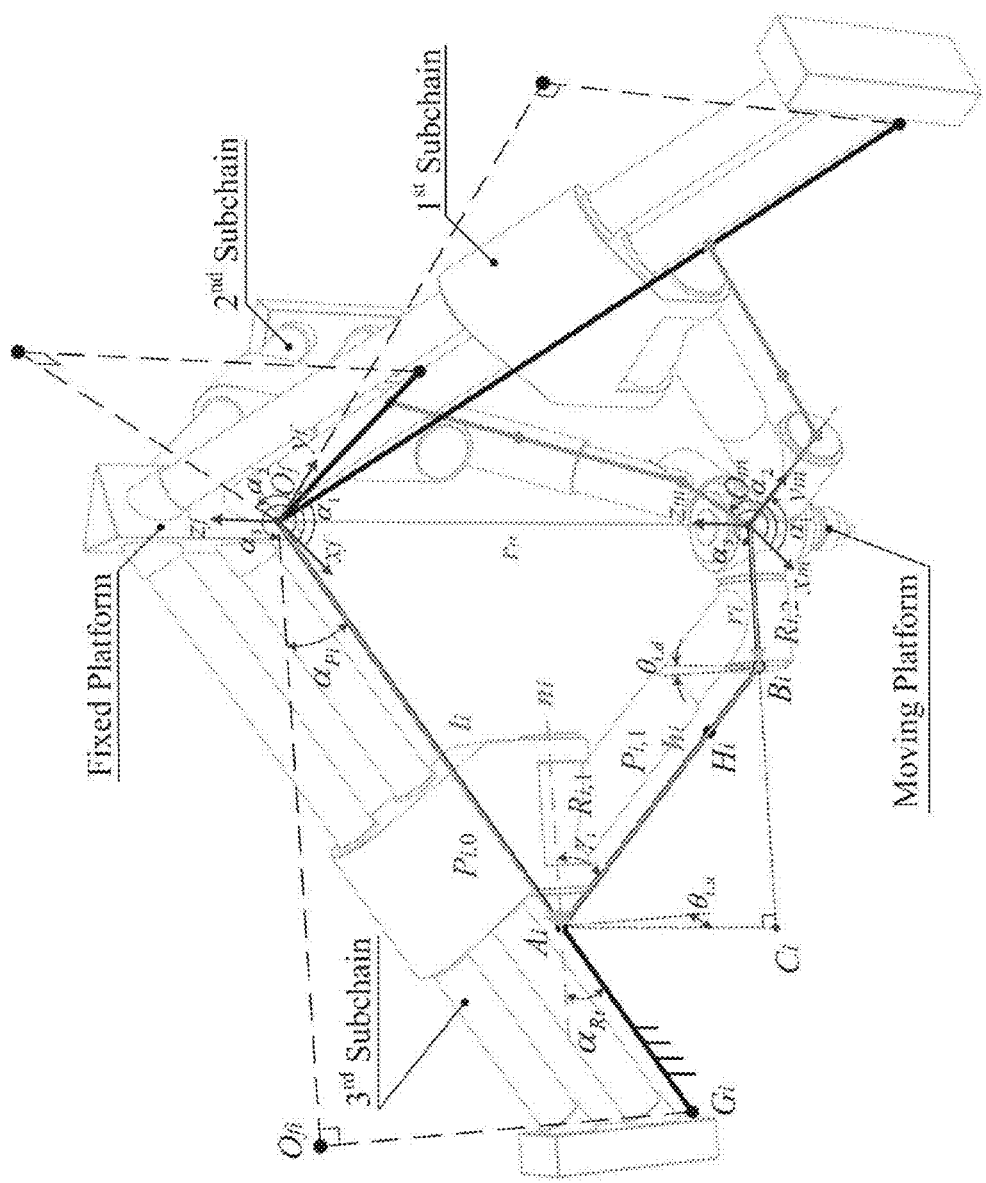
FIG. 34 is a top perspective of the manipulator shown in FIG. 32 illustrating examples of structural parameters of the manipulator, in accordance with one aspect of the present disclosure.

In FIG. 34, a fixed reference frame $O_f\text{-}x_f y_f z_f$ is placed at a center of the fixed platform, and a parallel moving reference frame $O_m\text{-}x_m y_m z_m$ is defined at the center of the movable platform. The dashed lines $O_f O_{fi}$ (i=1, 2, 3) are projection lines of the guide members $O_f G_i$ of the three linear actuators along the axis $z_f$ in the plane $x_f O_f y_f$. The intersection angle between $O_f O_{fi}$ and $O_f G_i$ is $\alpha_{Pi}$. The lines $O_f O_{ri}$ are arranged along the axis $x_f$ with intersection angles $\alpha_1$, $\alpha_2$ and $\alpha_3$, respectively. The prismatic joints and revolute joints $P_{i,0}$, $R_{i,1}$, $P_{i,1}$ and $R_{i,2}$ are connected in sequence. The basic structural parameters are $\alpha_i$, $\alpha_{Pi}$, $\alpha_{Ri}$, $\gamma_i$ and $\|r_i\|$, where $\alpha_{Ri}$ is the intersection angle between the axis of $R_{i,1}$ and the moving direction of $P_{i,0}$, $\gamma_i$ represents the intersection angle between the axis of $R_{i,1}$ and the moving direction of $P_{i,1}$, while $\|r_i\|$ is the size of the movable platform between points $O_m$ and $B_i$ which is parallel to the axis of $R_{i,1}$. The joint variables of $P_{i,0}$, $R_{i,1}$, $P_{i,1}$ and $R_{i,2}$ are $\|l_i\|$, $\theta_{i,u}$, $\|h_i\|$ and $\theta_{i,d}$, respectively. The input variables are the lengths of travel of the linear actuators between points $O_f$ and $A_i$ which is along the three guide members, while the output variable is the position vector $r_o$ (x, y, z) of the movable platform between points $O_f$ and $O_m$. In a subchain, the kinematic constraint of the closed loop is:

$$l_i = r_o + r_i + h_i \tag{72}$$

where the constituent vectors are defined as:

$$\begin{cases} l_i = \overrightarrow{O_f A_i} = [\ \|l_i\|\cos\alpha_{Pi}\cos\alpha_i \quad \|l_i\|\cos\alpha_{Pi}\sin\alpha_i \quad \|l_i\|\sin\alpha_{Pi}\ ]^T \\ r_o = \overrightarrow{O_f O_m} = [\ x \quad y \quad z\ ]^T \\ r_i = \overrightarrow{O_m B_i} = \overrightarrow{O_f B_i} - \overrightarrow{O_f O_m} \\ \quad = [\ \|r_i\|\cos(\alpha_{Pi}-\alpha_{Ri})\cos\alpha_i \quad \|r_i\|\cos(\alpha_{Pi}-\alpha_{Ri})\sin\alpha_i \quad \|r_i\|\sin(\alpha_{Pi}-\alpha_{Ri})\ ]^T \\ \quad = n_i \end{cases} \tag{73}$$

Thus, the vector $h_i$ can be deduced as:

$$h_i = \overrightarrow{B_i A_i} \tag{74}$$

$$= l_i - r_i - r_o$$

$$= \begin{bmatrix} (\|l_i\|\cos\alpha_{Pi} - \|r_i\|\cos(\alpha_{Pi}-\alpha_{Ri}))\cos\alpha_i - x \\ (\|l_i\|\cos\alpha_{Pi} - \|r_i\|\cos(\alpha_{Pi}-\alpha_{Ri}))\sin\alpha_i - y \\ \|l_i\|\sin\alpha_{Pi} - \|r_i\|\sin(\alpha_{Pi}-\alpha_{Ri}) - z \end{bmatrix}$$

In accordance with the structural constraint condition, namely the intersection angle between variable vectors $n_i$ and $h_i$ is constant $\gamma_i$, the corresponding kinematic constraint equation can be obtained by the dot product of $n_i$ and $h_i$ as:

$$n_i \cdot h_i = \tag{75}$$

$$\|r_i\|\cos(\alpha_{Pi}-\alpha_{Ri})\cos\alpha_i((\|l_i\|\cos\alpha_{Pi} - \|r_i\|\cos(\alpha_{Pi}-\alpha_{Ri}))\cos\alpha_i - x) +$$

$$\|r_i\|\cos(\alpha_{Pi}-\alpha_{Ri})\sin\alpha_i((\|l_i\|\cos\alpha_{Pi} - \|r_i\|\cos(\alpha_{Pi}-\alpha_{Ri}))\sin\alpha_i - y) +$$

$$\|r_i\|\sin(\alpha_{Pi}-\alpha_{Ri})(\|l_i\|\sin\alpha_{Pi} - \|r_i\|\sin(\alpha_{Pi}-\alpha_{Ri}) - z) =$$

$$\|n_i\|\|h_i\|\cos\gamma_i = \|r_i\|\cos\gamma_i \sqrt{\begin{array}{l}((\|l_i\|\cos\alpha_{Pi} - \|r_i\|\cos(\alpha_{Pi}-\alpha_{Ri}))\cos\alpha_i - x)^2 + \\ ((\|l_i\|\cos\alpha_{Pi} - \|r_i\|\cos(\alpha_{Pi}-\alpha_{Ri}))\sin\alpha_i - y)^2 + \\ (\|l_i\|\sin\alpha_{Pi} - \|r_i\|\sin(\alpha_{Pi}-\alpha_{Ri}) - z)^2\end{array}}$$

To solve Eq. (75) with respect to the unknown parameter $\|l_i\|$, the inverse kinematic position solution of the manipulator can be obtained as:

$$\|l_i\| = \frac{\|r_i\|\cos\alpha_{Ri}\sin^2\gamma_i + E_{Bi}\cos\alpha_{Ri} - E_{Ai}\cos^2\gamma_i \pm \sqrt{\begin{array}{c}(\|r_i\|\cos\alpha_{Ri}\sin^2\gamma_i + E_{Bi}\cos\alpha_{Ri} - E_{Ai}\cos^2\gamma_i)^2 - \\ (\cos^2\alpha_{Ri} - \cos^2\gamma_i) \\ ((\|r_i\| + E_{Bi})^2 - \cos^2\gamma_i(\|r_i\|^2 + x^2 + y^2 + z^2 + 2\|r_i\|E_{Bi}))\end{array}}}{\cos^2\alpha_{Ri} - \cos^2\gamma_i} \quad (76)$$

where $E_{Ai}$ and $E_{Bi}$ are:

$$\begin{cases} E_{Ai} = x\cos\alpha_{Pi}\cos\alpha_i + y\cos\alpha_{Pi}\sin\alpha_i + z\sin\alpha_{Pi} \\ E_{Bi} = x\cos(\alpha_{Pi} - \alpha_{Ri})\cos\alpha_i + y\cos(\alpha_{Pi} - \alpha_{Ri})\sin\alpha_i + z\sin(\alpha_{Pi} - \alpha_{Ri}) \end{cases} \quad (77)$$

In Eq. (76), the symbol "±" is set to "+" for the larger value because the $\|l_i\|$ is a non-negative number, and the initial positions of slide blocks are placed outward from the symmetric center point $O_m$.

Correspondingly, the forward kinematic position solution can be obtained by solving Eq. (76) for the unknown output variables x, y, and z when the input variables $\|l_i\|$ are given. Based on the kinematic position solutions, the overall Jacobian matrix will be developed in the next section for stiffness modeling.

Overall Jacobian Matrix

In order to establish the stiffness model of the manipulator, all of the deformations including three rotations and three translations of the movable platform should be considered. Thus, a 6×6 overall Jacobian matrix is required for the stiffness modeling of this limited-DOF parallel manipulator. The overall Jacobian matrix includes the Jacobian of the constraints and actuations. Correspondingly, the stiffness of structural constraints and the stiffness of actuations can be included in the 6×6 overall Jacobian matrix, respectively. Based on the theory of reciprocal screws, the Jacobian of constraints and actuations are analyzed as follows.

By assuming that the deformations of the output movable platform include 6-DOF motions, the vectors for the angular and linear velocities of the movable platform can be respectively expressed in the fixed reference frame $O_f$-$x_f y_f z_f$ as:

$$\begin{cases} \omega = [\omega_{xf} \quad \omega_{yf} \quad \omega_{zf}]^T \\ v = [v_{xf} \quad v_{yf} \quad v_{zf}]^T \end{cases} \quad (78)$$

Based on the closed-loop constraint of each subchain in Eq. (72), the instantaneous twist $\$_{Om}$ of the movable platform is a linear combination of the four instantaneous twists of the joints, namely:

$$\$_{Om} = [\omega^T v^T]^T = \|\dot{l}_i\|\$_{i,1} + \dot{\theta}_{i,u}\$_{i,2} + \|\dot{h}_i\|\$_{i,3}\dot{\theta}_{i,d}\$_{i,d} \quad (79)$$

where $\$_{i,j}$ (i=1, 2, 3, j=1, 2, 3, 4) is a unit screw associated with the $j^{th}$ joint of the $i^{th}$ subchain. $\|\dot{l}_i\|$, $\dot{\theta}_{i,u}$, $\|\dot{h}_i\|$ and $\dot{\theta}_{i,d}$ represent the velocities of the joints. The linear combination of the instantaneous twists of each subchain is the same because the three subchains are connected to the movable platform and constrained with identical output motions.

Figure 35:
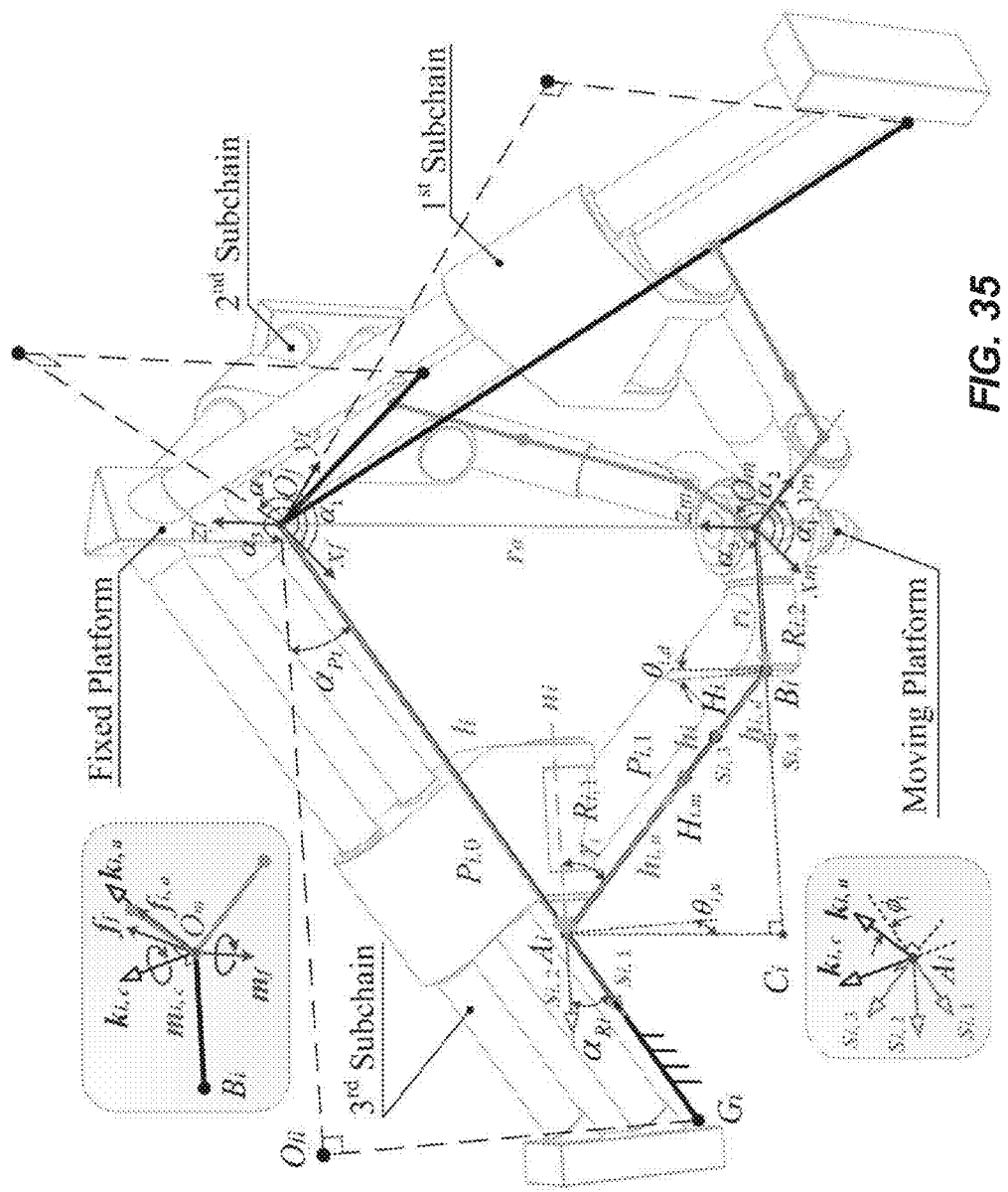
FIG. 35 is a top perspective view of the manipulator shown in FIG. 32 illustrating examples of loads on the manipulator, in accordance with one aspect of the present disclosure.

In FIG. 35, the unit vector $s_{i,j}$ that is along the $j^{th}$ joint axis of the $i^{th}$ subchain is given by:

$$s_{i,1} = \frac{l_i}{\|l_i\|} \quad (80)$$
$$= [\cos\alpha_{Pi}\cos\alpha_i \quad \cos\alpha_{Pi}\sin\alpha_i \quad \sin\alpha_{Pi}]^T$$

$$s_{i,2} = s_{i,4} \quad (81)$$
$$= \frac{r_i}{\|r_i\|}$$
$$= [\cos(\alpha_{Pi} - \alpha_{Ri})\cos\alpha_i \quad \cos(\alpha_{Pi} - \alpha_{Ri})\sin\alpha_i \quad \sin(\alpha_{Pi} - \alpha_{Ri})]^T$$

$$s_{i,3} = \frac{h_i}{\|h_i\|} \quad (82)$$
$$= \frac{\begin{bmatrix}(\|l_i\|\cos\alpha_{Pi} - \|r_i\|\cos(\alpha_{Pi} - \alpha_{Ri}))\cos\alpha_i - x \\ (\|l_i\|\cos\alpha_{Pi} - \|r_i\|\cos(\alpha_{Pi} - \alpha_{Ri}))\sin\alpha_i - y \\ \|l_i\|\sin\alpha_{Pi} - \|r_i\|\sin(\alpha_{Pi} - \alpha_{Ri}) - z\end{bmatrix}}{\sqrt{\begin{array}{c}((\|l_i\|\cos\alpha_{Pi} - \|r_i\|\cos(\alpha_{Pi} - \alpha_{Ri}))\cos\alpha_i - x)^2 + \\ ((\|l_i\|\cos\alpha_{Pi} - \|r_i\|\cos(\alpha_{Pi} - \alpha_{Ri}))\sin\alpha_i - y)^2 + \\ (\|l_i\|\sin\alpha_{Pi} - \|r_i\|\sin(\alpha_{Pi} - \alpha_{Ri}) - z)^2\end{array}}}$$

where $\|l_i\|$ can be obtained from Eq. (76). Thus, the unit screws $\$_{i,j}$ of Eq. (79) are:

$$\hat{\$}_{i,1} = \begin{bmatrix} 0 \\ s_{i,1} \end{bmatrix} \quad (83)$$

$$\hat{\$}_{i,2} = \begin{bmatrix} s_{i,2} \\ \overrightarrow{O_m A_i} \times s_{i,2} \end{bmatrix} \quad (84)$$
$$= \begin{bmatrix} s_{i,2} \\ (r_i + h_i) \times s_{i,2} \end{bmatrix}$$

$$\hat{\$}_{i,3} = \begin{bmatrix} 0 \\ s_{i,3} \end{bmatrix} \quad (85)$$

$$\hat{\$}_{i,4} = \begin{bmatrix} s_{i,4} \\ 0 \times s_{i,4} \end{bmatrix} \quad (86)$$

In accordance with the theory of reciprocal screws, a reciprocal screw $\$_a \bigcirc \$_b$ is that the wrench has no work along the twist of $\$_b$. In each subchain of the manipulator, a unit constraint screw $\$_{i,c}$ is reciprocal to all joint screws (instantaneous twist $\$_{Om}$ of the movable platform). The wrench $\$_{i,c}$ cannot activate the motions of the four joints of each subchain. Thus, based on the structural constraints of the joints in each subchain, the unit constraint screw $\$_{i,c}$ can be identified as an infinite-pitch wrench screw, namely:

$$\hat{\$}_{i,c} = \begin{bmatrix} 0 \\ k_{i,c} \end{bmatrix} \quad (87)$$

$$= \begin{bmatrix} 0 \\ \dfrac{s_{i,2} \times s_{i,3}}{\|s_{i,2} \times s_{i,3}\|} \end{bmatrix}$$

$$= \begin{bmatrix} 0 \\ \dfrac{s_{i,2} \times s_{i,3}}{|\sin\gamma_i|} \end{bmatrix}$$

which represents a unit couple of constraints imposed by the joints of the $i^{th}$ subchain, and the couple is exerted on the movable platform around the direction of the unit constraint vector $k_{i,c}$. The constraint vector $k_{i,c}$ is perpendicular to the unit vectors $s_{i,2}$ and $s_{i,3}$. The reciprocal product of the unit constraint screw $\$_{i,c}$ and of the instantaneous twist $\$_{Om}$ is:

$$\$_{i,c} \bigcirc \$_{Om} = (\nabla \$_{i,c})^T \$_{Om} = J_{i,c} \$_{Om} = 0 \quad (88)$$

where the transformation matrix $\nabla$ is $$\nabla = \begin{bmatrix} 0 & 0 & 0 & 1 & 0 & 0 \\ 0 & 0 & 0 & 0 & 1 & 0 \\ 0 & 0 & 0 & 0 & 0 & 1 \\ 1 & 0 & 0 & 0 & 0 & 0 \\ 0 & 1 & 0 & 0 & 0 & 0 \\ 0 & 0 & 1 & 0 & 0 & 0 \end{bmatrix} \quad (89)$$

Thus, the Jacobian of constraints can be obtained from Eq. (88), which transforms the angular and linear velocities of the movable platform to 0. By considering the constraints of the three subchains, the Jacobian of the constraints is:

$$J_c = \begin{bmatrix} J_{1,c} \\ J_{2,c} \\ J_{3,c} \end{bmatrix} \quad (90)$$

$$= \begin{bmatrix} k_{1,c}^T & 0 & 0 & 0 \\ k_{2,c}^T & 0 & 0 & 0 \\ k_{3,c}^T & 0 & 0 & 0 \end{bmatrix}$$

where $k_{i,c}$ is determined in Eq. (87). Each row of $J_c$ represents a unit wrench of structural constraints of a subchain, which is exerted on the movable platform. Thus, the Jacobian of constraints determines the 3-DOF translational output motions of the movable platform.

If $J_c$ is of full rank, the unique solution for $J_{i,c}\$_{Om}=0$ (Eq. (88)) is $\omega=0$. Thus, based on Eqs. (79) and (83)-(86), a constraint equation can be obtained as:

$$\dot{\theta}_{i,u}s_{i,2} + \dot{\theta}_{i,d}s_{i,4} = 0 \quad (91)$$

Since $s_{i,2} = s_{i,4} \neq 0$, thus, Eq. (91) can be deduced as:

$$\dot{\theta}_{i,u} + \dot{\theta}_{i,d} = 0 \quad (92)$$

stating that the magnitudes of the rotational angles of joints $R_{i,1}$ and $R_{i,2}$ are equal.

By assuming that the actuated joint ($P_{i,0}$) in each subchain is locked, a unit actuation screw $\$_{i,a}$ is reciprocal to all passive joint ($R_{i,1}P_{i,1}R_{i,2}$) screws of the $i^{th}$ subchain. The wrench of $\$_{i,a}$ has no work on all passive joints but the actuated joint. Thus, the unit actuation screw $\$_{i,a}$ can be identified as a zero-pitch screw along the direction of the unit actuation vector $k_{i,a}$, i.e.:

$$\hat{\$}_{i,a} = \begin{bmatrix} k_{i,a} \\ r_i \times k_{i,a} \end{bmatrix} \quad (93)$$

$$= \begin{bmatrix} \dfrac{k_{i,c} \times s_{i,3}}{\|k_{i,c} \times s_{i,3}\|} \\ r_i \times \left( \dfrac{k_{i,c} \times s_{i,3}}{\|k_{i,c} \times s_{i,3}\|} \right) \end{bmatrix}$$

$$= \begin{bmatrix} k_{i,c} \times s_{i,3} \\ r_i \times (k_{i,c} \times s_{i,3}) \end{bmatrix}$$

which represents a unit force of actuation imposed by the actuated joint of the $i^{th}$ subchain that is exerted on the movable platform along the direction of the unit actuation vector $k_{i,a}$. The vector $k_{i,a}$ is perpendicular to the unit vectors $s_{i,3}$ and passes through the axes of joints $R_{i,1}$ and $R_{i,2}$. The reciprocal product of the unit actuation screw $\$_{i,a}$ and of the instantaneous twist $\$_{Om}$ is:

$$\$_{i,a} \bigcirc \$_{Om} = (\nabla \$_{i,a})^T \$_{Om} = \|\dot{l}_i\| \cos\phi_i = \|\dot{l}_i\| k_{i,a}^T s_{i,1} \quad (94)$$

where $\phi_i$ is intersection angle between $k_{i,a}$ and $s_{i,1}$. Eq. (94) can be transformed as:

$$J_{i,a}\$_{Om} = \begin{bmatrix} \dfrac{(r_i \times k_{i,a})^T}{k_{i,a}^T s_{i,1}} & \dfrac{k_{i,a}^T}{k_{i,a}^T s_{i,1}} \end{bmatrix} \$_{Om} \quad (95)$$

$$= \|\dot{l}_i\|$$

Thus, the Jacobian of actuations is determined by Eq. (95), which transforms the angular and linear velocities of the movable platform to the linear input velocity $\|\dot{l}_i\|$ of the actuator. By considering the motions of the three subchains, the Jacobian of actuations assumes the form:

$$J_a = \begin{bmatrix} J_{1,a} \\ J_{2,a} \\ J_{3,a} \end{bmatrix} \quad (96)$$

$$= \begin{bmatrix} \dfrac{(r_1 \times k_{1,a})^T}{k_{1,a}^T s_{1,1}} & \dfrac{k_{1,a}^T}{k_{1,a}^T s_{1,1}} \\ \dfrac{(r_2 \times k_{2,a})^T}{k_{2,a}^T s_{2,1}} & \dfrac{k_{2,a}^T}{k_{2,a}^T s_{2,1}} \\ \dfrac{(r_3 \times k_{3,a})^T}{k_{3,a}^T s_{3,1}} & \dfrac{k_{3,a}^T}{k_{3,a}^T s_{3,1}} \end{bmatrix}$$

In accordance with the Jacobian of constraints and actuations, the overall velocity transformation from the output movable platform to the input actuated joint of each subchain is:

$$J_i \$_{Om} = \begin{bmatrix} J_{i,a} \\ J_{i,c} \end{bmatrix} \$_{Om} \quad (97)$$

$$= \begin{bmatrix} \|\dot{l}_i\| \\ 0 \end{bmatrix}$$

Thus, the 6×6 overall Jacobian matrix of the manipulator is given by:

$$J = \begin{bmatrix} J_a \\ J_c \end{bmatrix} \quad (98)$$

$$= [\, J_{1,a} \quad J_{2,a} \quad J_{3,a} \quad J_{1,c} \quad J_{2,c} \quad J_{3,c} \,]^T$$

which is a 6×6 transformation matrix including all of the basic constraints and actuations of transformation between all joints motions and output motions of the movable platform.

Stiffness Analysis of a Subchain

In the structure of the manipulator, the stiffness of all links, joints, actuators, fixed and movable platforms are included in the stiffness model. In accordance with the analysis of the overall Jacobian matrix, in each subchain the actuation screw $\$_{i,a}$ imposes an actuation force $f_{i,a}$ at point $C_i$ of the movable platform along the directions of $k_{i,a}$, while the constraint screw $\$_{i,c}$ exerts a constraint couple $M_{i,c}$ at point $C_i$ of the movable platform around the direction of $k_{i,c}$ as shown in FIG. 35. Thus, the overall deformations of each subchain are simultaneously generated by the actuation force $f_{i,a}$ and the constraint couple $M_{i,c}$.

Figure 36:
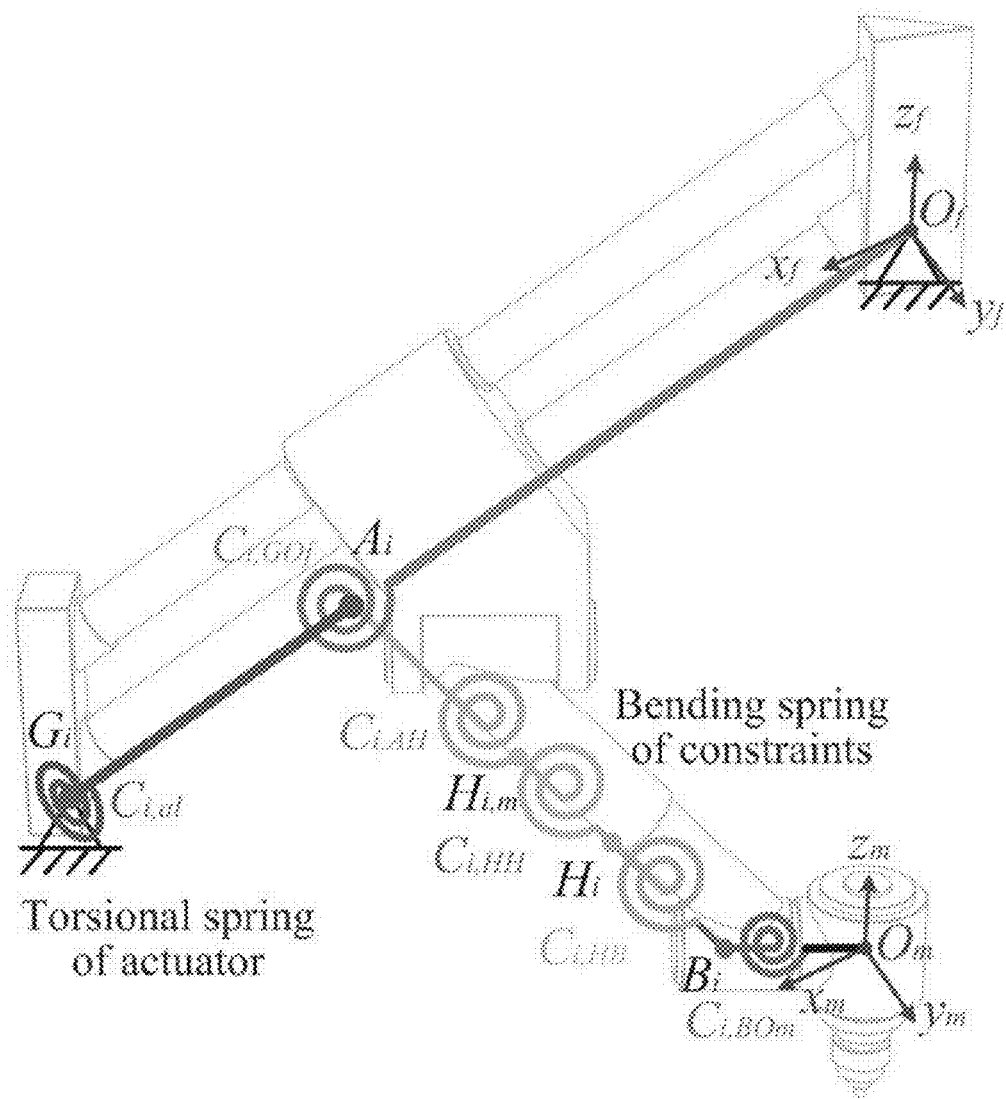
FIG. 36 is a top perspective view of a portion of the manipulator shown in FIG. 32 illustrating one example of an equivalent spring structure of the portion, in accordance with one aspect of the present disclosure.

In FIG. 36, stiffness of a subchain can be considered as comprising of a serial connection of springs representing the stiffness of all links. Thus, by considering the effects of the actuation force and of the constraint couple, the following four components of the equivalent springs of a subchain can be identified:

(1) If a lead screw is used, a torsional spring can be used to represent the stiffness of actuation. The rotational deformation of the actuator can be transformed as a linear deformation along the guide member. The compliance of the torsional spring is denoted by $C_{i,al}$. Equivalently, if a linear motor is used for actuation, a tensional spring is used to represent the stiffness of actuation. The linear deformation is along the guide member without a displacement transformation between the rotation and translation.

(2) In the guide member $O_fG_i$, a bending spring is used to represent the stiffness of the part of the fixed platform. The corresponding compliance is $C_{i,GOf}$.

(3) In the prismatic joint $P_{i,1}$, the guide member and the slide block have different bending stiffnesses. Thus, the equivalent spring between the points $A_i$ and $B_i$ can be separated into three parts, namely guide member $A_iH_{i,m}$, slide block $H_iB_i$ and $H_{i,m}H_i$ (overlapping part between the guide member and the slide block). The compliances of $A_iH_{i,m}$, $H_iB_i$ and $H_{i,m}H_i$, are denoted as $C_{i,AH}$, $C_{i,HB}$ and $C_{i,HH}$, respectively.

(4) In the link $B_iO_m$, a bending spring is used to represent the stiffness of the part of the movable platform. The compliance of the link is denoted as $C_{i,BOm}$.

Figure 37B:
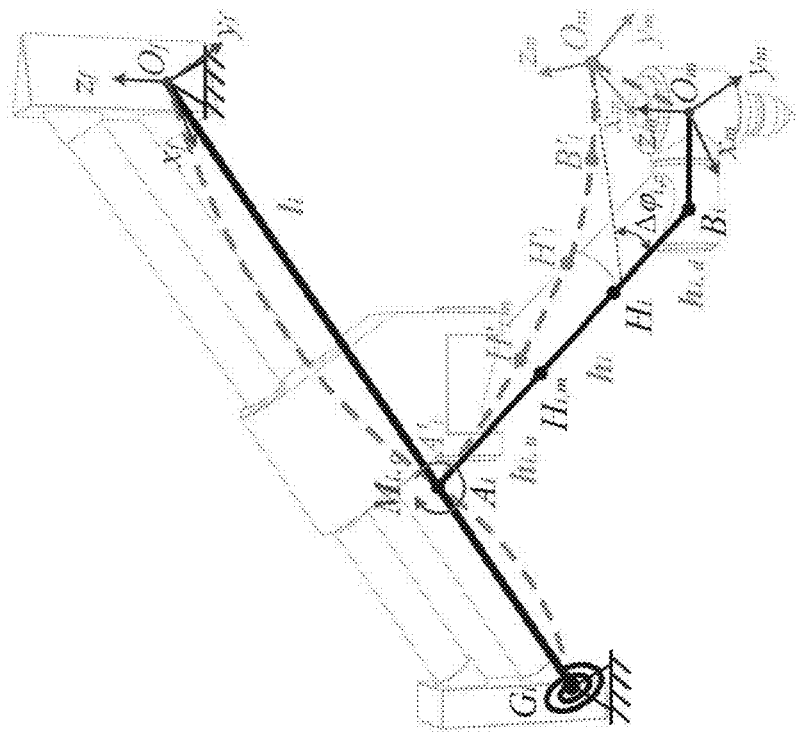
FIG. 37b is a top perspective view of a portion of the manipulator shown in FIG. 32 illustrating one example of a deformation of constraints of the portion, in accordance with one aspect of the present disclosure.
Figure 37A:
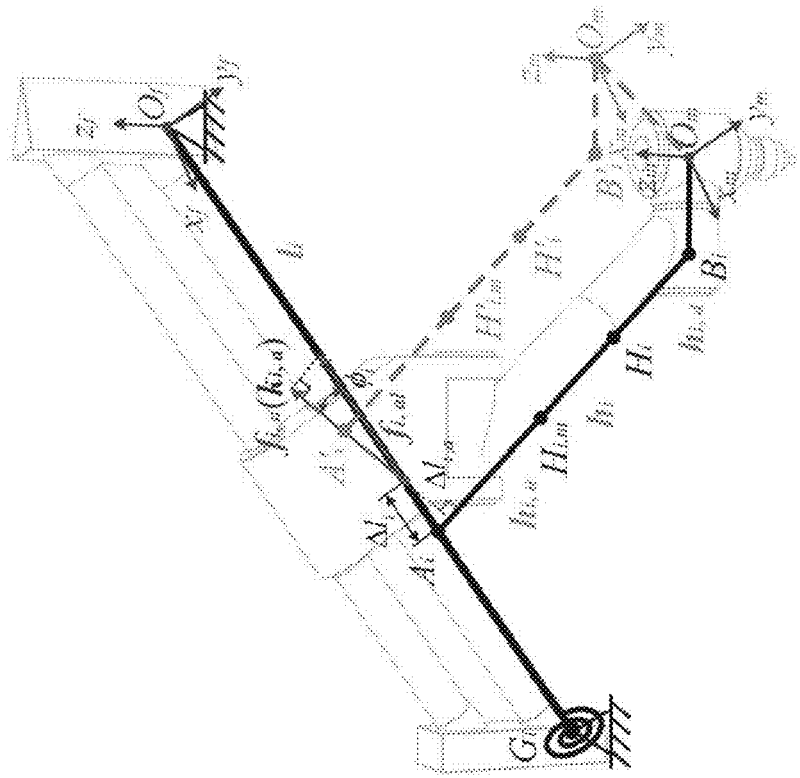
FIG. 37a is a top perspective view of a portion of the manipulator shown in FIG. 32 illustrating one example of a deformation of actuation of the portion, in accordance with one aspect of the present disclosure.

Tensional and compressional stiffnesses (along the direction of vector $h_i$) do not exist in the prismatic joint $P_{i,1}$ because $P_{i,1}$ is a passive joint, and the actuation force $f_{i,a}$ is perpendicular to the vector $h_i$. Similarly, there is no torsional compliance around the vector $h_i$ since the direction of the constraint couple $M_{i,c}$ is perpendicular to the vector $h_i$. Thus, in a subchain, there is a total of one torsional spring and five bending springs that can be used to represent the equivalent spring structure. In the static balance of the equivalent spring structure, the deformations of a subchain include both the deformations of actuation and of the constraints as shown in FIGS. 37a and 37b. The compliance of each spring can be deduced as follows.

In the case of lead screw in the $i^{th}$ subchain, the torque $\tau_{i,a}$ of the actuator can be expressed as:

$$\tau_{i,a} = K_{i,\alpha\alpha} \Delta\alpha_{i,a} \quad (99)$$

where $K_{i,\alpha\alpha}$ and $\Delta\alpha_{i,a}$ represent the torsional stiffness and angular deformation of the actuator. By considering the torque transmission of the lead screw, the actuation force $f_{i,al}$ is acting on the slide block and along the guide member $O_fG_i$, which can be deduced as:

$$\|f_{i,al}\| = \frac{2\tau_{i,a}}{d_{i,a}\tan(\lambda_{i,a}+\psi_{i,a})} \quad (100)$$

$$\begin{cases} \lambda_{i,a} = \tan^{-1}\left(\dfrac{L_{i,a}}{\pi d_{i,a}}\right) \\ \psi_{i,a} = \tan^{-1}\left(\dfrac{\mu_{i,c}}{\cos\alpha_{i,t}}\right) \end{cases} \quad (101)$$

where $d_{i,a}$ and $L_{i,a}$ represent the pitch diameter and lead of the lead screw respectively. $\lambda_{i,a}$ and $\psi_{i,a}$ are the lead angle and the friction angle of the lead screw respectively, while $\alpha_{i,t}$ and $\mu_{i,c}$ are the radial angle of the thread and the coefficient of friction between the screw and nut. In FIG. 37a, the linear displacement of the slide block is:

$$\Delta l_j = L_{i,a}\Delta\alpha_{i,a} \quad (102)$$

which is induced by the angular deformation of the actuator. Thus, the compliance of the torsional spring of the actuation can be deduced from Eqs. (99)-(102) as:

$$C_{i,al} = \frac{\Delta l_j}{\|f_{i,al}\|} = \frac{L_{i,a} d_{i,a}\tan(\lambda_{i,a}+\psi_{i,a})}{2K_{i,\alpha\alpha}} \quad (103)$$

In FIG. 37b, based on the deformation of the constraints, the bending compliance of the guide member $O_fG_i$ is:

$$C_{i,GOf} = \frac{\Delta\varphi_{i,GOf}}{\|M_{i,e}\|} = \frac{(\|l_i\|_{max}-\|l_i\|_{min})^2 - 3(\|l_i\|-\|l_i\|_{min})^2 - 3(\|l_i\|_{max}-\|l_i\|)^2}{6EI_{ik,GOf}(\|l_i\|_{max}-\|l_i\|_{min})} \quad (104)$$

where $\Delta\phi_{i,GOf}$ is the angular deformation of the guide member $O_fG_i$, $\|l_i\|_{min}$ and $\|l_i\|_{max}$ represent the moving range of the slide block, E is Young's modulus of elasticity, and $I_{ik,GOf}$ is the cross section moment of inertia of guide member $O_fG_i$ around the direction $k_{i,c}$.

In the joint $P_{i,1}$, the bending compliances of $A_iH_{i,m}$, $H_{i,m}H_i$ and $H_iB_i$ can be respectively determined as:

$$C_{i,AH} = \frac{\Delta\varphi_{i,AH}}{\|M_{i,c}\|} = \frac{\|h_i\|-\overline{H_{i,m}B_i}}{EI_{ik,AH}} = \frac{\|h_i\|-\|h_{i,d}\|}{EI_{ik,AH}} \quad (105)$$

$$C_{i,HH} = \frac{\Delta\varphi_{i,HH}}{\|M_{i,c}\|} = \frac{\|h_i\|-\overline{H_{i,m}B_i}-\overline{A_iH_i}}{EI_{ik,HH}} = \frac{\|h_{i,d}\|+\|h_{i,u}\|-\|h_i\|}{EI_{ik,HH}} \quad (106)$$

-continued $$C_{i,HB} = \frac{\Delta\varphi_{i,HB}}{\|M_{i,c}\|} = \frac{\|h_i\| - \overrightarrow{A_i H_i}}{EI_{ik,HB}} = \frac{\|h_i\| - \|h_{i,u}\|}{EI_{ik,HB}} \quad (107)$$

The bending compliance of link $B_i O_m$ is:

$$C_{i,BOm} = \frac{\Delta\varphi_{i,BOm}}{\|M_{i,c}\|} = \frac{\|r_i\|}{EI_{ik,BOm}} \quad (108)$$

Thus, in the serial connection of the springs, the equivalent stiffness of a subchain can be respectively determined as the stiffness of the actuation and constraints as:

$$K_{i,al} = C_{i,al}^{-1} \quad (109)$$
$$= \frac{\|f_{i,al}\|}{\Delta l_i}$$
$$= \frac{2K_{i,aa}}{L_{i,a} d_{i,a} \tan(\lambda_{i,a} + \psi_{i,a})}$$

$$K_{i,c} = C_{i,c}^{-1} \quad (110)$$
$$= \frac{\|M_{i,c}\|}{\Delta\varphi_{i,c}}$$
$$= (C_{i,GOf} + C_{i,AH} + C_{i,HH} + C_{i,HB} + C_{i,BOm})^{-1}$$

By combining the equivalent stiffnesses of the three subchains in the closed-loop form, the overall stiffness of the manipulator can be obtained and analyzed.

Stiffness Matrix Determination of the Manipulator

In order to establish the stiffness model of the manipulator, the overall stiffness of the three subchains can be analyzed by the load/displacement ratio of the movable platform. By assuming that there are no preloads and gravity effects on the structure, the output force and torque exerted on the movable platform are:

$$\begin{cases} f_f = [\, f_{xf} \quad f_{yf} \quad f_{zf} \,]^T \\ M_f = [\, M_{xf} \quad M_{yf} \quad M_{zf} \,]^T \end{cases} \quad (111)$$

which can be expressed as an output wrench $w_f = [f_f^T M_f^T]^T$. In the fixed reference frame $O_f$-$x_f y_f z_f$, the infinitesimal translational and rotational deformations of the movable platform caused by $w_f$ are:

$$\Delta O_m [\Delta y_{Om} \Delta z_{Om} \Delta\theta_{xf} \Delta\theta_{yf} \Delta\theta_{zf}]^T \quad (112)$$

The input force and torque that are caused by actuations and constraints of the three subchains can be respectively expressed as:

$$\begin{cases} f_a = [\, f_{1,a} \quad f_{2,a} \quad f_{3,a} \,]^T \\ M_c = [\, M_{1,c} \quad M_{2,c} \quad M_{3,c} \,]^T \end{cases} \quad (113)$$

In accordance with the differential motions of the structure and the Jacobian of actuations and constraints, the output infinitesimal deformations of the movable platform can be respectively transformed as the input deformations of the actuators and the constrained subchains. Thus, the infinitesimal translational and rotational deformations of the actuators and of the constrained subchains are respectively deduced as:

$$\begin{cases} \Delta l = [\, \Delta l_1 \quad \Delta l_2 \quad \Delta l_3 \,]^T = (J_a \nabla)\Delta O_m \\ \Delta\varphi_c = [\, \Delta\varphi_{1,c} \quad \Delta\varphi_{2,c} \quad \Delta\varphi_{3,c} \,]^T = (J_c \nabla)\Delta O_m \end{cases} \quad (114)$$

By applying the principle of virtual work to the overall structure, the relations of the input-output force and torque become:

$$w_f^T \Delta O_m = f_a^T \Delta l_a + M_c^T \Delta\varphi_c \quad (115)$$
$$= [\, \|f_{1,al}\|\cos\phi_1 \quad \|f_{2,al}\|\cos\phi_2 \quad \|f_{3,al}\|\cos\phi_3 \,]$$
$$\begin{bmatrix} \Delta l_1 \cos\phi_1 \\ \Delta l_2 \cos\phi_2 \\ \Delta l_3 \cos\phi_3 \end{bmatrix} + M_c^T \Delta\varphi_c$$
$$= [\, \|f_{1,al}\| \quad \|f_{2,al}\| \quad \|f_{3,al}\| \,] \begin{bmatrix} \cos^2\phi_1 & 0 & 0 \\ 0 & \cos^2\phi_2 & 0 \\ 0 & 0 & \cos^2\phi_3 \end{bmatrix} \begin{bmatrix} \Delta l_1 \\ \Delta l_2 \\ \Delta l_3 \end{bmatrix} + M_c^T \Delta\phi_c$$
$$= f_{al}^T \begin{bmatrix} \cos^2\phi_1 & 0 & 0 \\ 0 & \cos^2\phi_2 & 0 \\ 0 & 0 & \cos^2\phi_3 \end{bmatrix} (J_a \nabla)\Delta O_m +$$
$$M_c^T (J_c \nabla)\Delta O_m$$

namely:

$$w_f = (J_a \nabla)^T \begin{bmatrix} \cos^2\phi_1 & 0 & 0 \\ 0 & \cos^2\phi_2 & 0 \\ 0 & 0 & \cos^2\phi_3 \end{bmatrix} f_{al} + (J_c \nabla)^T M_c \quad (116)$$

where the input force $f_{al}$ of the actuators and torque $M_c$ of the constraints are respectively determined by the equivalent stiffness of the three subchains in Eqs. (109) and (110) as:

$$f_{al} = [\, \|f_{1,al}\| \quad \|f_{2,al}\| \quad \|f_{3,al}\| \,]^T \quad (117)$$
$$= [\, K_{1,al}\Delta l_1 \quad K_{2,al}\Delta l_2 \quad K_{3,al}\Delta l_3 \,]^T$$
$$= \begin{bmatrix} K_{1,al} & 0 & 0 \\ 0 & K_{2,al} & 0 \\ 0 & 0 & K_{3,al} \end{bmatrix} \begin{bmatrix} \Delta l_1 \\ \Delta l_2 \\ \Delta l_3 \end{bmatrix}$$
$$= \begin{bmatrix} K_{1,al} & 0 & 0 \\ 0 & K_{2,al} & 0 \\ 0 & 0 & K_{3,al} \end{bmatrix} (J_a \nabla)\Delta O_m$$

$$M_c = [\, \|M_{1,c}\| \quad \|M_{2,c}\| \quad \|M_{3,c}\| \,]^T \quad (118)$$
$$= [\, K_{1,c}\Delta\varphi_{1,c} \quad K_{2,c}\Delta\varphi_{2,c} \quad K_{3,c}\Delta\varphi_{3,c} \,]^T$$
$$= \begin{bmatrix} K_{1,c} & 0 & 0 \\ 0 & K_{2,c} & 0 \\ 0 & 0 & K_{3,c} \end{bmatrix} \begin{bmatrix} \Delta\varphi_{1,c} \\ \Delta\varphi_{2,c} \\ \Delta\varphi_{3,c} \end{bmatrix}$$
$$= \begin{bmatrix} K_{1,c} & 0 & 0 \\ 0 & K_{2,c} & 0 \\ 0 & 0 & K_{3,c} \end{bmatrix} (J_c \nabla)\Delta O_m$$

By substituting Eq. (117) and (118) into Eq. (116), the output force and torque of the movable platform is obtained:

$$w_f = (J_a \nabla)^T \begin{bmatrix} \cos^2\phi_1 & 0 & 0 \\ 0 & \cos^2\phi_2 & 0 \\ 0 & 0 & \cos^2\phi_3 \end{bmatrix} \begin{bmatrix} K_{1,al} & 0 & 0 \\ 0 & K_{2,al} & 0 \\ 0 & 0 & K_{3,al} \end{bmatrix} \quad (119)$$

$$(J_a\nabla)\Delta O_m + (J_c\nabla)^T \begin{bmatrix} K_{1,c} & 0 & 0 \\ 0 & K_{2,c} & 0 \\ 0 & 0 & K_{3,c} \end{bmatrix} (J_c\nabla)\Delta O_m$$

Thus, the 6×6 stiffness matrix of the manipulator can be deduced from Eq. (119) and becomes:

$$K_f = \quad (120)$$

$$\frac{w_f}{\Delta O_m} = (J_a\nabla)^T \mathrm{diag}[\cos^2\phi_1, \cos^2\phi_2, \cos^2\phi_3]\mathrm{diag}[K_{1,al}, K_{2,al}, K_{3,al}]$$

$$(J_a\nabla) + (J_c\nabla)^T \mathrm{diag}[K_{1,c}, K_{2,c}, K_{3,c}](J_c\nabla)$$

The stiffness matrix includes the effects of the actuations and constraints of the manipulator, and the stiffness of all links, joints, actuators, fixed and movable platforms are considered based on the analysis of the overall Jacobian matrix. The stiffness performance of the manipulator can now be evaluated based on this stiffness matrix.

Workspace Evaluation

To evaluate the stiffness performance of the manipulator, the reachable workspace should be determined and used to analyze the stiffness distributions. The shape and size of the reachable workspace is defined as the space that can be reached by the three translations of point $O_m$ of the movable platform in the fixed reference frame $O_f\text{-}x_fy_fz_f$. The boundary of the reachable workspace is simultaneously constrained by the moving ranges, physical interference and geometric constraints of all joints in the closed-loop form.

In accordance with Eq. (92), the rotational angles $\theta_{i,u}$ and $\theta_{i,d}$ of the two parallel revolute joints are equal as determined by the closed-loop constraint as:

$$\theta_{i,u} = -\theta_{i,d} = \arccos\left( \frac{s_{i,2} \times [0\ 0\ -1]^T \times s_{i,2} \cdot \overrightarrow{A_iC_i}}{\|\overrightarrow{A_iC_i}\|} \right) \quad (121)$$

where $$\overrightarrow{A_iC_i} = \overrightarrow{O_fC_i} - \overrightarrow{O_fA_i} \quad (122)$$

$$= r_o + \overrightarrow{O_mC_i} - l_i$$

$$= r_o + r_i + \|h_i\|\cos\gamma_i[1\ 1\ 1]^T - l_i$$

The translational displacements $\|l_i\|$ ($P_{i,0}$) and $\|h_i\|$ ($P_{i,1}$) are determined by the inverse position solution from Eqs. (76) and (74), respectively. Thus, by considering the moving ranges, physical interference and geometric constraints of all joints, the corresponding constraint equations of the reachable workspace are given by:

$$\begin{cases} \|l_i\|_{min} \leq \|l_i\| \leq \|l_i\|_{max} \\ \|h_i\|_{min} \leq \|h_i\| \leq \|h_i\|_{max} \\ \theta_{i,min} \leq \theta_{i,u} = |\theta_{i,d}| \leq \theta_{i,max} \\ z < 0 \end{cases} \quad (123)$$

In order to determine the shape and size of the reachable workspace, a numerical search is performed based on Eq. (123). In the fixed reference frame $O_f\text{-}x_fy_fz_f$, if a point (x, y, z) satisfies the inequalities in Eq. (123), that point can be considered as part of the reachable workspace. Thus, by searching all points on each x-y section of $O_f\text{-}x_fy_fz_f$, a set of points is obtained. The 3D arrangement of all these points constitutes the reachable workspace of the manipulator.

Figure 39:
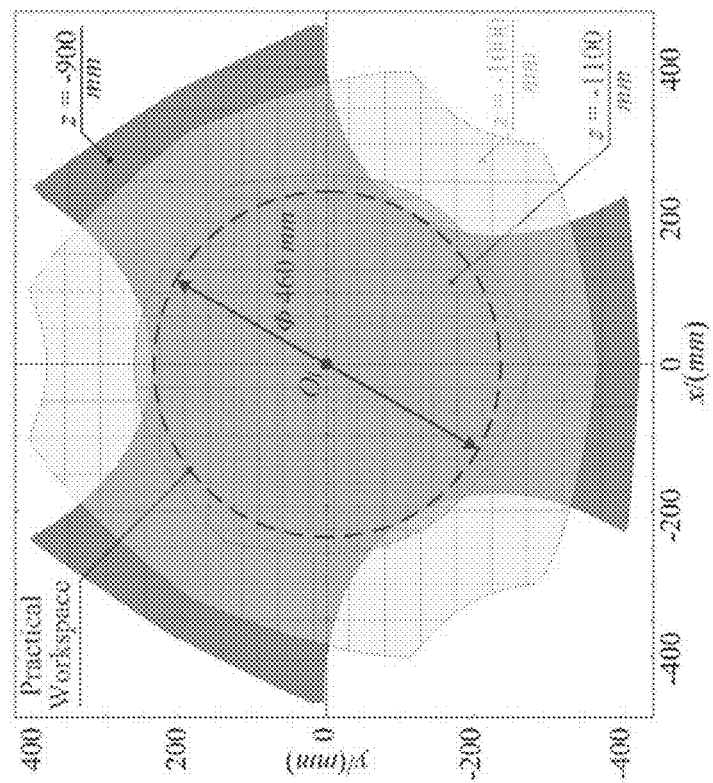
FIG. 39 is a diagram of several x-y cross-sections taken from FIG. 38 at various z values, in accordance with one aspect of the present disclosure.
Figure 38:
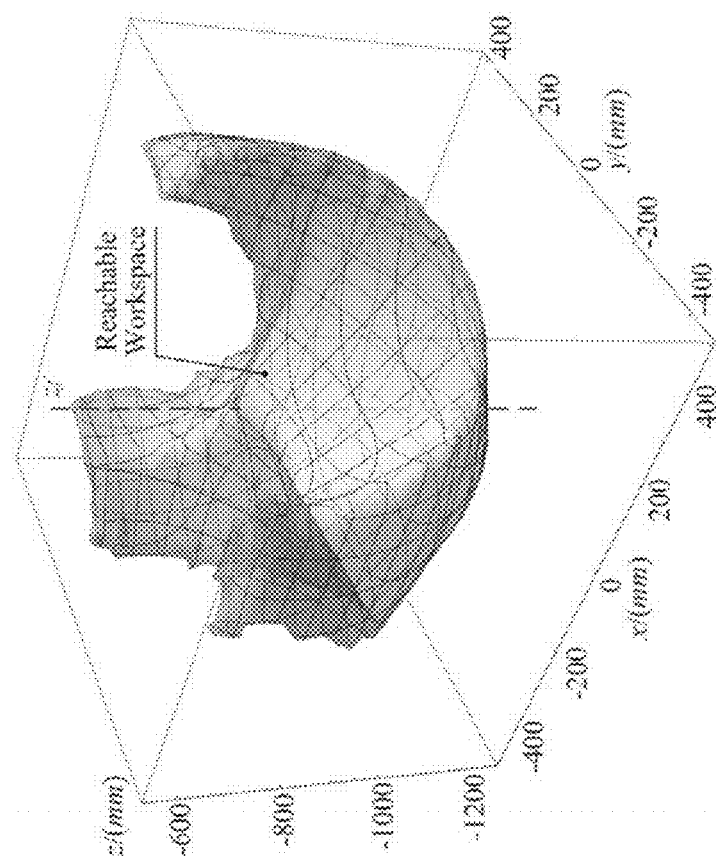
FIG. 38 is a diagram illustrating one example of a three-dimensional (3D) workspace associated with the manipulator shown in FIG. 32, in accordance with one aspect of the present disclosure.

The related values of the structural parameters and of the moving ranges of all joints for the manipulator selected for illustrative purposes are listed in Table 4. Based on the numerical search results in accordance to Eq. (123), the basic 3D shape and size of the reachable workspace is shown in FIG. 38. The shape of the reachable workspace is symmetric about axis $z_f$. In one example, the coordinates of the extreme values of the reachable workspace are: x ∈[−457,457], y∈[−421,402], z∈[−1262,−572] (the unit is mm). In FIG. 39, three x-y sections of the reachable workspace are generated. The three regions represent the x-y sections at z=−1100 mm, −1000 mm and −900 mm, respectively. The three x-y sections have different shapes and sizes. By considering the practical motion ranges of the movable platform and the general applications of the manipulator, the practical workspace (namely, the sub-workspace of the reachable workspace) can be defined in a cylinder with a height of 200 mm (between the two x-y sections at the z=−1100 mm and −900 mm), where the maximal diameter of the cylinder is Φ=460 mm (around the center point $O_f$). The stiffness and its distributions throughout the practical workspace of the manipulator will be discussed hereinafter.

TABLE 4

Structural Parameters of the Manipulator

| Parameter | Value | Parameter | Value |
|---|---|---|---|
| $\alpha_1$ | 90° | $\|l_i\|_{min}$ | 400 mm |
| $\alpha_2$ | 210° | $\|l_i\|_{max}$ | 1250 mm |
| $\alpha_3$ | 330° | $\|h_i\|_{min}$ | 600 mm |
| $\alpha_{Pi}$ | −35° | $\|h_i\|_{max}$ | 1200 mm |
| $\alpha_{Ri}$ | −35° | $\theta_{i,min}$ | −90° |
| $\gamma_i$ | −30° | $\theta_{i,max}$ | 90° |
| $\|r_i\|$ | 100 mm | | |

Stiffness Evaluation

In the structure of the manipulator, the stiffness matrix is varied when the movable platform moves to different positions. In addition, the output stiffness is also dependent on the direction of the applied external loads on the movable platform. In the reachable workspace, the minimal stiffness should be larger than a designed value to ensure accuracy of manipulation. Thus, the distribution of the stiffness should be evaluated in the reachable workspace.

Each point of the reachable workspace is characterized by a minimal and maximal value of the stiffness. The actual output stiffness at each point depends on the direction of the external load. The range of the values can be characterized by the minimal and maximal eigenvalues of the stiffness matrix because the output stiffness in an arbitrary direction is bounded by the minimal and maximal eigenvalues of the stiffness matrix in a given pose. The variations of the minimal and maximal eigenvalues can be used as stiffness performance indices to evaluate the stiffness distribution in the reachable workspace.

By substituting all coordinates of the reachable workspace into the stiffness matrix in Eq. (120), the distributions of the minimal and maximal eigenvalues of the stiffness matrix can be respectively determined in the fixed reference frame $O_f$-$x_f y_f z_f$. The structural and physical parameters are listed in Tables 4 and 5, respectively.

TABLE 5

Physical parameters of the Manipulator

| Parameter | Value | Parameter | Value |
|---|---|---|---|
| $K_{i,\alpha a}$ | $2.5 \times 10^9$ Nmm/rad | $I_{ik,GOf}$ | $4.22 \times 10^4$ mm$^4$ |
| $L_{i,a}$ | 6.5 mm | $I_{ik,AH}$ | $2.53 \times 10^4$ mm$^4$ |
| $d_{i,a}$ | 31.5 mm | $I_{ik,HH}$ | $3.21 \times 10^4$ mm$^4$ |
| $\alpha_{i,t}$ | 14.5° | $I_{ik,HB}$ | $2.36 \times 10^4$ mm$^4$ |
| $\mu_{i,c}$ | 0.2 | $I_{ik,BOm}$ | $1.78 \times 10^4$ mm$^4$ |
| E | $2.03 \times 10^5$ Mpa | $\|h_{i,u}\|$ | 600 mm |
|  |  | $\|h_{i,d}\|$ | 400 mm |

Figure 40A:
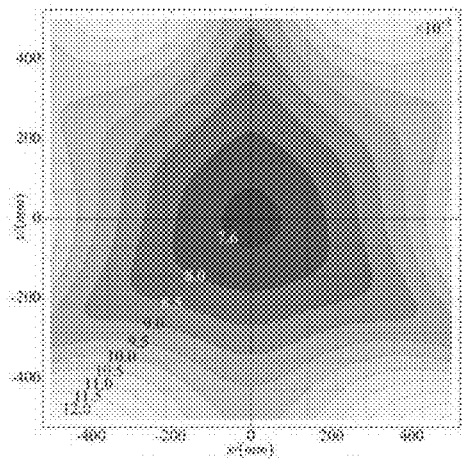
FIG. 40a is a diagram associated with the manipulator shown in FIG. 32 of one example of a distribution of a maximum eigenvalue of a stiffness matrix at an x-y section taken at a z value of −900, in accordance with one aspect of the present disclosure.
Figure 40D:
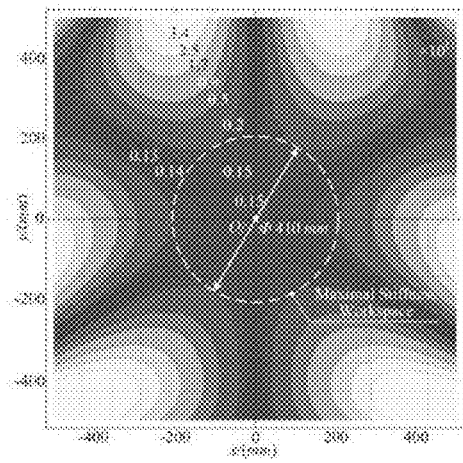
FIG. 40d is a diagram associated with the manipulator shown in FIG. 32 of one example of a distribution of a minimum eigenvalue of a stiffness matrix at an x-y section taken at a z value of −900, in accordance with one aspect of the present disclosure.
Figure 40B:
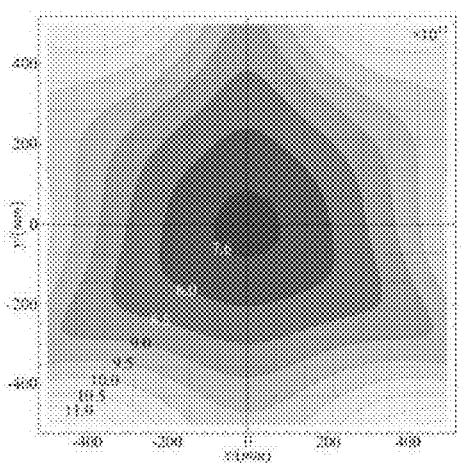
FIG. 40b is a diagram associated with the manipulator shown in FIG. 32 of another example of a distribution of a maximum eigenvalue of a stiffness matrix at an x-y section taken at a z value of −1000, in accordance with one aspect of the present disclosure.
Figure 40E:
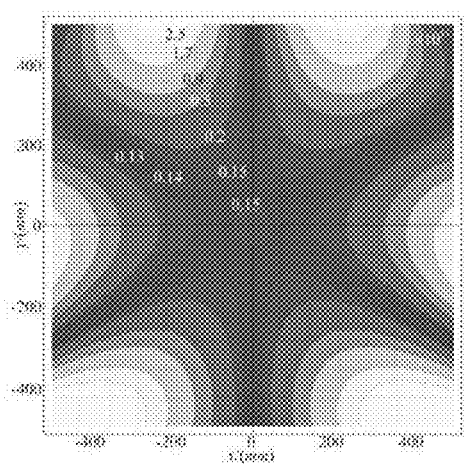
FIG. 40e is a diagram associated with the manipulator shown in FIG. 32 of another example of a distribution of a minimum eigenvalue of a stiffness matrix at an x-y section taken at a z value of −1000, in accordance with one aspect of the present disclosure.
Figure 40C:
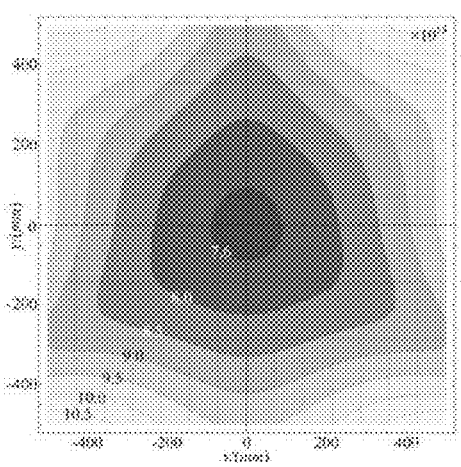
FIG. 40c is a diagram associated with the manipulator shown in FIG. 32 of another example of a distribution of a maximum eigenvalue of a stiffness matrix at an x-y section taken at a z value of −1100, in accordance with one aspect of the present disclosure.
Figure 40F:
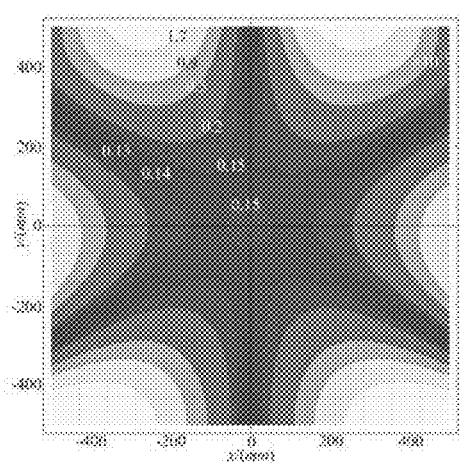
FIG. 40f is a diagram associated with the manipulator shown in FIG. 32 of another example of a distribution of a minimum eigenvalue of a stiffness matrix at an x-y section taken at a z value of −1100, in accordance with one aspect of the present disclosure.

In FIGS. 40*a*-40*f*, $K_{f\,max}$ and $K_{f\,min}$ represent the maximal and minimal eigenvalues of the stiffness matrix. The distributions of $K_{f\,max}$ (see FIGS. 40*a*-40*c*) and $K_{f\,min}$ (see FIGS. 40*d*-40*f*) are analyzed, as an example, in three x-y sections (z=−900, −1000, −1100 mm), respectively. The shape of the distributions is symmetric about axis z. The maximal eigenvalues are increased from the center outward, and increased along the positive direction of axis z. From the center outward, the minimal eigenvalues are decreased, and then increased. In each x-y section, the inner part of decreased minimal eigenvalues are decreased along the positive direction of axis z, while the outward part of increased minimal eigenvalues are increased along the positive direction of axis z. Thus, by assuming that the minimal eigenvalue of the stiffness matrix is $1.4 \times 10^{10}$, the maximal stiffness workspace can be determined as a cylinder with a maximal diameter of Φ=410 mm (around the center point $O_f$) and height 200 mm (between the two x-y sections at the z=−900 mm and −1100 mm) as shown in FIG. 40*d*, which is a sub-workspace of the practical workspace.

Among all the basic structural constants $\alpha_i$, $\alpha_{Pi}$, $\alpha_{Ri}$, $\gamma_i$, $\|r_i\|$, $\|h_{i,u}\|$ and $\|h_{i,d}\|$, $\alpha_i$ determines the symmetric property of the structure and workspace, while the variations of $\|r_i\|$, $\|h_{i,u}\|$ and $\|h_{i,d}\|$ can change the size of the workspace (instead of the shape of the workspace), because the different lengths of $\|r_i\|$, $\|h_{i,u}\|$ and $\|h_{i,d}\|$ have no influence on the constraint angles between the axes of all of the joints. In the three subchains, the intersection angles $\alpha_{Pi}$, $\alpha_{Ri}$, and $\gamma_i$ determine the constraint relations between all of the joints. Different constraint angles of the joints induce different shapes and sizes of the structure and of the workspace. In the illustrative example of a simplified sensitivity analysis of the structural parameters and of a simplified structural optimization, to be presented below, only the variation of $\gamma_i$ will be considered while assuming that the other variables are constants.

During the linear actuation of $P_{i,0}$, in order to actuate the passive motion of joint $P_{i,1}$, joint $P_{i,1}$ cannot be parallel or perpendicular to $P_{i,0}$. Thus, the variation range of the intersection angle is $\gamma_i \in (0°, -((\pi/2)-|\alpha_{Ri}|))$. In FIGS. 38-40*f*, the workspace and the distributions of the stiffness are generated for $\gamma_i$ equal to 30°. In order to evaluate the variations of the workspace and the stiffness distributions by different values of $\gamma_i$, results of a numerical search are shown in FIGS. 41*a*-41*c*, for $\gamma_i$=−40° and FIGS. 41*d*-41*f* for $\gamma_i$=−50°. Compared to the workspace shown in FIGS. 38 and 39, the sizes of the workspaces have increased in FIGS. 41*a*-41*f*. Evidently, the maximal and minimal eigenvalues of the stiffness are decreased with an increase of $\gamma_i$. Thus, by evaluating the workspace and distributions of the maximal and minimal eigenvalues as a function of $\gamma_i$, it can be shown that the maximal size of the practical workspace is achieved when $\gamma_i$=−42.5°. The maximal diameter of the cylinder of the practical workspace, in this case, is Φ=540 mm with a height of 230 mm between two x-y sections at z=−1050 mm and −1280 mm. Correspondingly, the maximal stiffness workspace can be defined as a sub-workspace of the practical workspace with a maximal diameter of Φ=450 mm and height of 230 mm when the minimal eigenvalue of the stiffness matrix is $1.1 \times 10^{10}$.

The motions and constraints of a 3-DOF translational parallel manipulator are analyzed. There are only four 1-DOF joints required in each subchain of the manipulator. A small size of the movable platform and fixed linear actuations are designed for achieving a better kinematic characteristic. The inverse position solution was obtained in the closed-loop constraint analysis. By considering the 6-DOF deformations of the movable platform, a 6×6 overall Jacobian matrix of the manipulator was built based on the theory of reciprocal screws, which includes the constraint and actuation effects on the output stiffness.

In accordance with the overall Jacobian matrix method, the stiffness model of the manipulator was established. The model includes the deformations of all links, joints, actuators, fixed and movable platforms. In each subchain, one torsional spring and five bending springs were used to represent the equivalent spring structure of the stiffness model. A 6×6 output stiffness matrix was obtained by the transformations of loads and deformations in the closed-loop form. Furthermore, the stiffness performance of the manipulator was characterized and evaluated by the maximal and minimal eigenvalues of the stiffness matrix in the reachable workspace. By evaluating the workspace and distributions of the maximal and minimal eigenvalues with the variation of structural parameters, the maximal size of the practical workspace was analyzed, and the maximal stiffness workspace can be determined according to the stiffness distributions. The stiffness model and analysis provide the basic constraints for the parametric design of the manipulator.

Figure 42:
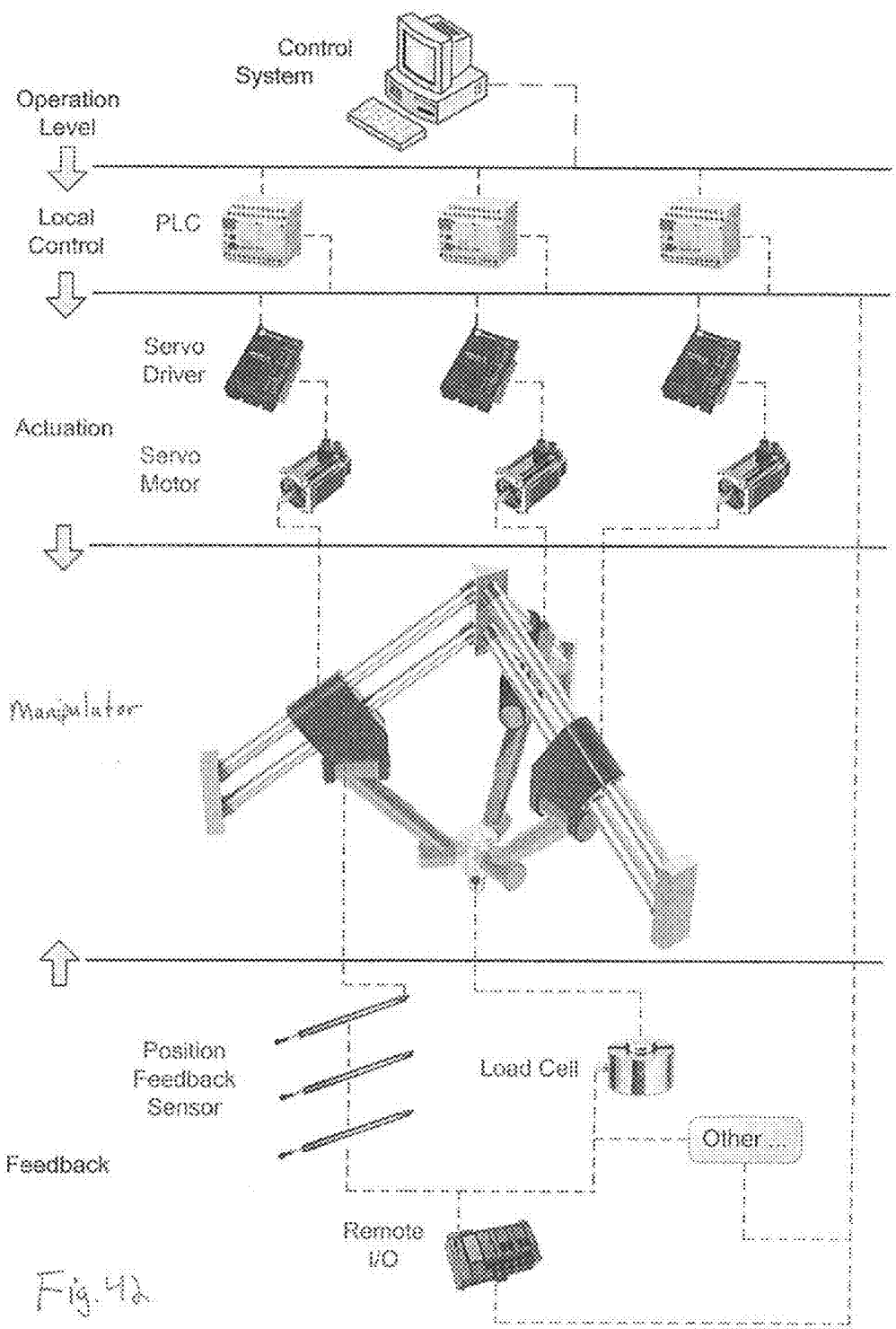
FIG. 42 is a diagram of one example of a control system for one example of a translational parallel manipulator, in accordance with one aspect of the present disclosure.

Referring now to FIG. 42, one example of a control system adapted to control and operate any of the manipulators illustrated and describe herein, or other equivalents and alternatives, is illustrated. It should be understood that this system is only one of many possible control systems capable of controlling the manipulators disclosed herein and presenting this exemplary control system assists with understanding the principles of the present disclosure. The disclosed exemplary system is not intended to be limiting in any manner to the present disclosure. It should also be understood that the example of the manipulator illustrated in the this system is not intended to be limiting and is provided purely as an example of the many types of manipulators that may be controlled and operated within and by the system.

With continued reference to FIG. 42, the system includes various levels of controls and associated hardware and software. The system is capable of including any quantity of hardware, software or a combination of hardware and software at any of the levels, and all of such possibilities are intended to be within the spirit and scope of the present disclosure. In this example, the control system includes an operation level, a local control level, an actuation level, an equipment or manipulator level, and a feedback level. The operation level includes a conventional computer, computing device, or the like adapted to perform all the necessary control, transmit and receive data as necessary, and other functions and capabilities of a conventional computer. The actuation level includes a plurality of servo drivers and a plurality of servo motors. In one example, the system includes three sets of servo drivers and motors in order to drive or actuate the three subchains of the manipulators. In one example, the fixed prismatic joints coupled directly to the guide members are the driven joints and are driven by the servo drivers and motors. The manipulator level includes any one of the possible manipulators and is controlled to perform a desired process, functionality or operation. The feedback level includes a plurality of position feedback sensors associated with manipulator to relay data associated with positions of the manipulator to the computer. In one example, the system includes three position feedback sensors, one for each of the three subchains of the manipulator. The feedback level also includes a load cell or other load measuring device that transmit data to the computer pertaining to a load on the movable platform. The feedback level also includes a conventional remote input/output (I/O) device capable of transmitting data to the computer. The feedback level is also capable of including other devices that may be used to assist with control of the manipulator as desired based on the application of the manipulator.

It should be understood that use of the identifier "levels" is purely for organization of the figures and associated description, and is not intended to be limiting or imply an interpretation of any detail in the figures or description in any manner. It should also be understood that any of the levels may include more, less or different elements, and all of such possibilities are intended to be within the spirit and scope of the present disclosure.

It should further be understood that the joints described and illustrated herein are capable of being replaced with other types of joints that have different structures and function in different manners. For example, the joints may be replaced with flexure hinges, which would make the subchains and/or the manipulator a monolithic and/or a unitarily formed one-piece structure. It should also be understood that the manipulator may include piezo-transducers and/or motors for movement of portions of the manipulator, thereby resulting in better control of the manipulator (e.g., nanoscale movement).

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While various embodiments and examples of the disclosure have been described, it will be apparent to those of ordinary skill in the art that other embodiments and examples, and implementations are possible within the scope of the disclosure. Accordingly, the disclosure is not to be restricted except in light of the attached claims and their equivalents.

What is claimed is:

1. A translational parallel manipulator comprising:
a fixed platform including three guide members, wherein the three guide members include first ends and second ends, and wherein the first ends of the three guide members are all coupled to each other and the second ends of the three guide members are all spaced-apart from each other;
a movable platform spaced-apart from the fixed platform; and
three serial subchains coupled between the three guide members and the movable platform;
wherein each of the three serial subchains include:
a first prismatic joint;
a first revolute joint;
a second prismatic joint; and
a second revolute joint;
where the second revolute joints of the three serial subchains are coupled directly to the movable platform and rotational axes of the second revolute joints intersect each other at a point on the movable platform.

2. The translational parallel manipulator of claim 1, wherein the point is a center point of the movable platform.

3. The translational parallel manipulator of claim 1, wherein the rotational axes of the second revolute joints are co-planar.

4. The translational parallel manipulator of claim 1, wherein a rotational axis of the first revolute joint is parallel to a rotational axis of the second revolute joint.

5. The translational parallel manipulator of claim 1, wherein an intersection angle between a rotational axis of the first revolute joint and a moving direction of the second prismatic joint is between zero degrees and about 90 degrees.

6. The translation parallel manipulator of claim 5, wherein the intersection angle is between about 30 degrees and about 60 degrees.

7. The translational parallel manipulator of claim 1, wherein the movable platform includes at least one of a tool holder and a tool.

8. The translational parallel manipulator of claim 1, wherein the translational parallel manipulator is constrained to a limited quantity of degrees-of-freedom.

9. The translational parallel manipulator of claim 8, wherein the translational parallel manipulator is constrained to only three degrees-of-freedom.

* * * * *